United States Patent
Hane

(10) Patent No.: US 7,825,369 B2
(45) Date of Patent: Nov. 2, 2010

(54) DISPLACEMENT SENSOR, METHOD FOR DETECTING THE OPTIMAL REFERENCE POSITION, AND METHOD FOR JUDGING STABILITY OF DETECTING REFERENCE POSITION OF DISPLACEMENT SENSOR

(75) Inventor: Jun Hane, Tachikawa (JP)

(73) Assignee: Olympus Corporation, Tokyo (JP)

( * ) Notice: Subject to any disclaimer, the term of this patent is extended or adjusted under 35 U.S.C. 154(b) by 585 days.

(21) Appl. No.: 11/871,353

(22) Filed: Oct. 12, 2007

(65) Prior Publication Data

US 2008/0035837 A1     Feb. 14, 2008

Related U.S. Application Data

(62) Division of application No. 10/610,663, filed on Jul. 1, 2003, now Pat. No. 7,312,437.

(30) Foreign Application Priority Data

Jul. 2, 2002    (JP)    ............................. 2002193448

(51) Int. Cl.
*H01J 3/14* (2006.01)
(52) U.S. Cl. .................. 250/237 G; 250/231.13; 250/231.18
(58) Field of Classification Search ........... 250/237 G, 250/231.13–231.18; 341/13, 14
See application file for complete search history.

(56) References Cited

U.S. PATENT DOCUMENTS 5,837,999 A * 11/1998 Horiuchi ................ 250/231.14

6,229,140 B1    5/2001 Ishizuka
2001/0030282 A1 * 10/2001 Steegmueller et al. . 250/231.13

FOREIGN PATENT DOCUMENTS

| JP | 60-006824 | 1/1985 |
|----|-----------|--------|
| JP | 06-014908 | 2/1994 |
| JP | 7-4991    | 1/1995 |
| JP | 7-203661  | 8/1995 |
| JP | 8-261795  | 10/1996 |
| JP | 10-227661 | 8/1998 |
| JP | 11-241927 | 9/1999 |

* cited by examiner

*Primary Examiner*—Tony Ko
(74) *Attorney, Agent, or Firm*—Scully, Scott, Murphy & Presser, P.C.

(57) ABSTRACT

A displacement sensor which detects a positional displacement of a movable member, comprises a position signal generating section configured to generate a periodical signal in accordance with movement of the movable member, a generating section of a signal for detecting a reference position, configured to generate the signal for detecting the reference position, when the movable member is in a predetermined position, a reference position detection circuit configured to detect that the movable member is in a reference position based on the signal for detecting the reference position, generated by the generating section of the signal for detecting the reference position, in synchronization with the periodical signal generated by the position signal generating section, and a selecting section configured to be capable of selecting a phase position to be synchronized from a plurality of phase positions on the periodical signal in the synchronization in the reference position detection circuit.

19 Claims, 35 Drawing Sheets

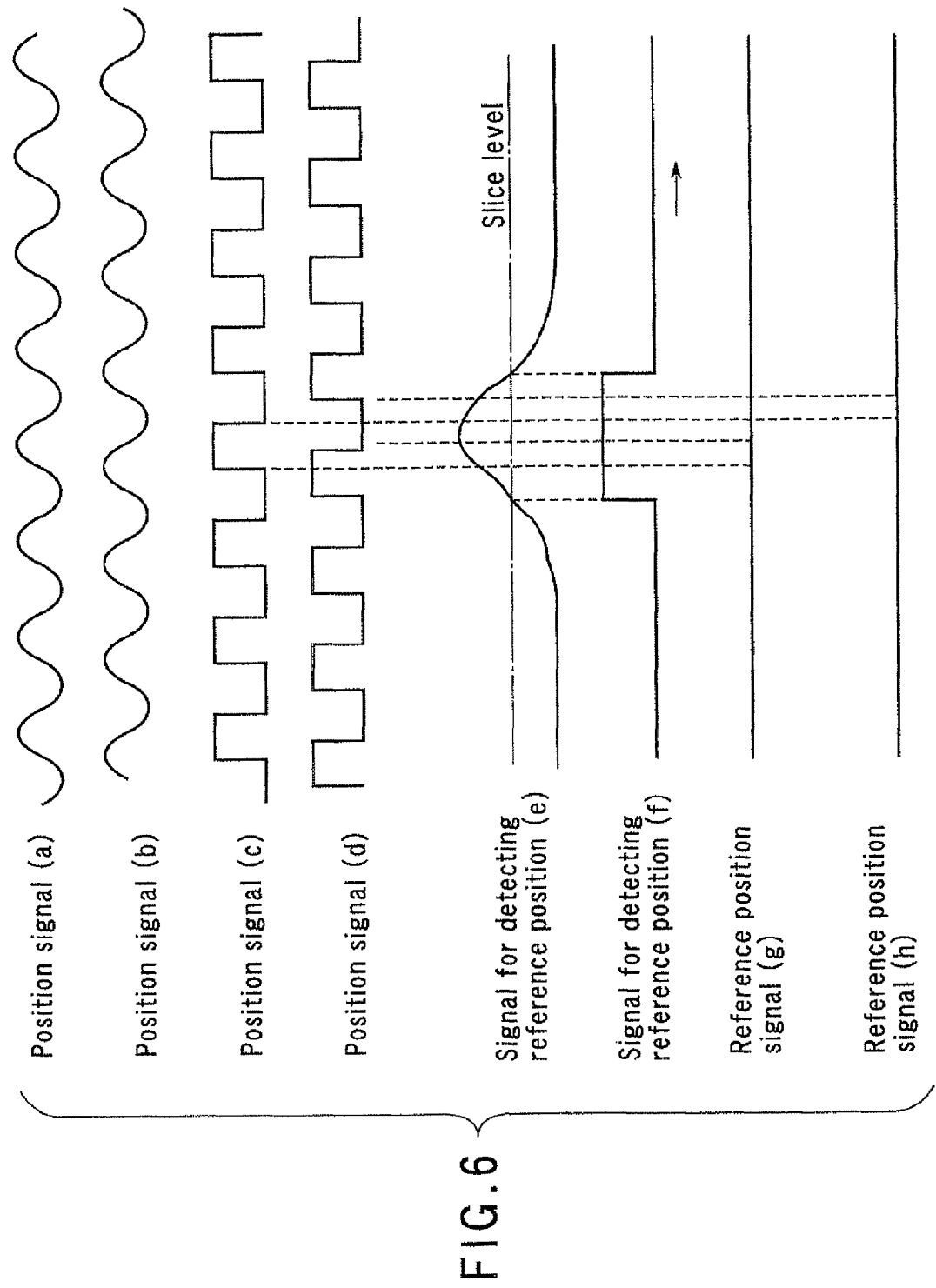

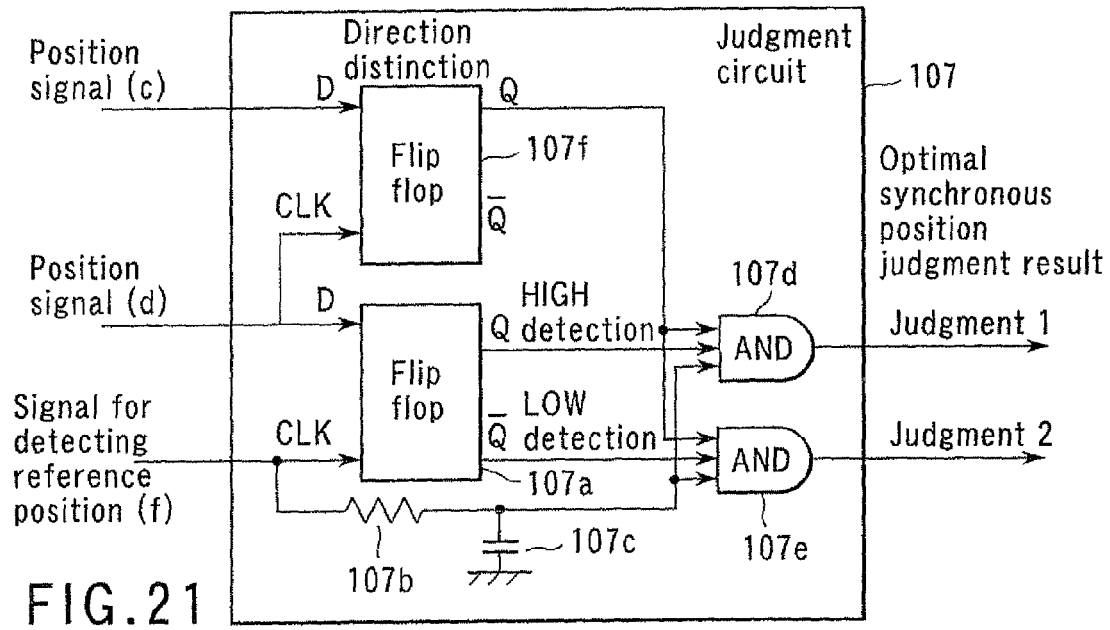
FIG.21
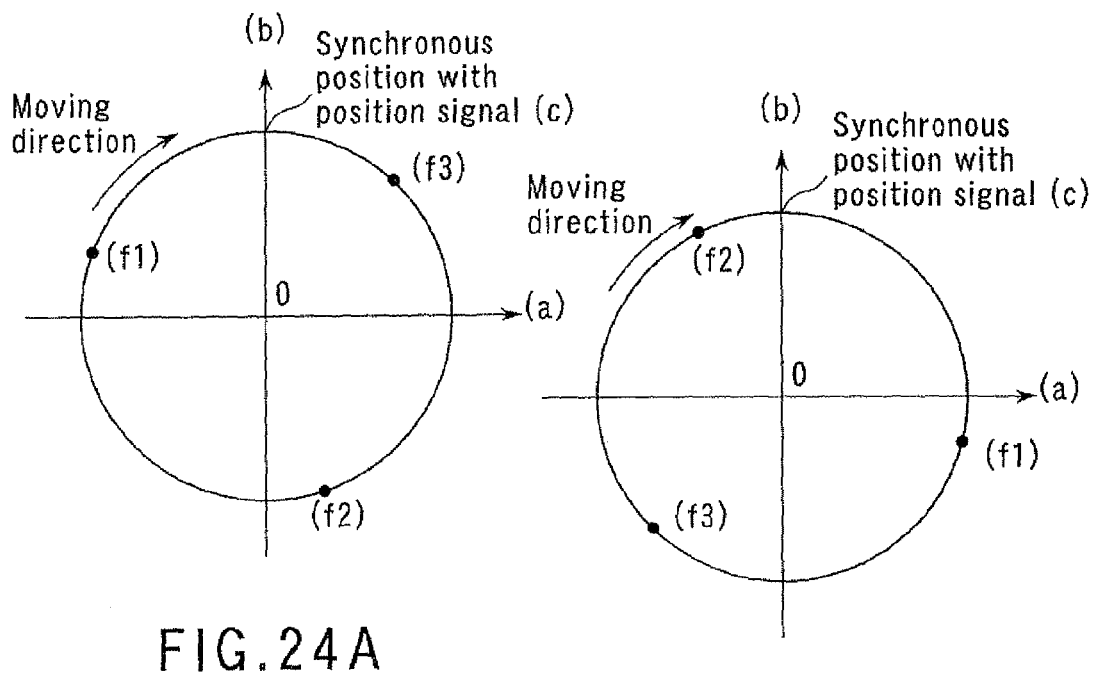
FIG.24A
FIG.24B

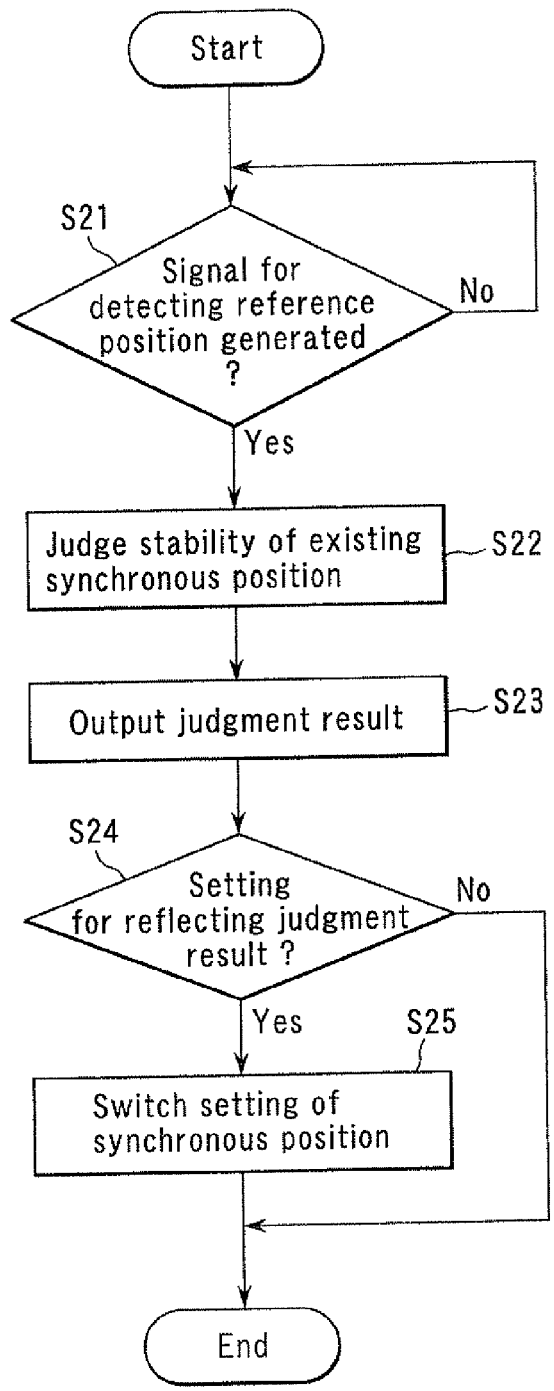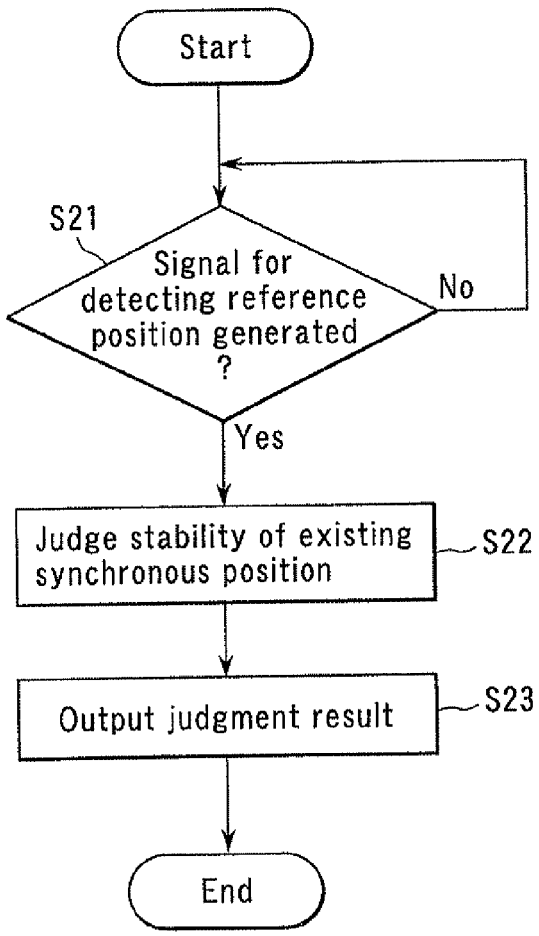
FIG. 46
FIG. 47

DISPLACEMENT SENSOR, METHOD FOR DETECTING THE OPTIMAL REFERENCE POSITION, AND METHOD FOR JUDGING STABILITY OF DETECTING REFERENCE POSITION OF DISPLACEMENT SENSOR

CROSS-REFERENCE TO RELATED APPLICATIONS

This application is a divisional application of U.S. application Ser. No. 10/610,663, filed Jul. 1, 2003, which is based upon and claims the benefit of priority from the prior Japanese Patent Application No. 2002-193448, filed Jul. 2, 2002, the entire contents of each of which are incorporated herein by reference.

BACKGROUND OF THE INVENTION

1. Field of the Invention

The present invention relates to a displacement sensor for use in displacement detection of an encoder, a method for detecting an optimal reference position for the displacement sensor, and a method for judging stability of the detected optimal reference position.

2. Description of the Related Art

As a general example of an encoder according to a conventional art, an optical encoder has been known. That is, this optical encoder includes: a light source section in which a light emitting section such as LED is combined with an optical device for converting a beam light from the light emitting section into a parallel light; an index scale and scale successively irradiated with the parallel light from the light source section; a photodetector disposed on a side opposite to the light source section as seen from the scale; and a signal processing circuit section for processing a signal from the photodetector to output an encoder signal. In this constitution, the index scale, scale, and photodetector are constituted of parts for detecting a position and reference position. That is, slit parts for detecting the position and reference position are disposed in the index scale and scale, additionally the photodetector also includes photo-detection parts for detecting the position and reference position, and position detection/reference position detection is possible by a combination of these.

Moreover, in objects for detecting the position such as a stage and motor, the combination of the light source section and photodetector is attached to either one of movable and fixed parts. The scale is attached to the other of the movable and fixed parts.

Moreover, general encoder output signals include: sinusoidal signals which are outputted with the displacement of the movable part of an apparatus and which are different from each other in phase by 90°; A and B phase signals which are pulse (rectangular wave) signals; and Z phase signal (signal for detecting the reference position) outputted when the reference position of the movable part is detected.

Furthermore, an absolute position of the movable part is unclear when power supply of the apparatus is turned on or position information is cleared, and in this case the reference position can be detected to obtain exact position information.

Additionally, among the encoders, in a linear encoder for linearly detecting the position, a pattern for detecting the reference position is disposed in the vicinity of one end of a linear scale in many cases. In a rotary encoder for detecting a rotary movement, the pattern for detecting the reference position is usually disposed in one place on a disc-shaped scale.

Moreover, the movable part is moved to detect the pattern for detecting the reference position of the scale, and a reference position signal is outputted in synchronization with AB phase signals if necessary.

For example, in Jpn. Pat. Appln. KOKAI Publication No. 8-261795, a mechanism for generating and detecting a signal having a period longer than that of a position detection signal is disposed in the scale, index scale, and light receiving section. That is, in addition to the displacement signal and reference position signal, an auxiliary reference position signal is generated, and is used as an index in synchronizing the reference position signal with the position detection signal.

BRIEF SUMMARY OF THE INVENTION

According to a first aspect of the present invention, there is provided a displacement sensor which detects a positional displacement of a movable member, comprising:

a position signal generating section configured to generate a periodical signal in accordance with movement of the movable member;

a generating section of a signal for detecting a reference position, configured to generate the signal for detecting the reference position, when the movable member is in a predetermined position;

a reference position detection circuit configured to detect that the movable member is in a reference position, the detection being based on the signal for detecting the reference position generated by the generating section of the signal for detecting the reference position and being in synchronization with the periodical signal generated by the position signal generating section; and a selecting section configured to be capable of selecting a phase position to be synchronized from a plurality of phase positions on the periodical signal in the synchronization in the reference position detection circuit.

According to a second aspect of the present invention, there is provided a displacement sensor which detects a positional displacement of a movable member, comprising:

a position signal generating section configured to generate a periodical signal in accordance with movement of the movable member;

a generating section of a signal for detecting a reference position, configured to generate the signal for detecting the reference position, when the movable member is in a predetermined position;

a latch section configured to latch the signal for detecting the reference position, generated by the generating section of the signal for detecting the reference position; and a reference position detection circuit configured to detect that the movable member is in a reference position based on the signal generated by the latch section in synchronization with the periodical signal generated by the position signal generating section.

According to a third aspect of the present invention, there is provided a displacement sensor which detects a positional displacement of a movable member, comprising:

a position signal generating section configured to generate a plurality of periodical signals in accordance with movement of the movable member;

a generating section of a signal for detecting a reference position, configured to generate the signal for detecting the reference position, when the movable member is in a predetermined position;

a selecting section configured to be capable of selecting one periodical signal from the periodical signals generated by the position signal generating section; and a reference position detection circuit configured to detect that the movable member is in a reference position, the detection being based on the signal for detecting the reference position generated by the generating section of the signal for detecting the reference position and being in synchronization with the periodical signal selected by the selecting section.

According to a fourth aspect of the present invention, there is provided a displacement sensor which irradiates a movable member with a light from a light source and receives a returned light by a light receiving section to detect a positional displacement of the movable member, comprising:

a position signal generating section configured to generate a periodical signal in accordance with movement of the movable member;

a generating section of a signal for detecting a reference position, configured to generate the signal for detecting the reference position, when the movable member is in a predetermined position; and a reference position detection circuit configured to detect that the movable member is in a reference position, the detection being based on the signal for detecting the reference position generated by the generating section of the signal for detecting the reference position and being in synchronization with the periodical signal generated by the position signal generating section, wherein the light source and light receiving section are formed in the same substrate by a semiconductor process.

According to a fifth aspect of the present invention, there is provided a displacement sensor which detects a positional displacement of a movable member, comprising:

a position signal generating section configured to generate a periodical signal in accordance with movement of the movable member;

a generating section of a signal for detecting a reference position, configured to generate the signal for detecting the reference position of position detection, when the movable member is in a predetermined position;

a reference position detection circuit configured to detect that the movable member is in a reference position, the detection being based on the signal for detecting the reference position generated by the generating section of the signal for detecting the reference position and being in synchronization with the periodical signal generated by the position signal generating section;

a selecting section configured to be capable of selecting a phase position to be synchronized from a plurality of phase positions on the periodical signal in the synchronization in the reference position detection circuit; and a judging section configured to detect an optimal synchronous position among the phase positions on the periodical signal.

According to a sixth aspect of the present invention, there is provided a displacement sensor which detects a positional displacement of a movable member, comprising:

a position signal generating section configured to generate a periodical signal in accordance with movement of the movable member;

a generating section of a signal for detecting a reference position, configured to generate the signal for detecting the reference position of position detection, when the movable member is in a predetermined position;

a latch section configured to latch the signal for detecting the reference position, generated by the generating section of the signal for detecting the reference position;

a reference position detection circuit configured to detect that the movable member is in a reference position based on a signal generated by the latch section in synchronization with the periodical signal generated by the position signal generating section;

a selecting section configured to be capable of selecting a phase position to be synchronized from a plurality of phase positions on the periodical signal in the synchronization in the reference position detection circuit; and a judging section configured to detect an optimal synchronous position among the phase positions on the periodical signal.

According to a seventh aspect of the present invention, there is provided a displacement sensor which detects a positional displacement of a movable member, comprising:

a position signal generating section configured to generate a periodical signal in accordance with movement of the movable member;

a generating section of signals for detecting a reference position, configured to generate a plurality of signals for detecting the reference position, having a mutual phase difference which is not integer times one period of the periodical signal, when the movable member is in a predetermined position;

a selecting section configured to be capable of selecting one signal for detecting the reference position from the signals for detecting the reference position, generated by the generating section of the signal for detecting the reference position;

a reference position detection circuit configured to detect that the movable member is in a reference position based on the selected signal for detecting the reference position in synchronization with the periodical signal generated by the position signal generating section; and a judging section configured to detect the signal for detecting the reference position, whose synchronization with the position signal is optimal among the signals for detecting the reference position.

According to an eighth aspect of the present invention, there is provided a displacement sensor which detects displacement amount based on a periodical signal generated in response to displacement of one of the position and angle of a movable member and which generates a reference position signal, when the movable member is in a predetermined range, the displacement sensor comprising:

a plurality of reference position signal generating position candidates where a reference position signal is generated; and a selecting section configured to select one candidate from the reference position signal generating position candidates and switch the reference position signal generating position to the candidate.

According to a ninth aspect of the present invention, there is provided a method for detecting an optimal reference position candidate of a displacement sensor which detects displacement amount based on a periodical signal generated in response to displacement of one of the position and angle of a movable member and which generates a reference position signal, when the movable member is in a predetermined range, the displacement sensor
generating a signal for detecting a reference position, when the movable member is in the predetermined range,
including a plurality of reference position signal generating position candidates being in a reference position signal generating position where the reference position signal is generated,
comprising: a selecting section configured to select one generating position candidate as the reference position signal generating position from the generating position candidates; and a judging section configured to detect an optimal generating position candidate from the reference position signal generating position candidates at a time of generation of the signal for detecting the reference position, and the selecting section being capable of selecting the reference position signal generating position based on a judgment result of the judging section, the method for detecting the optimal reference position candidate of the displacement sensor, comprising:

detecting the generation of the signal for detecting the reference position;

detecting the optimal reference position candidate by the judging section;

outputting the judgment result; and switching the setting of the reference position.

According to a tenth aspect of the present invention, there is provided a method for detecting an optimal reference position candidate of a displacement sensor which detects displacement amount based on a periodical signal generated in response to displacement of one of the position and angle of a movable member and which generates a reference position signal, when the movable member is in a predetermined range.

the displacement sensor generating a signal for detecting a reference position, when the movable member is in the predetermined range, including a plurality of reference position signal generating position candidates in a reference position signal generating position where the reference position signal is generated, comprising: a selecting section configured to select one generating position candidate as the reference position signal generating position from the generating position candidates; and a judging section configured to detect an optimal generating position candidate from the reference position signal generating position candidates at a time of generation of the signal for detecting the reference position, and the selecting section being capable of selecting the reference position signal generating position based on a judgment result of the judging section, the method for detecting the optimal reference position candidate of the displacement sensor, comprising:

detecting the generation of the signal for detecting the reference position;

detecting the optimal reference position candidate by the judging section;

outputting the judgment result;

judging whether setting reflects the judgment result; and switching the setting of the reference position only when judging that the setting is reflected.

According to an eleventh aspect of the present invention, there is provided a displacement sensor which detects displacement amount based on a periodical signal generated in response to displacement of one of the position and angle of a movable member and which generates a reference position signal, when the movable member is in a predetermined range, the sensor comprising:

a generating section of a signal for detecting a reference position configured to generate a signal for detecting the reference position, which is not necessarily synchronized with the periodical signal, when the movable member is in the predetermined range; and a stability judging section configured to judge stability of the existing reference position signal generating position based on a phase allowance with the periodical signal at a time of generation of the signal for detecting the reference position and in the reference position signal generating position.

According to a twelfth aspect of the present invention, there is provided a method for judging stability of reference position detection of a displacement sensor which detects displacement amount based on periodical signals generated in response to displacement of one of the position and angle of a movable member and which generates a reference position signal, when the movable member is in a reference position signal generating position as one of the predetermined position and angle, the displacement sensor generating a signal for detecting a reference position, when the movable member is in a predetermined range, and comprising a stability judging section configured to judge stability of the existing reference position signal generating position based on a phase allowance with the periodical signal at a time of generation of the signal for detecting the reference position and reference position signal generating position, the method for judging the stability of the reference position detection of the displacement sensor, comprising:

detecting the generation of the signal for detecting the reference position;

judging the stability of the existing reference position by the stability judging section; and outputting the judgment result.

According to a thirteenth aspect of the present invention, there is provided a displacement sensor which detects displacement amount based on a periodical signal generated in response to displacement of one of the position and angle of a movable member and which generates a reference position signal, when the movable member is in a predetermined range, the displacement sensor comprising:

a plurality of reference position signal generating position candidates where the reference position signals are generated;

judging means for detecting an optimal candidate from the reference position signal generating position candidates; and selecting means for selecting one candidate from the reference position signal generating position candidates and switching the reference position signal generating position to the candidate, wherein the selecting means is able to select the reference position signal generating position based on a judgment result from the judging means.

According to a fourteenth aspect of the present invention, there is provided a displacement sensor which detects displacement amount based on a periodical signal generated in response to displacement of one of the position and angle of a movable member and which generates a reference position signal, when the movable member is in a predetermined range, the displacement sensor comprising:

a plurality of reference position signal generating position candidates where the reference position signals are generated; and selecting means for selecting one candidate from the reference position signal generating position candidates and switching the reference position signal generating position to the candidate, wherein the reference position signal generating position candidates correspond to a plurality of phases of the periodical signal, and the selecting means is able to select and switch to one of a plurality of phase candidates as the phase of the reference position signal generating position.

According to a fifteenth aspect of the present invention, there is provided a displacement sensor which detects displacement amount based on a periodical signal generated in response to displacement of one of the position and angle of a movable member and which generates a reference position signal, when the movable member is in a predetermined range, the displacement sensor comprising:

generating means of a signal for detecting a reference position, for generating the signal for detecting the reference position, which is not necessarily synchronized with the periodical signal, when the movable member is in the predetermined range; and stability judging means for judging stability of the existing reference position signal generating position based on a phase allowance with the periodical signal at a time of generation of the signal for detecting the reference position and a reference position signal generating position.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a time chart showing a state of a change of each signal when displacement is caused in a direction reverse to that of FIG. 3;

FIG. 21 is a diagram showing the constitution of the judgment circuit in the signal processing circuit section of the encoder according to the eighth embodiment;

FIGS. 24A and 24B are diagrams showing two-dimensional graphs of a combination of signal levels of position signals (a), (b) to describe relations between position signals (a), (b) and signals for detecting a reference position (f1), (f2), (f3);

FIG. 46 is a diagram showing a stability judgment flow of the existing synchronous position;

FIG. 47 is a diagram showing another example of the stability judgment flow of the existing synchronous position;

DETAILED DESCRIPTION OF THE INVENTION

Embodiments of the present invention will be described hereinafter with reference to the drawings. It is to be noted that in the following embodiments, as a displacement sensor, a linear encoder for performing linear position detection will be described in an example, but the present invention is not limited to the linear encoder, and can needless to say be applied to displacement sensors for detecting various mechanical displacements such as a rotary encoder for detecting a rotary movement.

First Embodiment

[Constitution]

A constitution of a major part of the encoder according to a first embodiment of a displacement sensor of the present invention, except a signal processing circuit section, is not especially limited as long as a position signal (position detection signal) and a signal for detecting a reference position are obtained.

Figure 1:
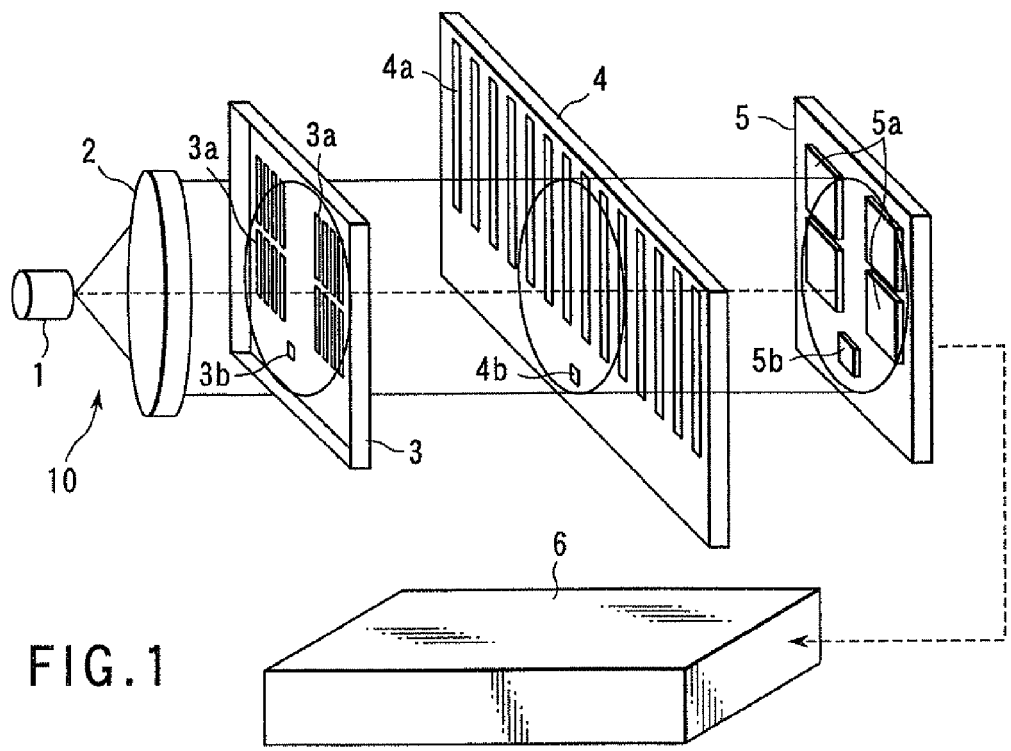
FIG. 1 is a diagram showing a constitution of a major part of an optical encoder according to a first embodiment of a displacement sensor of the present invention.

For example, general constitutions such as a constitution by an optical encoder shown in FIG. 1 can be applied. In the example of FIG. 1, the optical encoder has been described, but other types of encoders such as a magnetic encoder may also be used.

That is, as shown in FIG. 1, the optical encoder is constituted of: a light source section 10 in which a light emitting section 1 such as LED is combined with an optical device 2 for converting a beam light from the light emitting section 1 into a parallel light; an index scale 3 and scale 4 successively irradiated with the parallel light from the light source section 10; a photodetector 5 disposed on a side opposite to the light source section 10 as seen from the scale 4; and a signal processing circuit section 6 which processes a signal from the photodetector 5 to output an encoder signal.

In this constitution, for the index scale 3, scale 4, and photodetector 5, a combination of slits 3a formed in the index scale 3, slits 4a formed in the scale 4, and photo-detection sections 5a formed in the photodetector 5 is used for detecting positions. A combination of a slit 3b formed in the index scale 3, a slit 4b formed in the scale 4, and a photo-detection section 5b formed in the photodetector 5 is used for detecting a reference position.

In an object for detecting the position of a stage or motor, the combination of the light source section 10, index scale 3, and photodetector 5 is attached to either one of movable and fixed parts. The scale 4 is attached to the other of the movable and fixed parts.

Here, signals (A(+), A(−), B(+), B(−)) different from one another in phase by 90° are outputted from light receiving devices of the photo-detection sections 5a in accordance with the movement of the scale 4. For convenience of description in FIG. 3 described later, the signal A(+) is shown as a position signal (a), the signal B(+) is shown as a position signal (b), a signal (A(+)-A(−)) is shown as the position signal (a), a signal [B(+)-B(−)] is shown as the position signal (b), and the other signals are not shown. It is to be noted that a signal for detecting the reference position (e) is outputted from the light receiving device of the photo-detection section 5b as a Z phase signal outputted in detecting a reference position of the movable part. This signal for detecting the reference position (e) is an original signal for detecting the reference position, and is not necessarily synchronized with the position signals (a) and (b) which are periodical signals.

Figure 2:
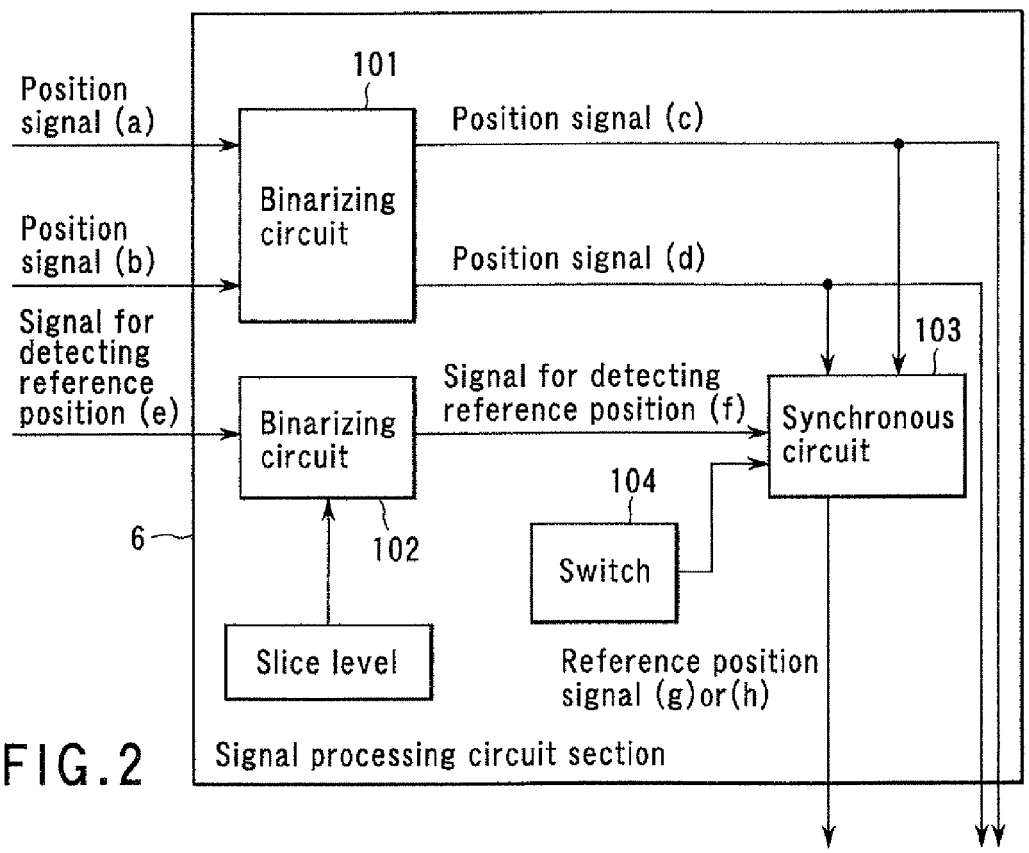
FIG. 2 is a block diagram showing the constitution of a signal processing circuit section in the encoder according to the first embodiment of the present invention.

FIG. 2 is a block diagram showing the constitution of the signal processing circuit section 6 in the encoder of FIG. 1 according to the first embodiment of the present invention. The signal processing circuit section 6 includes: a binarizing circuit 101 for converting analog position signals (a) and (b) to digital position signals (c) and (d); a binarizing circuit 102 for binarizing the signal for detecting the reference position (e) at a predetermined slice level to convert the signal to a digital signal for detecting the reference position (f); a synchronous circuit 103 for synchronizing the digital signal for detecting the reference position (f) from the binarizing circuit 102 with the digital position signals (c) and (d) from the binarizing circuit 101 to generate a reference position signal (g) or (h); and a switch 104 for switching a timing of synchronization in the synchronous circuit 103. It is to be noted that in FIG. 2, the reference position signal (g) or (h) is obtained in synchronization with the digital position signals (c) and (d), but the reference position signal (g) or (h) can also be obtained in synchronization with the analog position signal (a) or (b) by a similar function.

[Operation]

Figure 3:
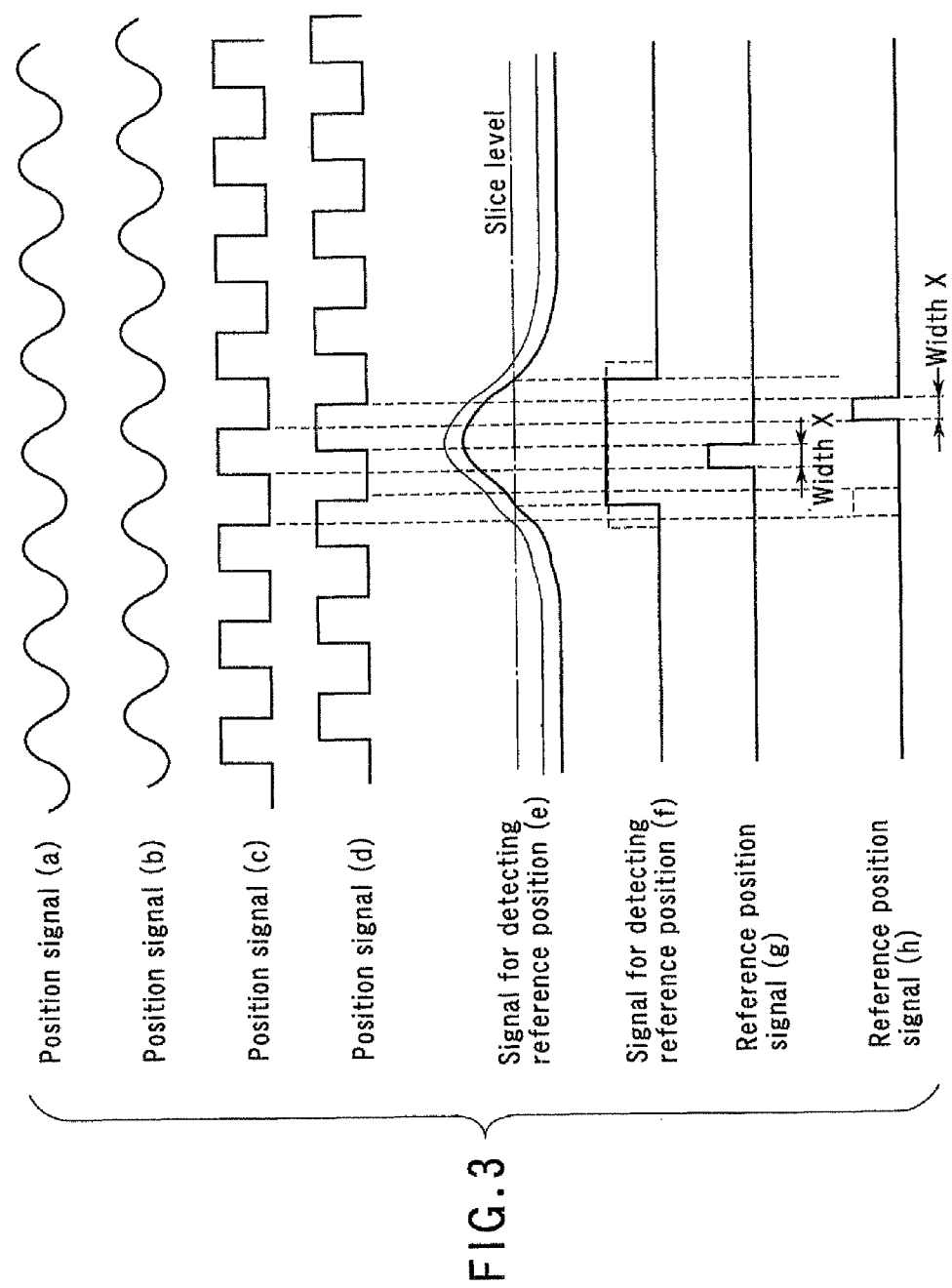
FIG. 3 is a time chart showing that an input from a photodetector is processed by the signal processing circuit of FIG. 2.

FIG. 3 is a time chart showing that an input from the photodetector 5 shown in FIG. 1 is processed by the signal processing circuit section 6 of FIG. 2. In FIG. 3, the horizontal axis indicates time, and shows a change of each signal when displacement at a constant speed is caused.

That is, in the binarizing circuit 101, the analog position signals (a) and (b) of the encoder which periodically change with the displacement (relative movement of the scale 4) are binarized to obtain the digital position signals (c) and (d). In the binarizing circuit 102, the signal for detecting the reference position (e) is binarized at a predetermined slice level to obtain the digital signal for detecting the reference position (f).

Moreover, one is selected from the following two methods to obtain the reference position signal. That is, in the first method, in the synchronous circuit 103, the digital signal for detecting the reference position (f) is synchronized with a rise of the position signal (a) or (c) to obtain a high level, and synchronized with a level change of the position signal (b) or (d) to obtain a low level, so that the reference position signal (g) is obtained. In the second method, in the synchronous circuit 103, the digital signal for detecting the reference position (f) is synchronized with a fall of the position signal (a) or (c) to obtain the high level, and synchronized with the level change of the position signal (b) or (d) to obtain the low level, so that the reference position signal (h) is obtained. One is selected from these two methods to output the reference position signal (g) or (h). This selection is carried out by the switch 104.

Here, the position signals (a) and (c) have a phase difference of 90° from the position signals (b) and (d). It is to be noted that the position signal (a) and (b) and the signal for detecting the reference position (e) which are analog signals may be signals of any type as long as the position signals (c) and (d) and the signal for detecting the reference position (f) which are digital signals can be created. Furthermore, the inputs from the photodetector 5 shown in FIG. 1 may be only the digital signals, and may not include any analog signal. When the inputted analog position signal is digitized, a resolution may be enhanced by phase interpolation.

Moreover, the position detection is carried out by inputting the digital position signals (c) and (d) into a counter (not shown). In this case, when the reference position signal (g) or (h) is generated, the counter is reset, and it is accordingly possible to obtain the reference position of the position detection.

As described above, the signal for detecting the reference position (e) is digitized to make the digital signal for detecting the reference position (f), and the digital signal for detecting the reference position (f) is synchronized with the position signals (c) and (d) which are periodical signals to generate the reference position signal (g) or (h). At this time, even when there are a plurality of timings satisfying one period condition in one reference position detection, the reference position signal (g) or (h) is constituted to be generated only at an earliest condition satisfying timing. This also applies to the respective embodiments described later.

[Effect]

According to the first embodiment, it is possible to select the synchronous position with the position signal in accordance with a way of output of the signal for detecting the reference position.

Therefore, it is possible to select the synchronous position which reduces a deviation of a reference position possibly caused by unstable factors such as a signal noise or wobble, and further stability of a light source, temperature characteristics of a light emitting/receiving device and fluctuations, and deviations from designs of individual encoders in the optical encoder. For example, it is considered that by the above-described unstable factors, an output level of the signal for detecting the reference position (e) of FIG. 3 is raised, or shifted in a left direction in the figure, or a slice level slightly drops. At this time, assuming that the signal for detecting the reference position (e) changes to a fine line from a bold line, the digital signal for detecting the reference position (f) changes as shown by a broken line. Accordingly, a position deviating by one period as shown by the broken line in the reference position signal (h) is detected as the reference position signal. On the other hand, this change does not easily occur in the reference position signal (g). Therefore, in this case, the reference position signal (g) is selected, deterioration of reference position detection precision is accordingly inhibited, and it is possible to stably detect the reference position.

Moreover, in the present embodiment, except the signal processing circuit section 6, a member for generating an auxiliary signal for detecting the reference position is not disposed. Therefore, the reference position can stably be detected, and it is possible to supply a small-sized and inexpensive encoder.

Second Embodiment

[Constitution]

The constitution of the major part of a second embodiment is not especially limited as long as the position signal and the signal for detecting the reference position are obtained except the signal processing circuit section 6 in the same manner as in the first embodiment. For example, a general constitution may be used such as an optical encoder constitution shown as the constitution of the major part of the above-described first embodiment in FIG. 1. In the example of FIG. 1, the optical encoder has been described, but the other types such as the magnetic encoder may also be used. The constitution of the signal processing circuit section 6 in the encoder of FIG. 1 according to the second embodiment of the present invention may be similar to that of the block diagram shown in FIG. 2. It is to be noted that in FIG. 2, the reference position signal (g) or (h) is obtained in synchronization with the digital position signals (c) and (d), but the reference position signal (g) or (h) can also be obtained in synchronization with the analog position signals (a) and (b).

Figure 4:
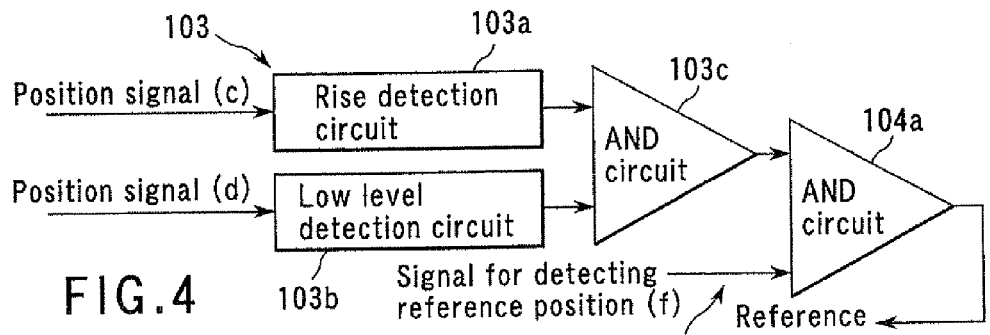
FIG. 4 is a block diagram showing each detailed constitution of a switch in FIG. 2 and a synchronous circuit switched by the switch in order to select a reference position signal (g) in the encoder according to a second embodiment of the present invention.
Figure 5:
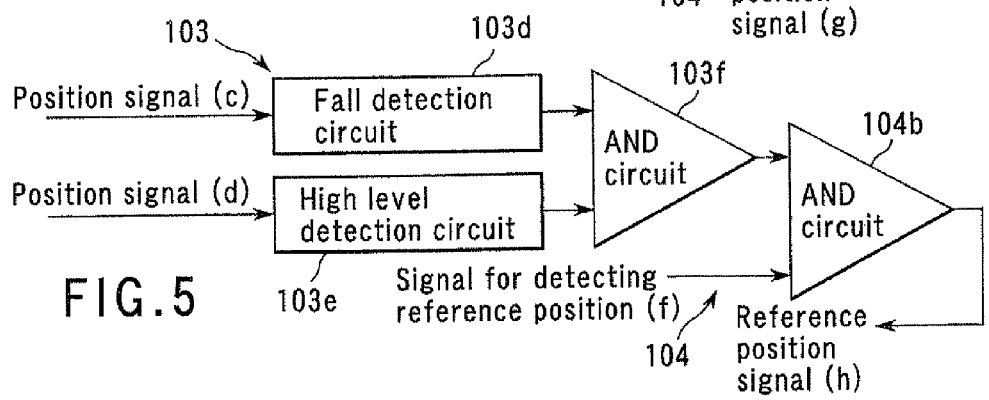
FIG. 5 is a block diagram showing each detailed constitution of the switch in FIG. 2 and the synchronous circuit switched by the switch in order to select a reference position signal (h) in the encoder according to the second embodiment of the present invention.

FIGS. 4 and 5 are block diagrams showing each detailed constitution of the switch 104 in FIG. 2 and the synchronous circuit 103 switched by the switch 104 in order to select the reference position signal (g) or (h). These circuits can easily and inexpensively be manufactured by a generally obtainable logic ICs.

That is, in the constitution shown in FIG. 4, as components constituting the synchronous circuit 103, there are disposed a rise detection circuit 103a of the position signal (c), a low level detection circuit 103*b* of the position signal (d), and an AND circuit 103*c* which obtains a logical product of outputs from the rise detection circuit 103*a* and low level detection circuit 103*b*. As the components constituting the switch 104, there is disposed an AND circuit 104*a* which obtains the logical product of the output from the AND circuit 103*c* and the digital signal for detecting the reference position (f). Moreover, the reference position signal (g) is outputted from the AND circuit 104*a*.

On the other hand, in the constitution shown in FIG. 5, as the components constituting the synchronous circuit 103, there are disposed a fall detection circuit 103*d* of the position signal (c), a high level detection circuit 103*e* of the position signal (d), and an AND circuit 103*f* which obtains the logical product of the outputs from the fall detection circuit 103*d* and high level detection circuit 103*e*. As the components constituting the switch 104, there is disposed an AND circuit 104*b* which obtains the logical product of the output from the AND circuit 103*f* and the digital signal for detecting the reference position (f). Moreover, the reference position signal (h) is outputted from the AND circuit 104*b*.

[Operation]

Even in this second embodiment, the state of the processing of the input from the photodetector 5 by the signal processing circuit section 6 is similar to that of the time chart according to the first embodiment shown in FIG. 3.

Moreover, FIG. 6 is a time chart showing the state of a change of each signal when displacement is caused in a direction reverse to that of FIG. 3. At this time, progresses of phases of the analog position signals (a) and (b) and the digital position signals (c) and (d) are reversed with respect to those in FIG. 3. When the displacement is caused in an opposite direction, the synchronous circuit 103 carries out the process shown in FIG. 6 in the circuit constitution shown in FIGS. 4 and 5, and accordingly the reference position signal is not brought in a detected state. Therefore, the reference position is not detected in the displacement of the opposite direction.

It is to be noted that when the synchronous circuit 103 shown in FIGS. 4 and 5 is appropriately designed, the reference position can also be detected only with the displacement of the opposite direction.

[Effect]

Even in this second embodiment, an effect similar to that of the above-described first embodiment is obtained.

Moreover, as a peculiar effect by the present embodiment, it is possible to detect the reference position, only when the displacement is caused in a given direction. This produces advantages that the detection is not easily influenced by backlashes of the movable part and the reference position does not have to be doubly detected at the reference position detection time. The reference position detection high in precision and convenient in use is possible.

Third Embodiment

[Constitution]

The constitution of the major part of a third embodiment is not especially limited as long as the position signal and the signal for detecting the reference position are not obtained except the signal processing circuit section 6 in the same manner as in the first and second embodiments. For example, the general constitution may be used such as the optical encoder constitution shown as the constitution of the major part of the above-described first embodiment in FIG. 1. In the example of FIG. 1, the optical encoder has been described, but the other types such as the magnetic encoder may also be used.

Figure 7:
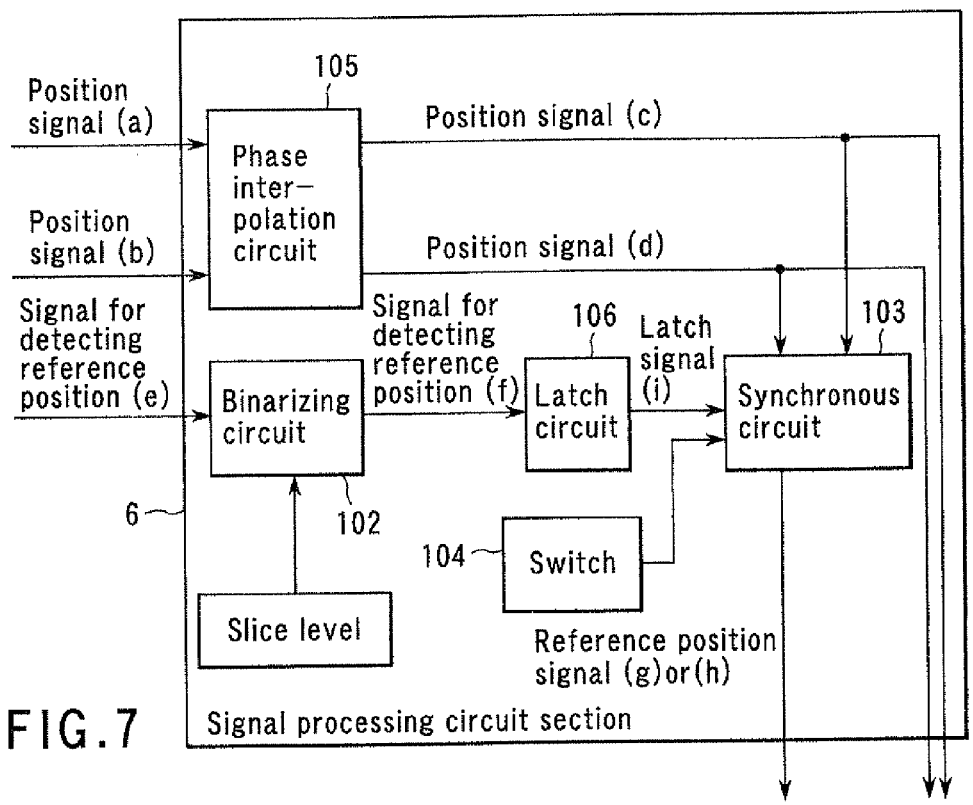
FIG. 7 is a block diagram showing the constitution of the signal processing circuit section of the encoder according to a third embodiment of the present invention.

FIG. 7 is a block diagram showing the constitution of the signal processing circuit section 6 of the encoder according to the third embodiment of the displacement sensor of the present invention. The signal processing circuit section 6 according to the third embodiment includes: a phase interpolation circuit 105 for phase-dividing the analog position signals (a) and (b) to convert the signals into the digital position signals (c) and (d); the binarizing circuit 102 for binarizing the signal for detecting the reference position (e) at the predetermined slice level to convert the signal into the digital signal for detecting the reference position (f); a latch circuit 106 for holding rise of the digital signal for detecting the reference position (f) to form a latch signal (i); the synchronous circuit 103 for synchronizing the latch signal (i) from the latch circuit 106 with the position signals (a) and (d) to generate the reference position signal (g) or (h); and the switch 104 for switching a timing of synchronization in the synchronous circuit 103. In the signal processing circuit section 6 of the constitution shown in FIG. 7, as described later, the rise of the position signal (a) is detected at a point passing a center of amplitude. The reference position signal (g) or (h) is obtained in synchronization with the position signals (a) and (d), but an appropriate signal may be selected from the position signals (a), (b), (c), and (d) and synchronized.

[Operation]

Figure 8:
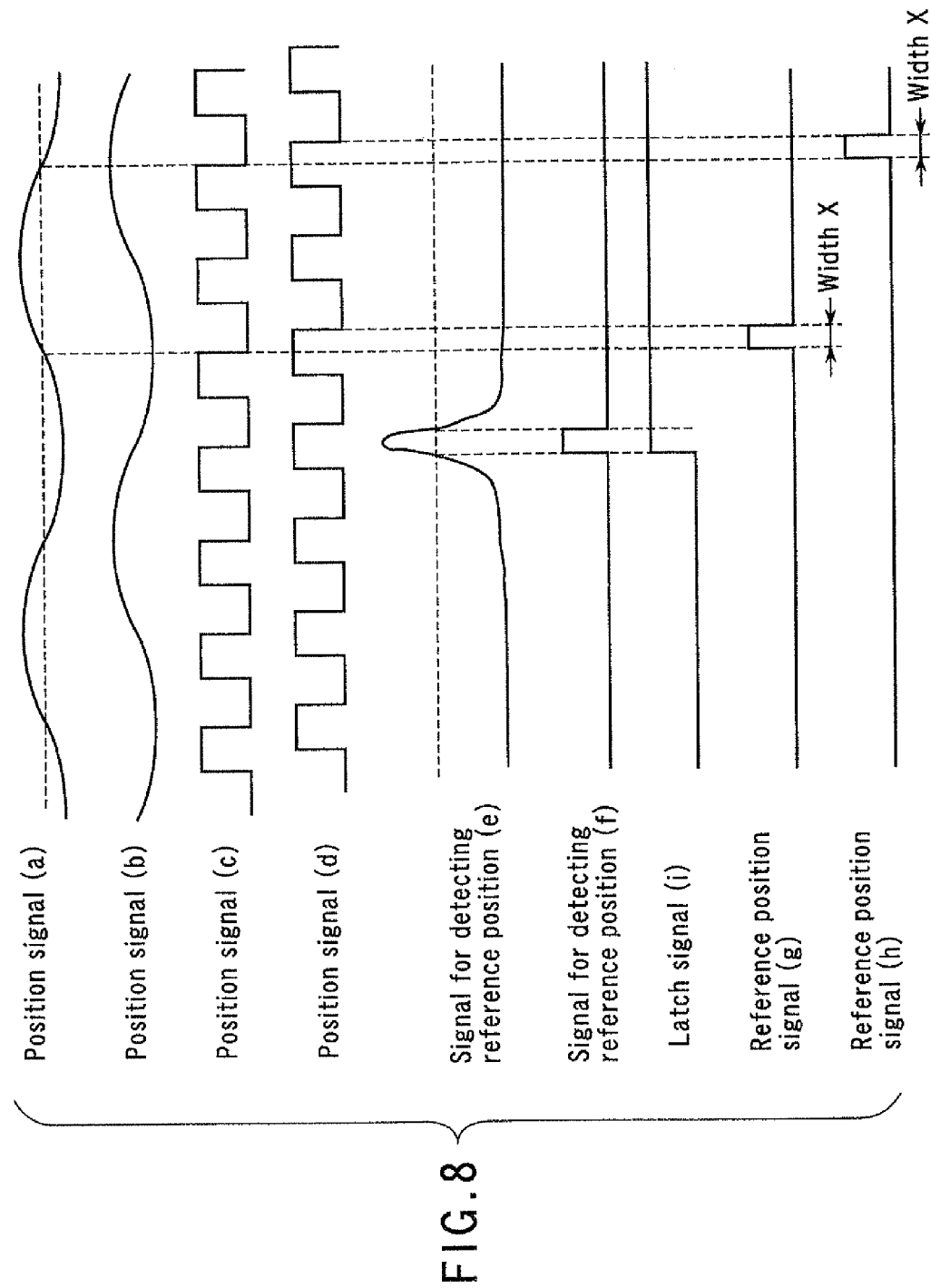
FIG. 8 is a time chart showing that the input from the photodetector is processed in the signal processing circuit section of the encoder according to the third embodiment.

FIG. 8 is a time chart showing that the input from the photodetector 5 shown in FIG. 1 is processed by the signal processing circuit section 6 of FIG. 7. In FIG. 8, the horizontal axis indicates time, and shows the change of each signal when the displacement at the constant speed is caused.

That is, in the phase interpolation circuit 105, the analog position signals (a) and (b) which periodically change with the displacement (relative movement of the scale 4) are phase-divided and binarized, so that the digital position signals (c) and (d) are obtained. In the binarizing circuit 102, the signal for detecting the reference position (e) is binarized at the predetermined slice level to obtain the digital signal for detecting the reference position (f). Moreover, in the latch circuit 106, the rise of the digital signal for detecting the reference position (f) from the binarizing circuit 102 is detected to set the latch signal (i) to a high level.

Moreover, the reference position signal is obtained in a region where the latch signal (i) has the high level. In this case, rather than to obtain the signal in the region where the latch signal (i) has the high level, to be more precise, the high level is held until the reference position signal is detected. That is, the latch circuit 106 functions so as to hold the level of the latch signal (i) until the timing of synchronization in order to synchronize the reference position detection with the position signals (a) and (d). Accordingly, even when the original digital signal for detecting the reference position (f) is brought in a non-detection state, the reference position can securely be detected in synchronization with the position signal. The latch signal (i) in the latch circuit 106 needs to be cleared from when the reference position is detected until the next reference position is detected.

Moreover, one is selected from the following two methods to obtain the reference position signal. In the first method, in the synchronous circuit 103, the latch signal (i) is synchronized with the rise of the position signal (a) to obtain the high level, and synchronized with the level change of the position signal (d) to obtain the low level, so that the reference position signal (g) is obtained. In the second method, in the synchronous circuit 103, the latch signal (i) is synchronized with the fall of the position signal (a) to obtain the high level, and synchronized with the level change of the position signal (d) to obtain the low level, so that the reference position signal (h)

is obtained. One is selected from these two methods to output the reference position signal (g) or (h). This selection is carried out by the switch 104.

Here, the position signals (a) and (c) have a phase difference of 90° from the position signals (b) and (d). The position signals (a) and (b) and the signal for detecting the reference position (e) which are analog signals may be the signals of any type as long as the position signals (c) and (d) and the signal for detecting the reference position (f) which are digital signals can be created. Furthermore, the inputs may be only the digital signals, and may not include any analog signal.

Moreover, the position detection is carried out by inputting the digital position signals (c) and (d) into the counter (not shown). In this case, when the reference position signal (g) or (h) is generated, the counter is reset, and it is accordingly possible to obtain the reference position of the position detection.

[Effect]

According to the present embodiment, it is possible to select the synchronous position with the position signal in accordance with the way of output of the signal for detecting the reference position. Therefore, it is possible to select the synchronous position which reduces the deviation of the reference position possibly caused by unstable factors such as the signal noise or wobble, further stability of the light source, temperature characteristics of the light emitting/receiving device and fluctuations, and deviations from designs of individual encoders in the optical encoder.

Furthermore, as the effect peculiar to the present embodiment, the signal for detecting the reference position (e) is held by the latch circuit 106. Therefore, when a detection width of the digital signal for detecting the reference position (f) is reduced, and even after the detection state is eliminated, it is possible to synchronize the signal with the position signal. Therefore, even with respect to the change of the output level of the signal for detecting the reference position (e) shown in FIG. 8 or the change of the shift or slice level in a left/right direction in the figure by the above-described unstable factors, tolerance is enhanced.

Moreover, when the rise position of the latch signal (i) can be designed/disposed in a position ahead of the synchronous position of the phase A by about 180°, an allowance of ±180° is produced. That is, there is a positional deviation tolerance of ±½ times a pitch of the position signal. Even when it is difficult to set the phase difference between the rise position of the latch signal (i) and the synchronous position of the phase A, an allowance of ±90° or more is generated by selecting the synchronous position. Therefore, when the reference position signal (g) or (h) is selected, the deterioration of the reference position detection precision is inhibited, and the stable reference position detection is possible.

Furthermore, in this embodiment, except the signal processing circuit section 6, the member for generating the auxiliary signal for detecting the reference position is not disposed. Therefore, the reference position can stably be detected, and it is possible to supply the small-sized and inexpensive encoder.

Additionally, by using a synchronous method having a limiting function with the position signal in a detection direction as described in the second embodiment, it is possible to detect the reference position, only when the displacement is caused in a reference position given direction. This produces the advantages that the detection is not easily influenced by the backlashes of the movable part and the reference position does not have to be doubly detected at the reference position detection time. The reference position detection high in precision and convenient in use is possible.

Fourth Embodiment

[Constitution]

Figure 9:
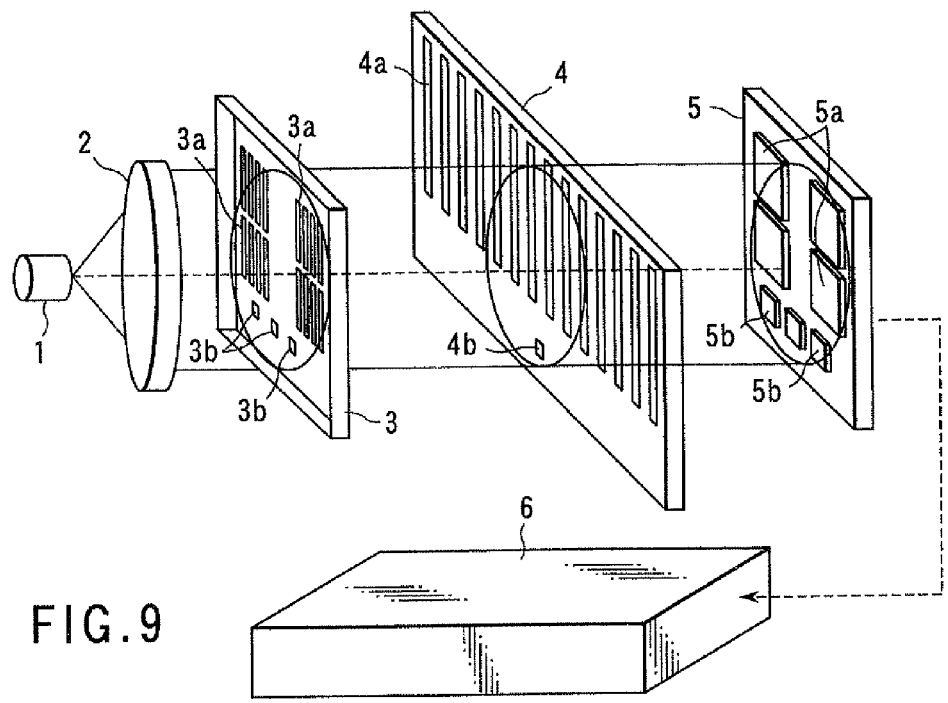
FIG. 9 is a diagram showing the constitution of the major part of the encoder according to a fourth embodiment of the present invention.

FIG. 9 is a diagram showing the constitution of the major part of the encoder according to a fourth embodiment of the displacement sensor of the present invention. Additionally, needless to say, except the signal processing circuit section, the constitution is not especially limited to this constitution as long as the position signal and the signal for detecting the reference position are obtained.

As shown in FIG. 9, the optical encoder according to the fourth embodiment is constituted of: the light source section 10 in which the light emitting section 1 such as LED is combined with the optical device 2 for converting the beam light from the light emitting section 1 into the parallel light; the index scale 3 and scale 4 successively irradiated with the parallel light from the light source section 10; the photodetector 5 disposed on the side opposite to the light source section 10 as seen from the scale 4; and the signal processing circuit section 6 which processes the signal from the photodetector 5 to output the encoder signal.

In this constitution, for the index scale 3, scale 4, and photodetector 5, the combination of the slits 3a formed in the index scale 3, the slits 4a formed in the scale 4, and the photo-detection sections 5a formed in the photodetector 5 is used for detecting the positions. The combination of the slits 3b formed in the index scale 3, the slit 4b formed in the scale 4, and the photo-detection sections 5b formed in the photodetector 5 is used for detecting the reference position.

In the object for detecting the position of the stage or motor, the combination of the light source section 10, index scale 3, and photodetector 5 is attached to either one of the movable and fixed parts. The scale 4 is attached to the other of the movable and fixed parts.

Moreover, in the present embodiment, three each of the slits 3b and photo-detection sections 5b for detecting the reference position are disposed in the index scale 3 and photodetector 5. All three respective detection signals in these three photo-detection sections 5b have similar waveform patterns, and the phase difference satisfies the following equation:

Phase difference α=[one period of position signal]× (i+1/3)     (Equation 1)

where i is an integer.

It is to be noted that the optical encoder has been described in the present embodiment, but the other types such as the magnetic type may also be used.

Figure 10:
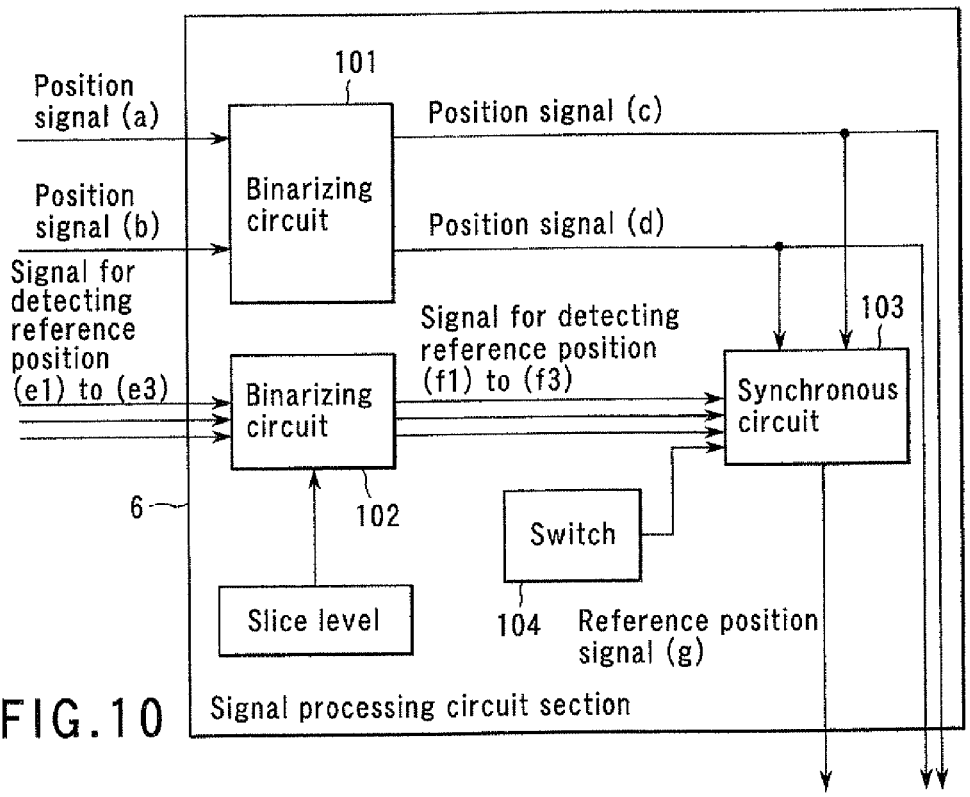
FIG. 10 is a block diagram showing the constitution of the signal processing circuit section of the encoder according to the fourth embodiment.

FIG. 10 is a block diagram showing the constitution of the signal processing circuit section 6 in the encoder according to the fourth embodiment of the present invention. That is, the signal processing circuit section 6 includes: the binarizing circuit 101 for converting the analog position signals (a) and (b) to the digital position signals (c) and (d); the binarizing circuit 102 for binarizing signals for detecting the reference position (e1), (e2), and (e3) at the predetermined slice level to convert the signals to digital signals for detecting the reference position (f1), (f2), and (f3); the synchronous circuit 103 for synchronizing one of the digital signals for detecting the reference position (f1), (f2), and (f3) from the binarizing circuit 102 with the digital position signals (c) and (d) from the binarizing circuit 101 to generate the reference position signal (g); and the switch 104 for switching the timing of synchronization in the synchronous circuit 103.

It is to be noted that in FIG. 10, the reference position signal (g) is obtained in synchronization with the digital position signals (c) and (d), but the reference position signal (g) can also be obtained in synchronization with the analog position signals (a) and (b) by the similar function. Moreover, as described later, in this embodiment, the reference position signal (g) is detected in synchronization with the position signal (a), but this can be realized by the similar function even in synchronization with the position signal (b), (c), or (d).

It is to be noted that in the present embodiment, the synchronous circuit is disposed in order to exactly synchronize the reference position signal with the position detection signal. However, if there is no problem even in a constitution for exactly determining the phase of the signal for detecting the position in the detection position of the signal for detecting the reference position or even when the reference position signal generating position is not exactly synchronized with the position detection signal, it is possible to omit the synchronous circuit and to set the detection position of the signal for detecting the reference position as the reference position signal generating position.

[Operation]

Figure 11:
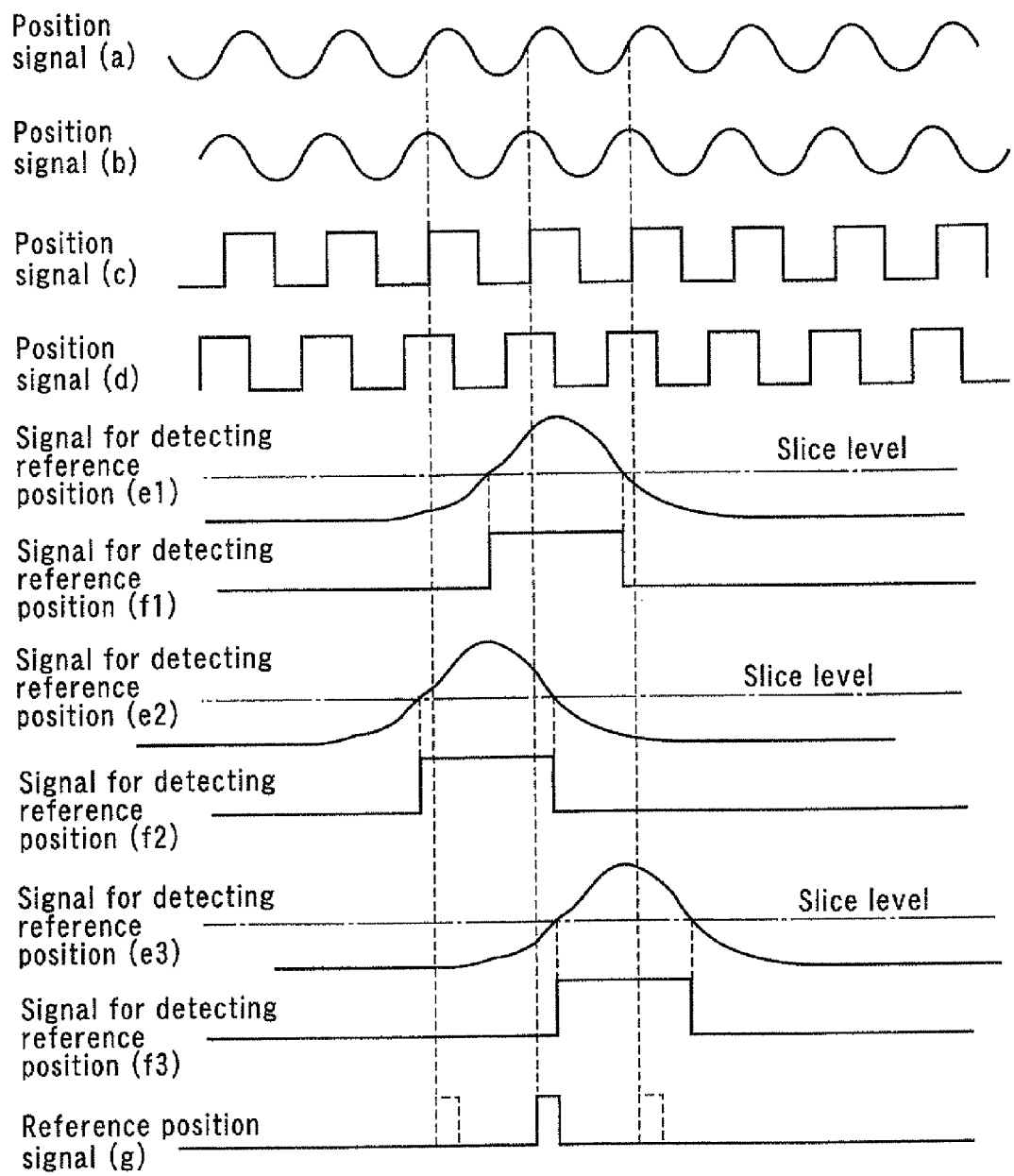
FIG. 11 is a time chart showing that the input from the photodetector is processed in the signal processing circuit section of FIG. 10.

FIG. 11 is a time chart showing that the input from the photodetector 5 shown in FIG. 9 is processed by the signal processing circuit section 6 of FIG. 10. In FIG. 11, the horizontal axis indicates time, and shows the change of each signal when the displacement at the constant speed is caused.

That is, in the binarizing circuit 101, the analog position signals (a) and (b) of the encoder which periodically change with the displacement (relative movement of the scale 4) are binarized to obtain the digital position signals (c) and (d). In the binarizing circuit 102, the signals for detecting the reference position (e1), (e2), and (e3) are binarized at the predetermined slice level to obtain the digital signals for detecting the reference position (f1), (f2), and (f3). Moreover, in the synchronous circuit 103, one of these digital signals for detecting the reference position (f1), (f2), and (f3) is selected in response to the switch 104. In this case, in the synchronous circuit 103, when the selected digital signal for detecting the reference position is brought in the detection state, the signal is synchronized with the rise of the position signal (a) or (c) to obtain the high level, and synchronized with the level change of the position signal (b) or (d) to obtain the low level, so that the reference position signal (g) is obtained. It is to be noted that in FIG. 11, the detection state parts of the reference position signal (g) corresponding to the digital signals for detecting the reference position (f1), (f2), and (f3) correspond to parts of a solid line, fine dotted line, and dotted line in pulse-shaped parts.

Here, the position signals (a) and (c) have the phase difference of 90° from the position signals (b) and (d). It is to be noted that the position signals (a) and (b) and the signals for detecting the reference position (e1), (e2), and (e3) which are analog signals may be signals of any type as long as the position signals (c) and (d) and the signals for detecting the reference position (f1), (f2), and (f3) which are digital signals can be created. Furthermore, the inputs from a detection system are only the digital signals, and may not include any analog signal. When the position signal is digitized, the resolution may be enhanced by the phase interpolation.

The position detection is carried out by inputting the digital position signals (c) and (d) into the counter (not shown). Moreover, when the reference position signal (g) is generated, the counter is reset, and it is accordingly possible to obtain the reference position of the position detection.

[Effect]

According to the present embodiment, when one is selected from a plurality of signals for detecting the reference position, it is possible to select the synchronous position with the position signal.

Therefore, it is possible to select the synchronous position which reduces the deviation of the reference position possibly caused by the unstable factors such as the signal noise or wobble, further, in the optical encoder, the stability of the light source, temperature characteristics of the light emitting/receiving device and there fluctuations, and the deviations from designs of individual encoders. For example, it is supposed that by the above-described unstable factors, the output levels of the signals for detecting the reference position (e1), (e2), and (e3) shown in FIG. 11 change, or shift in the left/right direction in the figure, or the slice level slightly increases/decreases. At this time, the reference position signal (g) generated using the signals for detecting the reference position (e1) and (e3) is relatively stable. With the use of the signal for detecting the reference position (e2), since the signal is in the vicinity of the synchronous circuit with the position signal, the signal easily becomes unstable. In this case, a difference for one period or more is sometimes generated in the obtained reference position. However, when only one of the signals is constantly used, there is no practical problem.

It is to be noted that as the way of synchronization, there is also a method for measuring the displacement in the vicinity of the reference position while synchronizing the signal for detecting the reference position with the position signal. In this case, the signal for detecting the reference position (e2) having a small difference is preferably used. In this case, there is a tolerance of detection position deviation for ±1 period at maximum.

Therefore, when the reference position signal (g) is selected by the above-described method, the deterioration of the reference position detection precision is inhibited, and the stable reference position detection is possible.

Fifth Embodiment

[Constitution]

Figure 12:
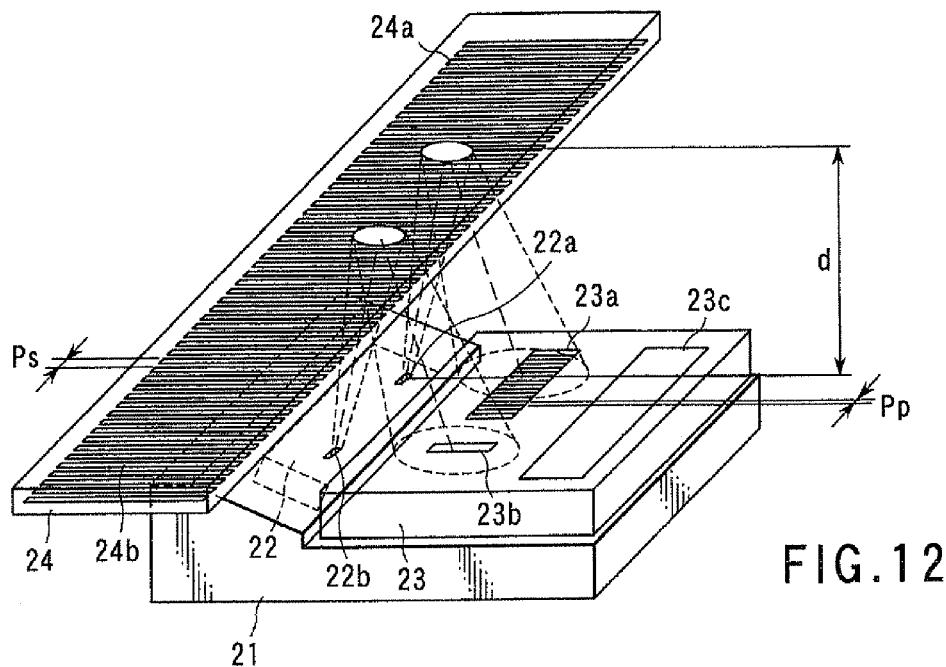
FIG. 12 is a diagram showing the constitution of the major part of the encoder according to a fifth embodiment of the present invention.

FIG. 12 is a diagram showing the constitution of the major part of the encoder according to a fifth embodiment of the displacement sensor of the present invention. In FIG. 12, the encoder is roughly divided into four parts including a base 21, surface light emitting laser 22, photo IC 23, and scale 24. The base 21, surface light emitting laser 22, and photo IC 23 are integrally constituted as a main body, and held while keeping adequate postures with a gap d with respect to the scale 24. On the base 21, there are formed: the surface light emitting laser 22 including a beam emission port 22a and an emission port 22b which are disposed obliquely with respect to the scale 24; and the photo IC 23 including a light receiving array section 23a in which elements having the same structure are arranged at pitches Pp, a light receiving section 23b, and a signal processing circuit 23c. The beam emission port 22a and emission port 22b are molded integrally with the surface light emitting laser 22 as a light source by a semiconductor process. The wavelength of the light source is set to about 800 nm to 1000 nm, and the light receiving array section is a semiconductor including a silicon base. It is to be noted that when the light sources having different wavelengths are used, the light receiving section desirable for detecting the wavelength can be used to handle the difference. The signal processing circuit 23c includes a normalizing circuit which carries out gain offset adjustment of the signals of a laser driving circuit, the light receiving array section 23a, and the light receiving section 23b.

Here, one of sums of signals of four array elements of the light receiving array section 23a is assumed to be a signal A(+), the sum of the signals of neighboring four array elements is a signal B(+), the sum of the signals of further neighboring four array elements is a signal A(−), and the sum of the signals of the remaining four array elements is a signal B(−). Moreover, assuming that a signal [A(+)-A(−)] is a signal (A), and a signal [B(+)-B(−)] is a signal (B), the signal processing circuit 23c is constituted to output the two signals (A), (B) as encoder signals.

The scale 24 includes a position detection pattern 24a in which two patterns having different reflection factors are arranged at a pitch Ps of several tens of micrometers, and a pattern for detecting the reference position 24b is formed in the end of the position detection pattern.

Here, the pitch Pp of the elements of the light receiving array section 23a and the pitch Ps of the position detection pattern 24a have the following relation:

Pp=2Ps     (Equation 2)

Moreover, the laser beam emitted from the beam emission port 22a is incident upon the position detection pattern 24a of the scale 24 with a spread, and the laser beam diffracted by the position detection pattern 24a is incident upon the light receiving array section 23a. The section and pattern are constituted and arranged in this manner. It is to be noted that when the laser beam is parallel light, the light source, scale, and light receiving section may be disposed to satisfy image forming conditions of a diffracted image.

The surface light emitting laser 22 and photo IC 23 are disposed so that heights in a z direction in FIG. 12 are equal. The gap d is determined so as to form an image twice the position detection pattern 24a in the light receiving array section 23a. This gap is determined in a range in which the resolution becomes high by the wavelength and emission angle of the laser beam.

It is to be noted that in the present embodiment, the diffracted image by reflection in the scale surface is used, but it is possible to use a transmitted light and to dispose the light receiving section above the scale in FIG. 12. In this case, the gap between the light source and scale, and the gap between the scale and light receiving section are selected so that the resolution becomes high by the wavelength and emission angle, and a distance between two gaps may not necessarily be equal. Additionally, when two gap amounts differ, the following relation is established between the scale pitch and the pitch of the light receiving array section:

Ps:Pp=(gap amount between the light source and scale):(gap amount between the light source and scale+gap amount between the scale and light receiving section).

The scale 24 is designed so that the laser beam of the beam emission port 22b is diffracted by the pattern for detecting the reference position 24b, and focused on the light receiving section 23b, when the pattern for detecting the reference position 24b is in a predetermined position with respect to the gap defined as described above.

Here, the base 21 and scale 24 are disposed so that the base and scale can move with respect to each other at a constant gap d in a pitch direction of the scale 24, that is, in an x direction of the surface light emitting laser 22. Moreover, a beam emission interval of the surface light emitting laser 22 is designed so that a phase difference of the position signal at a reference position detection time from the signal A is ½ of one period of the position signal. The surface light emitting laser 22 and photo IC 23 are both prepared in the semiconductor process, and the processing precision is several micrometers or less.

Figure 13:
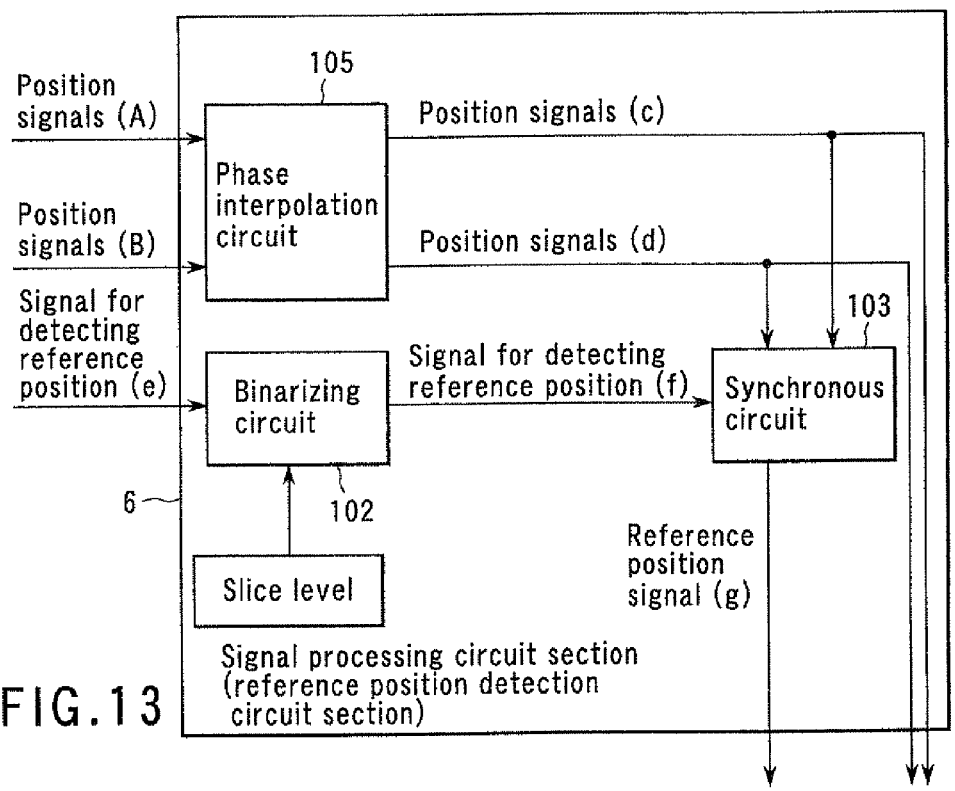
FIG. 13 is a block diagram showing the constitution of the signal processing circuit section (reference position detection circuit section) of the encoder according to the fifth embodiment.

FIG. 13 is a block diagram showing the constitution of the signal processing circuit section (reference position detection circuit section) 6 in the encoder according to the fifth embodiment of the present invention. The signal processing circuit section (reference position detection circuit section) 6 includes: the phase interpolation circuit 105 for phase-dividing the analog position signals (a) and (b) to convert the signals to the digital signals (c) and (d); the binarizing circuit 102 for binarizing the signal for detecting the reference position (e) at the predetermined slice level to convert the signal to the digital signal for detecting the reference position (f); and the synchronous circuit 103 for synchronizing the digital signal for detecting the reference position (f) with the rise of the position signal (A) to generate the reference position signal (g). In FIG. 13, the rise of the position signal (A) is detected in the point passing the center of the amplitude as described later. The reference position signal (g) is obtained in synchronization with the rise of the position signal (A), but may be synchronized with an appropriate signal selected from the position signals (A), (B), (c), and (d).

[Operation]

First, a position detection function as an encoder will be described. The laser beam emitted from the surface light emitting laser 22 is incident upon the position detection pattern 24a of the scale 24, and the laser beam reflected by the position detection pattern 24a is detected by the light receiving array section 23a. Moreover, when the base 21 and scale 24 move with respect to each other, intensity of an electric signal detected as a triangular wave by the light receiving array section 23a changes. Since two electric signals (phase signals (A), (B)) detected by the light receiving array section 23a have a phase difference of a ¼ period, these two signals can be used to know a movement amount of the relative movement of the base 21 and scale 24 including a relative movement direction. The position is detected by the input of the digital position signals (c) and (d) into the counter (not shown).

Figure 14:
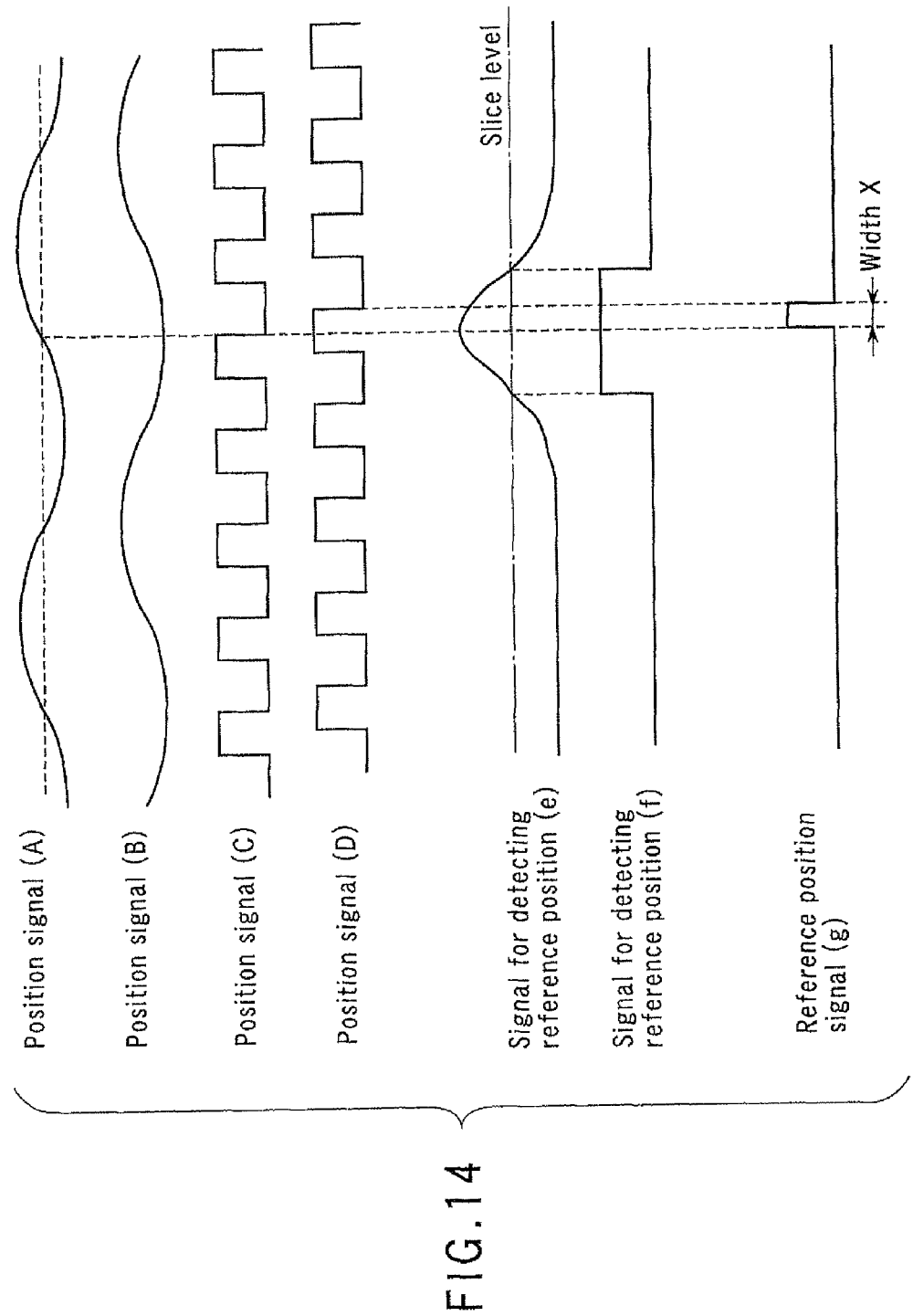
FIG. 14 is a time chart showing that the input is processed by the signal processing circuit section (reference position detection circuit section) of FIG. 13.

Next, a procedure of reference position detection will be described. FIG. 14 is a time chart showing that the input from the signal processing circuit 23c (light receiving array section 23a and light receiving section 23b) is processed by the signal processing circuit section (reference position detection circuit section) 6 of FIG. 13. In FIG. 14, the horizontal axis indicates time, and shows the change of each signal when the displacement at the constant speed is caused.

That is, in the phase interpolation circuit 105, the analog position signals (A) and (B) of the encoder which periodically change with the displacement (relative movement of the scale 4) are phase-divided and binarized, so that the digital position signals (c) and (d) are obtained. In the binarizing circuit 102, the signal for detecting the reference position (e) is binarized at the predetermined slice level to obtain the digital signal for detecting the reference position (f). Moreover, in the synchronous circuit 103, the signal for detecting the reference position (f) is synchronized with the rise of the position signal (A) to obtain the high level, and synchronized with the level change of the position signal (d) to obtain the low level so that the reference position signal (g) is obtained.

Here, the position signals (c) and (d) have a phase difference of 90°.

Moreover, when the reference position signal (g) is generated, and the counter (not shown) for counting the reference position signal (g) is reset, it is possible to obtain the reference position of the position detection.

When the synchronous circuit is omitted, the digital signal for detecting the reference position (f) may be used as such as the reference position signal, or the digital signal for detecting the reference position (f) may be processed to obtain a sharp reference position signal in an intermediate point.

[Effect]

According to the present embodiment, the phase difference between the signal for detecting the reference position and the position signal can be set to an optimal value by the design beforehand. Moreover, the error is several micrometers or less in the precision by the semiconductor process. Therefore, it is possible to reduce the deviation of the reference position which could be caused by the unstable factors such as the signal noise or wobble, further stability of the light source, temperature characteristics of the light emitting/receiving device and fluctuations, and deviations from the designs of the individual encoders in the optical encoder.

Furthermore, when the reference position signal is synchronized, the tolerance for assembling/attaching can be increased. For example, because of the above-described unstable factors, the output level of the signal for detecting the reference position (e) shown in FIG. 14 may rise, the signal may shift in the left direction in FIG. 14, or the slice level may slightly drop. The tolerance against these increases, the deterioration of the reference position detection precision is inhibited, and it will become possible to stably detect the reference position.

Furthermore, in this embodiment, except the signal processing circuit section (reference position detection circuit section) 6, the member for generating the auxiliary signal for detecting the reference position is not disposed. Furthermore, as compared with the other embodiments, the changeover switch of the synchronous timing can be omitted. Therefore, the reference position can stably be detected, and it is possible to supply the small-sized and inexpensive encoder.

In the present embodiment, there are a plurality of reference position signal generating position candidates. When the synchronous circuit is omitted, the respective candidates are not virtual reference position candidates created by the synchronous circuit. At least some of the reference position candidates physically constitute an independent detection system. In this case, the candidates are not easily influenced by the shift of the detection position by the synchronization. Therefore, for example, the reference position is not easily influenced by the detection direction. Regardless of presence/absence of the synchronization, the interval of the reference position candidates changes by the way of selection of the value of i of Equation 1. Therefore, this is effective for a need to largely move the reference position in accordance with use conditions.

Sixth Embodiment

In a sixth embodiment, there is provided the encoder for detecting the positional displacement of the movable member. This generates a plurality of periodical signals in response to the movement of the movable member, and generates the signal for detecting the reference position, when the movable member is in a predetermined position. Moreover, characteristics lie in that one periodical signal can be selected from the periodical signals, and it is detected that the movable member is in the reference position based on the signal for detecting the reference position in synchronization with the selected periodical signal.

[Constitution]

The constitution of the signal processing circuit section in the encoder according to the sixth embodiment is similar to that of the signal processing circuit section in the above-described first embodiment, but is different in the function of the switch 104.

[Operation]

Figure 15:
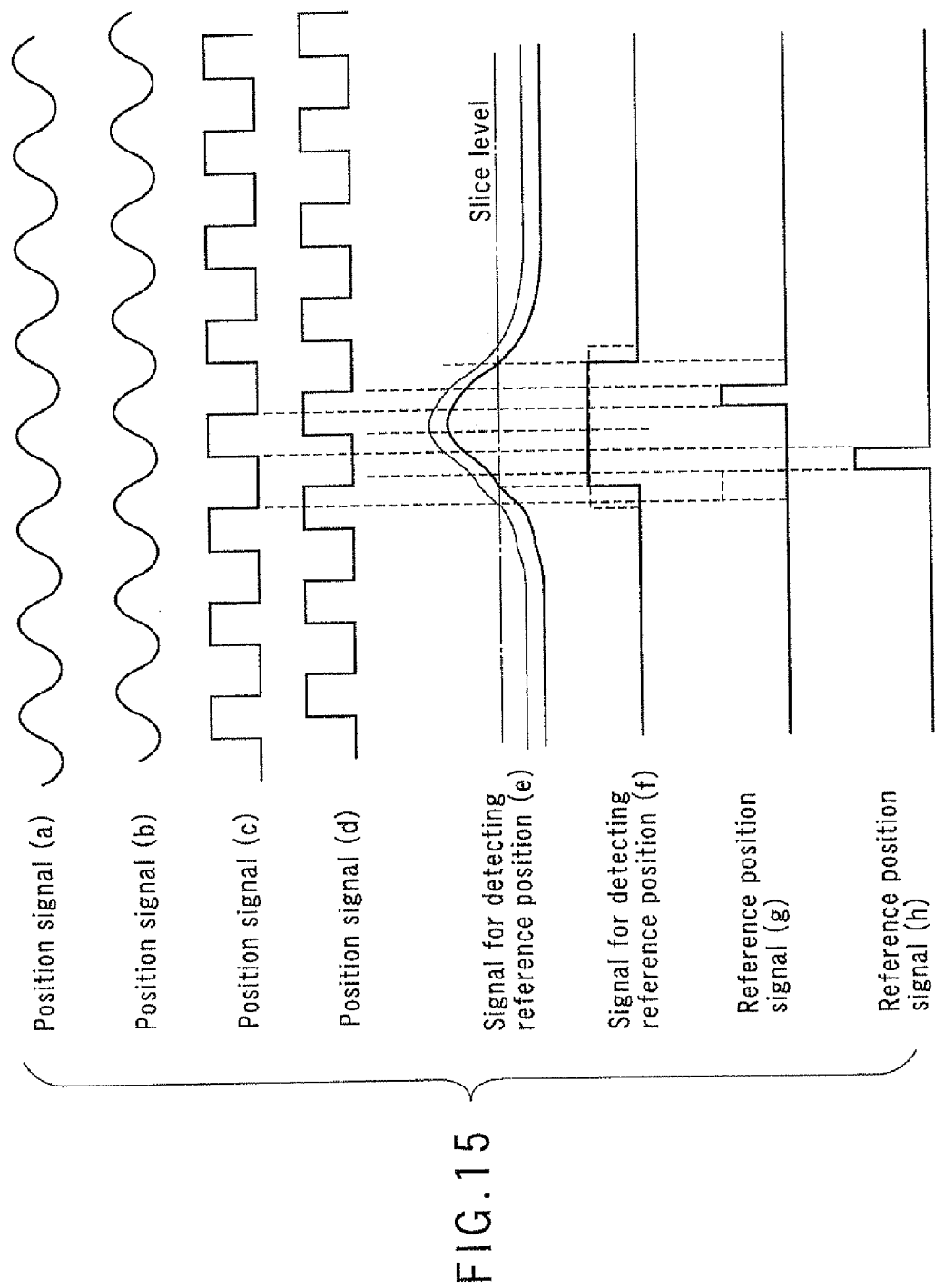
FIG. 15 is a time chart showing that the input is processed by the signal processing circuit section of the encoder according to a sixth embodiment of the present invention.

FIG. 15 is a time chart showing that the input from the photodetector 5 is processed by the signal processing circuit section 6 in the sixth embodiment. In FIG. 15, the position signals (a), (b), (c), and (d), signal for detecting the reference position (e), and digital signal for detecting the reference position (f) are similar to those of FIG. 3.

Moreover, one is selected from the following two methods to obtain the reference position signal (g) or (h). That is, in the first method, the digital signal for detecting the reference position (f) is synchronized with a fall of the position signal (c) to obtain the high level, and synchronized with the level change of the position signal (d) to obtain the low level, so that the reference position signal (g) is obtained. In the second method, the digital signal for detecting the reference position (f) is synchronized with the fall of the position signal (d) to obtain the high level, and synchronized with the level change of the position signal (c) to obtain the low level, so that the reference position signal (h) is obtained. The selection of the reference position signal (g) or (h) is carried out by the switch 104.

By the level change of the signal for detecting the reference position (e), the position and width of the digital signal for detecting the reference position (f) obtained by binarizing the signal for detecting the reference position (e) at the predetermined slice level change. By the change of the digital signal for detecting the reference position (f), the position of the reference position signal (g) changes, but the reference position signal (h) does not change.

[Effect]

Also according to the sixth embodiment, the effect similar to that in the above-described embodiments can be obtained.

Seventh Embodiment

[Constitution]

The constitution of the major part of a seventh embodiment is not especially limited except the signal processing circuit section 6 as long as the position signal and the signal for detecting the reference position are obtained. For example, the general constitution may be used such as the optical encoder constitution shown as the constitution of the major part of the above-described first embodiment in FIG. 1. In the example of FIG. 1, the optical encoder has been described, but the other types such as the magnetic type may also be used.

Figure 16:
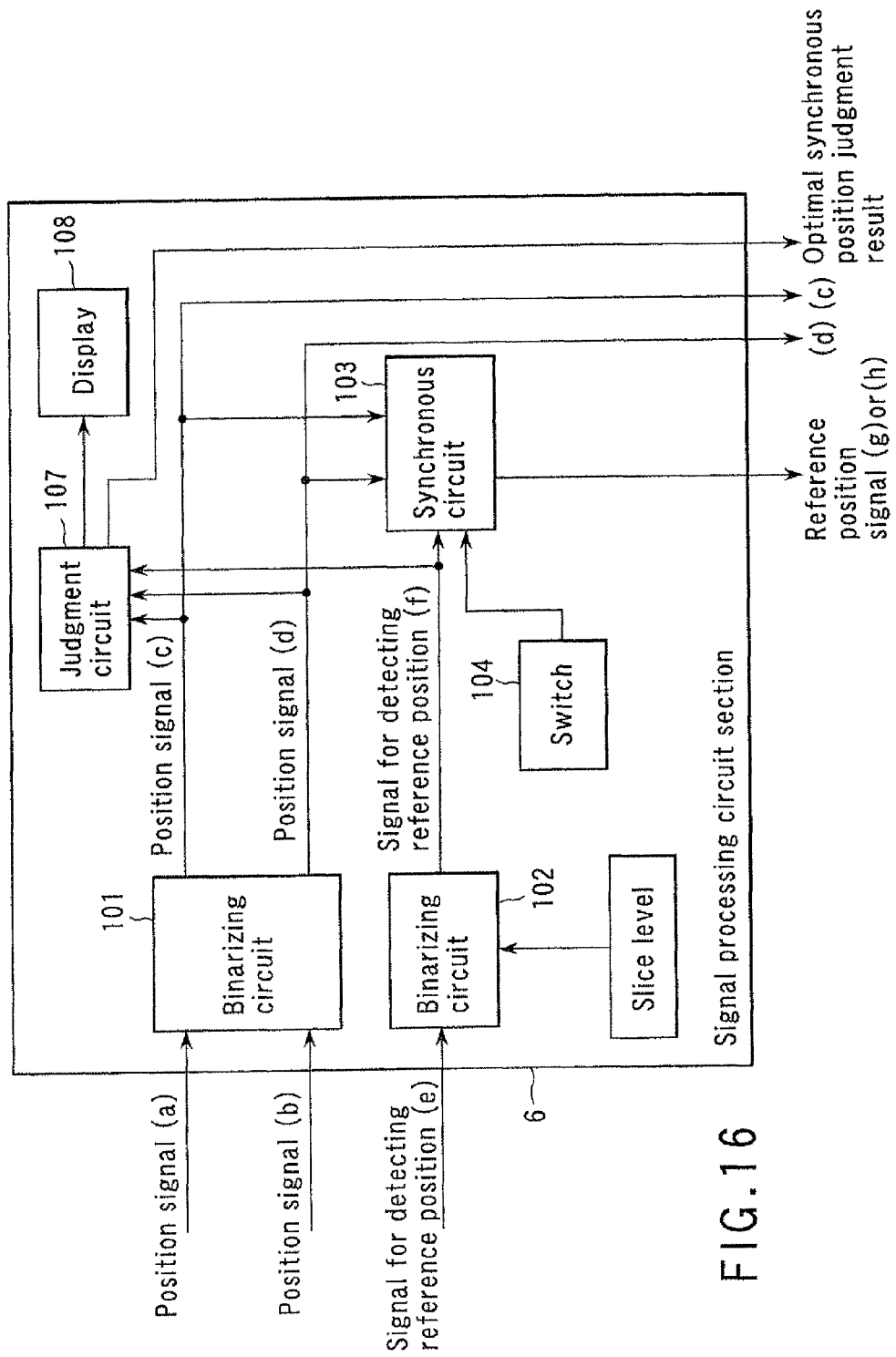
FIG. 16 is a block diagram showing the constitution of the signal processing circuit section of the encoder according to a seventh embodiment of the present invention.

FIG. 16 is a block diagram showing the constitution of the signal processing circuit section 6 of the encoder according to the seventh embodiment of the present invention. The signal processing circuit section 6 according to the seventh embodiment includes: the binarizing circuit 101 for converting the analog position signals (a) and (b) to the digital position signals (c) and (d); the binarizing circuit 102 for binarizing the signal for detecting the reference position (e) at the predetermined slice level to convert the signal to the digital signal for detecting the reference position (f); the synchronous circuit 103 for synchronizing the digital signal for detecting the reference position (f) from the binarizing circuit 102 with the digital position signals (c) and (d) from the binarizing circuit 101 to generate the reference position signal (g) or (h); the switch 104 for switching the timing of synchronization in the synchronous circuit 103; a judgment circuit 107 for detecting an optimal synchronous position; and a display 108 for displaying an optimal synchronous position judgment result by this judgment circuit 107.

Figure 17:
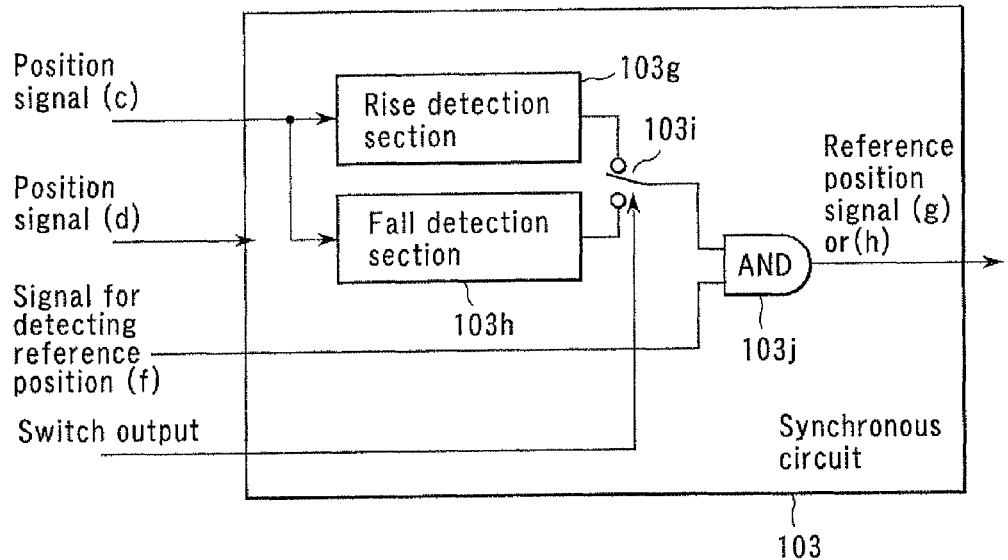
FIG. 17 is a diagram showing a constitution example of the synchronous circuit in FIG. 16.
Figure 18:
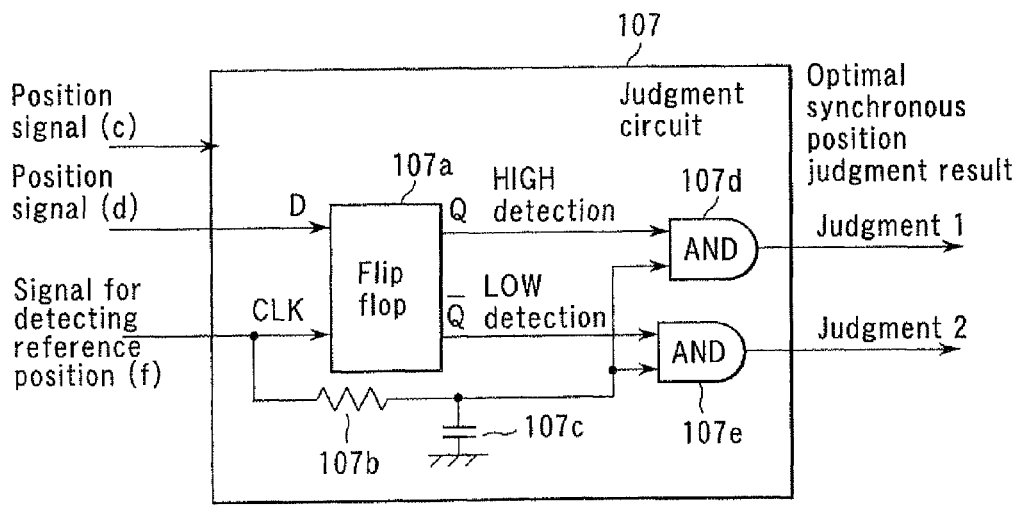
FIG. 18 is a diagram showing the constitution example of a judgment circuit in FIG. 16.

FIG. 17 shows a constitution example of the synchronous circuit 103, and FIG. 18 shows the constitution example of the judgment circuit 107.

That is, the synchronous circuit 103 is constituted of: a rise detection section 103g and fall detection section 103h of the position signal (c); a selection switch 103i for selecting output signals from these detection sections 103g, 103h in response to the changeover of the switch 104; and an AND circuit 103j for obtaining the logical product of the output signal of the detection section 103g or 103h selected by the selection switch 103i and the signal for detecting the reference position (f).

Moreover, in the judgment circuit 107, the position signal (d) and signal for detecting the reference position (f) are connected to data (D) and clock (CLK) of a flip flop (such as LS423) 107a of a D-C trigger type. Moreover, the signal for detecting the reference position (f) is passed through a combination of a resistance 107b and a capacitor 107c which have a delay exceeding a signal delay of about 10 nanoseconds in the flip flop 107a. Outputs of AND circuits 107d and 107e for obtaining the logical product of the output and outputs Q and $\overline{Q}$ of the flip flop 107a are outputted as the judgment result.

It is to be noted that in FIG. 16 the reference position signal (g) or (h) is obtained in synchronization with the position signals (c) and (d), but the similar function can also be realized in synchronization with the position signals (a) and (b).

[Operation]

A time chart when the input from the photodetector 5 shown in FIG. 1 is processed by the signal processing circuit section 6 of FIG. 16 is similar to that of FIG. 3 in the above-described first embodiment, and the following description will be made with reference to FIG. 3.

That is, in the binarizing circuit 101, the analog position signals (a) and (b) of the encoder which periodically change with the displacement (relative movement of the scale 4) are binarized to obtain the digital position signals (c) and (d). In the binarizing circuit 102, the signal for detecting the reference position (e) is binarized at the predetermined slice level to obtain the digital signal for detecting the reference position (f).

Moreover, one is selected from the following two methods to obtain the reference position signal. That is, in the first method, in the synchronous circuit 103, the digital signal for detecting the reference position (f) is synchronized with the rise of the position signal (a) or (c) to obtain the high level, and synchronized with the level change of the position signal (b) or (d) to obtain the low level, so that the reference position signal (g) is obtained. Here, the rise of the position signal (a) or (c) is detected by the rise detection section 103g, and the level change of the position signal (b) or (d) can be detected by a level change detection section (e.g., a low level detection circuit) (not shown). In the second method, in the synchronous circuit 103, the digital signal for detecting the reference position (f) is synchronized with the fall of the position signal (a) or (c) to obtain the high level, and synchronized with the level change of the position signal (b) or (d) to obtain the low level, so that the reference position signal (h) is obtained. Here, the fall of the position signal (a) or (c) is detected by the fall detection section 103h, and the level change of the position signal (b) or (d) can be detected by the level change detection section (not shown) (e.g., a high level detection circuit). One is selected from these two to output the reference position signal (g) or (h), and the selection is carried out by the switch 104.

Here, the position signals (a) and (c) have a phase difference of 90° from the position signals (b) and (d).

Moreover, the position signals (a) and (b) and the signal for detecting the reference position (e) which are analog signals may be signals of any type as long as the position signals (c) and (d) and the signal for detecting the reference position (f) which are digital signals can be created. The inputs from the photodetector 5 shown in FIG. 1 may be only the digital signals, and may not include any analog signal. When the inputted analog position signal is digitized, the resolution may be enhanced by the phase interpolation.

Moreover, the position detection is carried out by inputting the digital position signals (c) and (d) into the counter (not shown). In this case, when the reference position signal (g) or (h) is generated, the counter is reset, and it is accordingly possible to obtain the reference position of the position detection.

On the other hand, it is judged in the judgment circuit 107 which is closer to the phase of the position signal (c) between the nearest rise (assumed to be a phase of 0°) and the nearest fall (assumed to be a phase of 180°) when the signal for detecting the reference position (f) is detected, and the signal having a larger phase difference is regarded as stable and outputted. This optimal synchronous position judgment result is outputted to the display 108, or as an electric signal to the outside. It is to be noted that the display 108 may be of any type as long as results are shown. For example, an LED for the optimal among two LEDs indicating rise and fall edges may be lit when the reference position is detected. Alternatively, a display color of an LED which can be lit in two colors may be switched.

Here, a concrete judgment method will be described. First, the levels of the position signals (c) and (d) are confirmed. In the position signals (c) and (d) of FIG. 3, the phase of the position signal (c) is ahead by 90°. In this state, the level of the position signal (d) is the low level when the position signal (c) rises. Therefore, when the level of the position signal (d) is the low level, the phase difference till the rise of the position signal (c) is within ±90°. When the level of the position signal (d) is the high level, the phase difference till the rise of the position signal (c) is ±90° or more. Therefore, if the level of the position signal (d) is high level when the rise of the signal for detecting the reference position (f) is detected, it is more stable in synchronization with the rise of the position signal (c) against a slight fluctuation of the rise position of the signal for detecting the reference position (f) as compared with the case in which the level is low. By similar discussion, if the level of the position signal (d) is low level when the rise of the signal for detecting the reference position (f) is detected, it is more stable in synchronization with the fall of the position signal (c) against the slight fluctuation of the rise position of the signal for detecting the reference position (f) as compared with the case in which the level is high. Therefore, more stable synchronous position may be outputted as the judgment result.

For example, in FIG. 3, the level of the position signal (d) at the moment at which the signal for detecting the reference position (f) is detected (rise timing) is high level in an example of a bold line of the signal for detecting the reference position (e) (solid line of the signal for detecting the reference position (f)) from the figure. Therefore, concerning the rise and fall closest to the position signal (c), it is seen that the phase difference is larger and more stable at the rise, and the rise is outputted as the judgment result.

[Effect]

According to the present embodiment, it is possible to select the synchronous position with the position signal in accordance with the way of output of the signal for detecting the reference position. Therefore, it is possible to select the synchronous position which reduces the deviation of the reference position possibly caused by the unstable factors such as the signal noise or wobble, and further the stability of the light source, temperature characteristics of the light emitting/ receiving device and fluctuations, and deviations from designs of individual encoders in the optical encoder. For example, it is considered that by the above-described unstable factors, the output level of the signal for detecting the reference position (e) of FIG. 3 rises, or shifts in the left direction in the figure, or the slice level slightly drops. At this time, assuming that the signal for detecting the reference position (e) changes to the fine line from the bold line, the digital signal for detecting the reference position (f) changes as shown by the broken line. Accordingly, the position deviating by one period as shown by the broken line in the reference position signal (h) is detected as the reference position signal. On the other hand, this change does not easily occur in the reference position signal (g). Therefore, when the reference position signal (g) is selected, the deterioration of the reference position detection precision is inhibited, and it is possible to stably detect the reference position.

Moreover, in the present embodiment, in order to synchronize the reference position signal with the position signal, there is disposed the judgment circuit 107 for judging a best synchronous position among the synchronous positions. In a state in which the encoder is actually attached to the apparatus, the best synchronous position can be selected. In this case, in the present embodiment, when the synchronous position having a larger phase allowance is selected, it is possible to enhance the stability against the fluctuation. Therefore, the stability of the reference position detection synchronized with the position signal increases. Moreover, the influences of the fluctuation of the relative position and posture, such as an attachment angle or gap of the head and scale at the attachment time of the encoder, do not have to be considered in advance. That is, the phase difference between the position signal and reference position signal does not have to be strictly set or processed in the design and manufacturing. Therefore, manufacturing cost or time for adjusting the assembly is reduced, and restrictions in the design and manufacturing are reduced. This produces an advantage that the degree of freedom in the function can increase.

Moreover, in the present embodiment, as judging means for selecting either the rise or the fall, a circuit for processing only two position signals in addition to the signal for detecting the reference position is used. At this time, the display 108 includes about two LEDs. A burden by addition is light, but the stability of the reference position detection synchronized with the position signal can easily be realized.

Furthermore, in the present embodiment, except the signal processing circuit section 6, the member for generating the auxiliary signal is not disposed for the reference position detection. Therefore, the reference position can stably be detected, and the small-sized and inexpensive encoder can be supplied.

Eighth Embodiment

[Constitution]

In the same manner as in the seventh embodiment, the constitution of the major part of an eighth embodiment is not especially limited except the signal processing circuit section 6 as long as the position signal and the signal for detecting the reference position are obtained. For example, the general constitution may be used such as the optical encoder constitution shown as the constitution of the major part of the above-described first embodiment in FIG. 1. In the example of FIG. 1, the optical encoder has been described, but the other types such as the magnetic type may also be used.

Moreover, the constitution of the signal processing circuit section 6 in the eighth embodiment of the present invention may be similar to that of the block diagram shown in FIG. 16. Additionally, it is assumed that the synchronous circuit 103 and judgment circuit 107 in the signal processing circuit section 6 may include the following constitution.

Figure 19A:
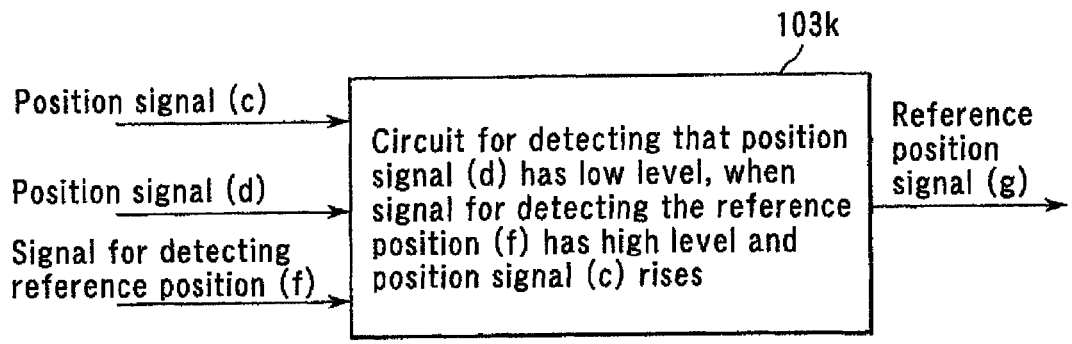
FIG. 19A is a diagram showing the constitution of the synchronous circuit in the signal processing circuit section of the encoder according to an eighth embodiment of the present invention.
Figure 19B:
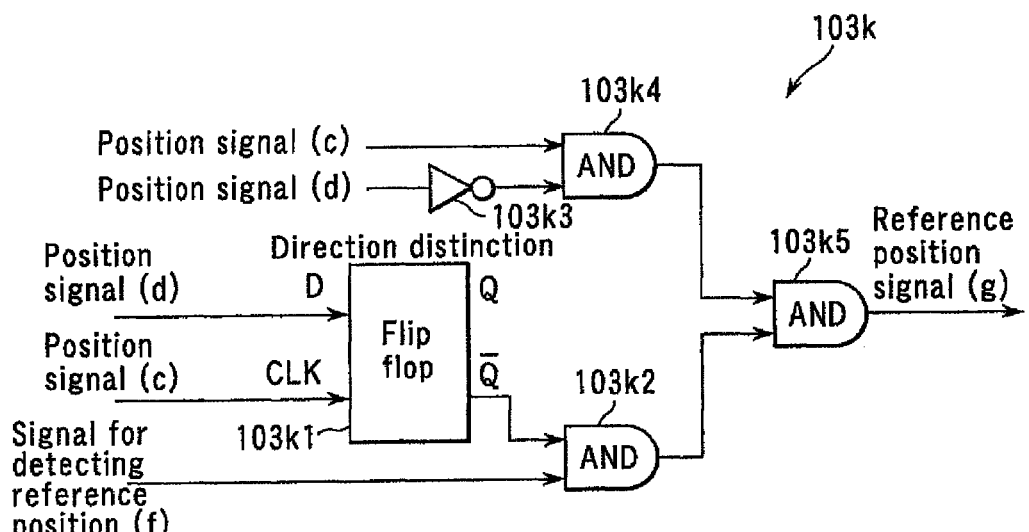
FIG. 19B is a diagram showing a concrete constitution of the circuit of FIG. 19A.
Figure 20:
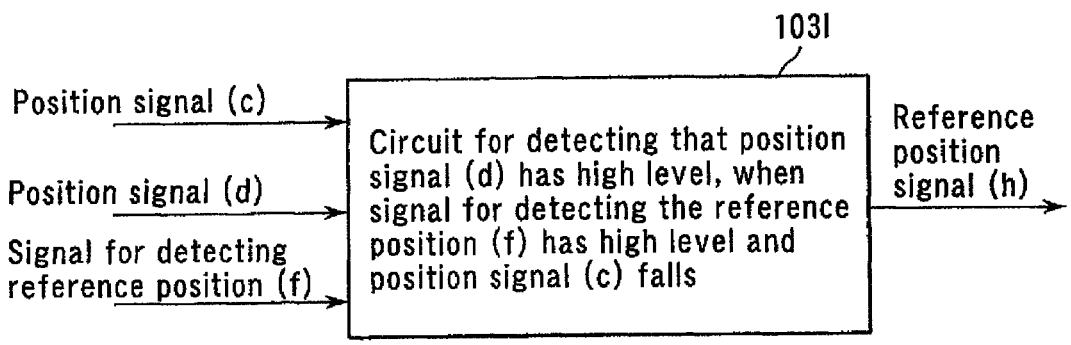
FIG. 20 is a diagram showing another constitution of the synchronous circuit in the signal processing circuit section of the encoder according to the eighth embodiment of the present invention.

FIGS. 19A to 20 are diagrams showing the constitution of the synchronous circuit 103. The circuit shown in FIG. 19A and the circuit shown in FIG. 20 can be switched by the switch 104. These circuits can easily and inexpensively be manufactured by a generally available logic ICs. FIG. 19B is a diagram showing a concrete constitution of the circuit of FIG. 19A. For the position signal which has the phase difference of 90°, when the detection direction changes, the progress of the phase is reversed. This can be used to distinguish the direction. That is, when the position signal (c) rises, the position signal (d) becomes low or high depending on the detection direction (stage movement direction). Therefore, when the level of the position signal (d) is defined, the direction can be identified. Then, in a detection circuit 103$k$ shown in FIG. 19A, the synchronization with the rise of the position signal (c) is established, and the detection is limited to a time when the position signal (d) indicates the low level, the direction of the reference position detection is limited. Moreover, the constitution of the synchronous circuit 103 synchronized with the fall of the position signal (c) in the same detection direction is shown in FIG. 20. That is, a stage movement direction when the position signal (c) detected by the detection circuit 103$k$ of FIG. 19A rises and the position signal (d) indicates the low level is the same as the stage movement direction when the position signal (c) detected by a detection circuit 103$l$ of FIG. 20 falls and the position signal (d) indicates the high level. The phase when the reference position is detected deviates by 180°. To switch this by the switch 104 is a purpose.

FIG. 21 is a diagram showing the constitution example of the judgment circuit 107 in the eighth embodiment. A flip flop 107$f$ of a D-C trigger type for distinguishing the direction is added to the constitution of FIG. 18 in the seventh embodiment. That is, in the flip flop 107$f$ for distinguishing the direction, the position signal (c) as the data D and the position signal (d) as the clock CLK are inputted. In the flip flop 107$a$ for distinguishing the optimal direction, the position signal (d) which is the data D and the signal for detecting the reference position (f) which is the clock CLK are inputted. Moreover, when an output Q of the flip flop 107$f$, an output Q of the flip flop 107$a$, and the signal for detecting the reference position (f) are all at the high level, judgment 1 which is the output of an AND circuit 107$d$ indicates the high level. Similarly, when an output $\overline{Q}$ of the flip flop 107$f$, an output $\overline{Q}$ of the flip flop 107$a$, and the signal for detecting the reference position (f) are all at the high level, a logical product is obtained in an AND circuit 107$e$ so that judgment 2 indicates the high level.

[Operation]

A time chart when the input from the photodetector shown in FIG. 1 is processed by the signal processing circuit section 6 in the present embodiment is similar to that of FIG. 3 in the above-described first embodiment, and the following description will be made with reference to FIG. 3.

That is, in the binarizing circuit 101, the analog position signals (a) and (b) of the encoder which periodically change with the displacement (relative movement of the scale 4) are binarized to obtain the digital position signals (c) and (d). In the binarizing circuit 102, the signal for detecting the reference position (e) is binarized at the predetermined slice level to obtain the digital signal for detecting the reference position (f).

Moreover, one is selected from the following two methods to obtain the reference position signal. In the first method, in the detection circuit 103*k* of the synchronous circuit 103, the digital signal for detecting the reference position (f) is synchronized with the rise of the position signal (a) or (c) to obtain the high level, and synchronized with the level change of the position signal (b) or (d) to obtain the low level, so that the reference position signal (g) is obtained. In the second method, in the detection circuit 103*l* of the synchronous circuit 103, the digital signal for detecting the reference position (f) is synchronized with the fall of the position signal (a) or (c) to obtain the high level, and synchronized with the level change of the position signal (b) or (d) to obtain the low level, so that the reference position signal (h) is obtained. One is selected from these two to output the reference position signal (g) or (h), and the selection is carried out by the switch 104.

Here, the reference position signal (g) will be described in more detail with reference to FIG. 19B.

First, the direction distinction will be described. The position signal (d) is inputted into the data D of a flip flop 103*k*1, and the position signal (c) is inputted into the clock CLK. As a result, the signal outputted from the output $\overline{Q}$ of the flip flop 103*k*1 is updated as a reversed signal of the position signal (d) at every rise of the position signal (c). Therefore, only when the position signal (d) indicates the low level at the time of the rise of the position signal (c), the output $\overline{Q}$ of the flip flop 103*k*1 indicates the high level, and the direction distinction is therefore possible. Moreover, when an AND circuit 103*k*2 obtains the logical product of a detection direction distinction signal and the signal for detecting the reference position (f), the detection direction is correct and the signal for detecting the reference position (f) is in the detection state in a limited case.

Moreover, conditions for generating the reference position signal are further added. That is, in the present embodiment, the reference position signal is detected between the rise of the position signal (c) and the rise of the position signal (d). A rise edge of the position signal (c) is an important point, a detection width may be designated by time or by displacement amount of a measurement object, and the width itself may arbitrarily be designated. When the direction is designated, a case including the rise of the position signal (c) till the rise of the position signal (d) is equivalent to a case in which the position signal (c) has the high level and the position signal (d) has the low level. Therefore, the conditions are added.

That is, as described above, the reference position signal (g) is obtained by obtaining the logical product of four conditions that the position signal (c) has the high level, the position signal (d) has the low level, the position signal (d) has the low level at the time of the rise of the position signal (c) in the direction distinction, and the signal for detecting the reference position (f) has the high level (detecting state). That is, the logical product of the position signal (c) and the position signal (d) reversed in a NOT circuit 103*k*3 is obtained in an AND circuit 103*k*4, and the logical product of the outputs of the AND circuits 103*k*4 and 103*k*2 is obtained by an AND circuit 103*k*5 to obtain the reference position signal (g).

It is to be noted that the position signals (a) and (c) have a phase difference of 90° from the position signals (b) and (d). The position signals (a) and (b) and the signal for detecting the reference position (e) which are analog signals may be signals of any type as long as the position signals (c) and (d) and the signal for detecting the reference position (f) which are digital signals can be created. The inputs from the photodetector 5 shown in FIG. 1 may be only the digital signals, and may not include any analog signal. When the inputted analog position signal is digitized, the resolution may be enhanced by the phase interpolation.

Moreover, the position detection is carried out by inputting the digital position signals (c) and (d) into the counter (not shown). In this case, when the reference position signal (g) or (h) is generated, the counter is reset, and it is accordingly possible to obtain the reference position of the position detection.

It is to be noted that FIG. 6 shows the change of each signal when the displacement occurs in a direction opposite to that of FIG. 3. At this time, the progresses of the analog position signals (a) and (b) and the digital position signals (c) and (d) are reversed. When the displacement occurs in the opposite direction in this manner, the synchronous circuit 103 does not bring the reference position signals (g) and (h) into the detection state by the constitution and function shown in FIG. 19A (and FIG. 20). Therefore, the reference position is not detected in the displacement of the opposite direction. It is to be noted that when the synchronous circuit 103 shown in FIGS. 19A to 20 is appropriately designed, the reference position detection may also be possible only in the displacement of the opposite direction.

On the other hand, it is judged in the judgment circuit 107 which is closer to the phase of the position signal (c) between the nearest rise (assumed to be a phase of 0°) and the nearest fall (assumed to be a phase of 180°) when the signal for detecting the reference position (f) is detected, and the signal having a larger phase difference is regarded as stable and outputted. This optimal synchronous position judgment result is outputted to the display 108, or as the electric signal to the outside.

It is to be noted that the display 108 may be of any type as long as the results are shown. For example, for the LEDs indicating both the rise and fall, the optimal LED may be lit when the reference position is detected. Alternatively, the display color of the LED which can be lit in two colors may be switched.

Here, the concrete judgment method will be described. First, the levels of the position signals (c) and (d) are confirmed. In the position signals (c) and (d) of FIG. 3, the phase of the position signal (c) is ahead by 90°. In this state, the level of the position signal (d) at the time of the rise of the position signal (c) is the low level. Therefore, when the level of the position signal (d) is the low level, the phase difference till the rise of the position signal (c) is within ±90°. When the level of the position signal (d) is the high level, the phase difference till the rise of the position signal (c) is ±90° or more. Therefore, when the level of the position signal (d) at the time of the detection of the rise of the signal for detecting the reference position (f) is the low level, in synchronization with the rise of the position signal (c), the level is more stable with respect to the slight fluctuation of the rise position of the signal for detecting the reference position (f) as compared with the high level. By the similar discussion, when the level of the position signal (d) at the time of the detection of the rise of the signal for detecting the reference position (f) is the high level, in synchronization with the fall of the position signal (c), the level is more stable with respect to the slight fluctuation of the rise position of the signal for detecting the reference position (f) as compared with the low level. Therefore, more stable synchronous position may be outputted as the judgment result.

For example, in FIG. 3, the level of the position signal (d) at the moment at which the signal for detecting the reference position (f) is detected (rise timing) is high level in the example of the signals for detecting the reference position (e) and (f) in the figure. Therefore, concerning the closest rise and fall of the position signal (c), it is seen that the phase difference is larger and more stable at the fall, and the fall is outputted as the judgment result.

This judgment method is shown as a concrete circuit in FIG. 21. That is, in the flip flop 107f the position signals (c) and (d) are used to perform the direction distinction, and the judgment result is outputted only when the position signal (c) indicates the high level at the rise of the position signal (d). Here, a case where the position signal (c) indicates the high level at the rise of the position signal (d) is equivalent to a case where the position signal (d) indicates the low level at the rise of the position signal (c). In the detection direction which is a designated direction, the judgment 1 is outputted as the result, when the level of the position signal (d) at the rise of the signal for detecting the reference position (f) is the high level. When the level of the position signal (d) is the low level, the judgment 2 is outputted as the result. The judgment 1 recommends that the reference position signal should be synchronized with the fall of the position signal (c), and the judgment 2 recommends that the reference position signal should be synchronized with the rise of the position signal (c).

[Effect]

According to the present embodiment, it is possible to select the synchronous position with the position signal in accordance with the way of output of the signal for detecting the reference position. Therefore, it is possible to select the synchronous position which reduces the deviation of the reference position possibly caused by the unstable factors such as the signal noise or wobble, and further the stability of the light source, temperature characteristics of the light emitting/receiving device and fluctuations, and deviations from designs of individual encoders in the optical encoder. For example, it is considered that by the above-described unstable factors, the output level of the signal for detecting the reference position (e) of FIG. 3 rises, or shifts in the left direction in the figure, or the slice level slightly drops. At this time, assuming that the signal for detecting the reference position (e) changes to the fine line from the bold line, the digital signal for detecting the reference position (f) changes as shown by the broken line. Accordingly, the position deviating by one period as shown by the broken line in the reference position signal (h) is detected as the reference position signal. On the other hand, this change does not easily occur in the reference position signal (g). Therefore, when the reference position signal (g) is selected, the deterioration of the reference position detection precision is inhibited, and it is possible to stably detect the reference position.

Moreover, in order to synchronize the reference position signal with the position signal, there is disposed the judgment circuit 107 for judging the best synchronous position among the synchronous positions. In the state in which the encoder is actually attached to the apparatus, the best synchronous position can be selected. In the present embodiment, when the synchronous position having a larger phase allowance is selected, it is possible to enhance the stability against the fluctuation. Therefore, the stability of the reference position detection synchronized with the position signal increases. Moreover, the influences of the fluctuation of the relative position and posture, such as the attachment angle or gap of the head and scale at the attachment time of the encoder, do not have to be considered in advance. That is, the phase difference between the position signal and reference position signal does not have to be strictly set or processed in the design and manufacturing. Therefore, the manufacturing cost or the time for adjusting the assembly is reduced, and the restrictions in the design and manufacturing are reduced. This produces the advantage that the degree of freedom in the function can increase.

Moreover, in the present embodiment, as the judging means for selecting either the rise or the fall, the circuit for processing only two position signals in addition to the signal for detecting the reference position is used. At this time, the display 108 includes about two LEDs. The burden by addition is light, but the stability of the reference position detection synchronized with the position signal can easily be realized.

Moreover, in the present embodiment, except the signal processing circuit section 6, the member for generating the auxiliary signal is not disposed for the reference position detection. Therefore, the reference position can stably be detected, and the small-sized and inexpensive encoder can be supplied.

Furthermore, as the effect peculiar to the eighth embodiment, the reference position detection is possible only when the displacement is caused in a given direction. This produces the advantages that the detection is not easily influenced by the backlashes of the movable part and the reference position does not have to be doubly detected at the reference position detection time. The reference position detection high in precision and convenient in use is possible.

Ninth Embodiment

[Constitution]

According to a ninth embodiment of the present invention, the judging means of the optimal synchronous position as in the seventh embodiment is added to the third embodiment. In the same manner as in the seventh embodiment, the constitution of the major part of the ninth embodiment is not especially limited except the signal processing circuit section 6 as long as the position signal and the signal for detecting the reference position are obtained. For example, the general constitution may be used such as the optical encoder constitution shown as the constitution of the major part of the above-described first embodiment in FIG. 1. In the example of FIG. 1, the optical encoder has been described, but the other types such as the magnetic type may also be used.

Figure 22:
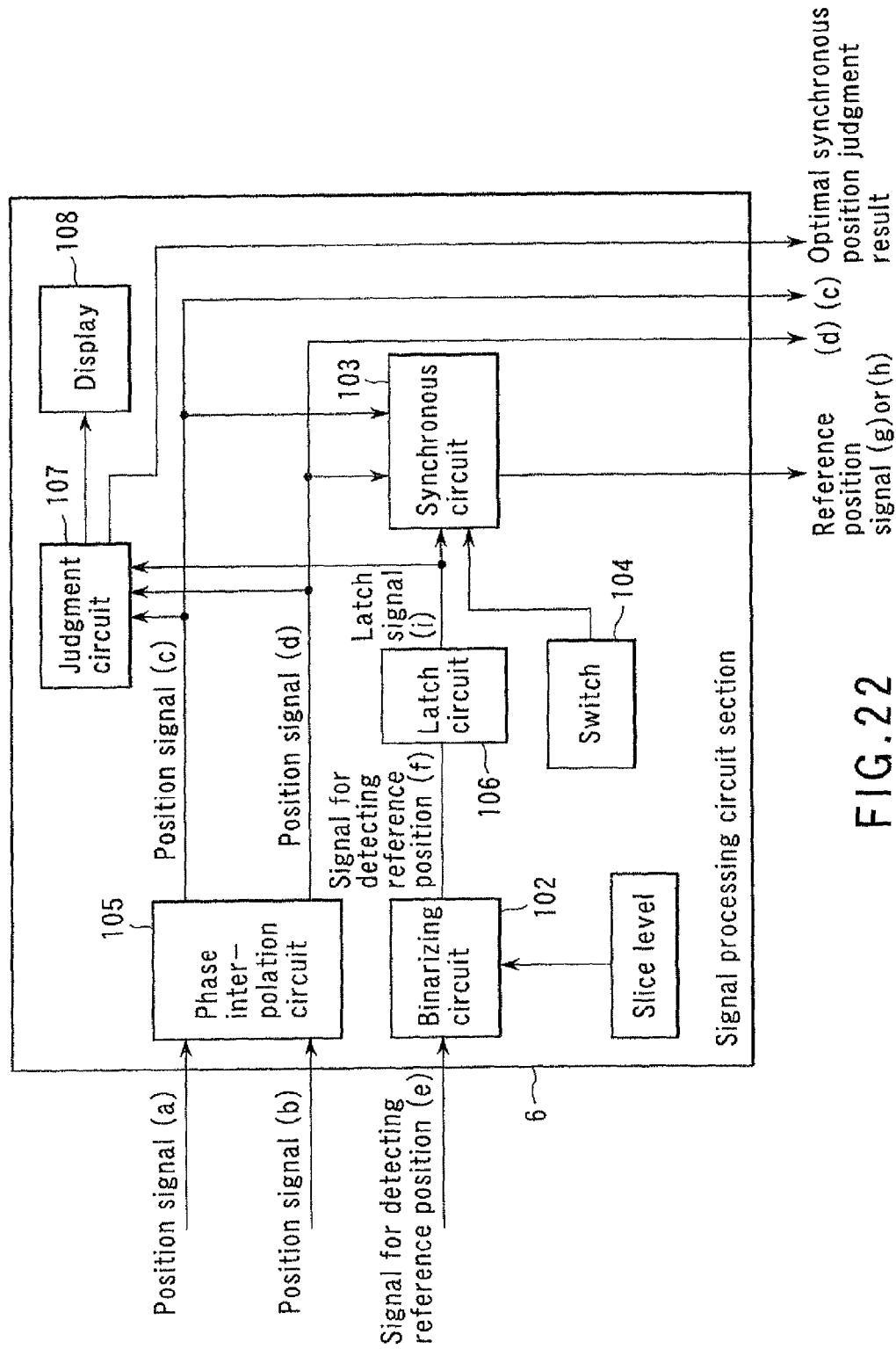
FIG. 22 is a block diagram showing the constitution of the signal processing circuit section of the encoder according to a ninth embodiment of the present invention.

FIG. 22 is a block diagram showing the constitution of the signal processing circuit section 6 of the encoder according to the ninth embodiment of the present invention. The signal processing circuit section 6 according to the ninth embodiment includes: the phase interpolation circuit 105 for phase-dividing the analog position signals (a) and (b) to convert the signals to the digital position signals (c) and (d); the binarizing circuit 102 for binarizing the signal for detecting the reference position (e) at the predetermined slice level to convert the signal to the digital signal for detecting the reference position (f); the latch circuit 106 for holding the rise of the digital signal for detecting the reference position (f) to obtain the latch signal (i); the synchronous circuit 103 for synchronizing the latch signal (i) from the latch circuit 106 with the position signal (a) and (d) to generate the reference position signal (g) or (h); the switch 104 for switching the timing of the synchronization in the synchronous circuit 103; the judgment circuit 107 for detecting the optimal synchronous position; and the display 108 for displaying the optimal synchronous position judgment result by this judgment circuit 107.

In the signal processing circuit section 6 including the constitution shown in FIG. 22, the rise/fall of the position signal (a) is detected in the point passing the center of the amplitude. The reference position signal (g) or (h) is obtained in synchronization with the position signals (a) and (d), but may be synchronized with the appropriate signal selected from the position signals (a), (b), (c), and (d).

[Operation]

A time chart when the input from the photodetector 5 shown in FIG. 1 is processed by the signal processing circuit section 6 of FIG. 22 is similar to that of FIG. 8 in the above-described third embodiment, and therefore the following description will be made with reference to FIG. 8.

That is, first, in the phase interpolation circuit 105, the analog position signals (a) and (b) which periodically change with the displacement are phase-divided and binarized to obtain the digital position signals (c) and (d). In the binarizing circuit 102, the signal for detecting the reference position (e) is binarized at the predetermined slice level to obtain the digital signal for detecting the reference position (f). Moreover, in the latch circuit 106, the rise of the digital signal for detecting the reference position (f) from the binarizing circuit 102 is detected to set the latch signal (i) to the high level.

Moreover, one is selected from the following two methods to obtain the reference position signal.

In the first method, in the synchronous circuit 103, the signal is synchronized with the rise of the position signal (a) to obtain the high level, and synchronized with the level change of the position signal (d) to obtain the low level, so that the reference position signal is obtained. In the second method, in the synchronous circuit 103, the digital signal for detecting the reference position (f) is synchronized with the fall of the position signal (c) to obtain the high level, and synchronized with the level change of the position signal (d) to obtain the low level, so that the reference position signal is obtained. One is selected from these two methods to output the reference position signal (g) or (h), and this selection is carried out by the switch 104.

It is to be noted that the position signals (a) and (c) have a phase difference of 90° from the position signals (b) and (d). The position signals (a) and (b) and the signal for detecting the reference position (e) which are analog signals may be the signals of any type as long as the position signals (c) and (d) and the signal for detecting the reference position (f) which are digital signals can be created. Furthermore, the inputs may be only the digital signals, and may not include any analog signal.

Moreover, the position detection is carried out by inputting the digital position signals (c) and (d) into the counter (not shown). In this case, when the reference position signal (g) or (h) is generated, the counter is reset, and it is accordingly possible to obtain the reference position of the position detection.

On the other hand, it is judged in the judgment circuit 107 that the phase of the position signal (c) at the time of the detection of the signal for detecting the reference position (f) is in the vicinity of the closest rise (assumed to be the phase of 0°) or fall (assumed to be the phase of 180°), and the signal having a larger phase difference is regarded as stable and outputted. This optimal synchronous position judgment result is outputted to the display 108, or as the electric signal to the outside.

It is to be noted that the display 108 may be of any type as long as the results are shown. For example, for the LEDs indicating both the rise and fall, the optimal LED may be lit at the time of the reference position detection. Alternatively, the display color of the LED which can be lit in two colors may be switched.

Here, the concrete judgment method will be described. First, the levels of the position signals (c) and (d) are con-firmed. In the position signals (c) and (d) of FIG. 8, the phase of the position signal (c) is ahead by 90°. In this state, the level of the position signal (d) at the time of the rise of the position signal (c) is the low level. Therefore, when the level of the position signal (d) is the low level at the time of the detection of the signal for detecting the reference position (f), the phase difference till the rise of the position signal (c) is within ±90°. When the level of the position signal (d) is the high level, the phase difference till the rise of the position signal (c) is ±90° or more. Therefore, when the level of the position signal (d) at the time of the detection of the rise of the signal for detecting the reference position (f) is the high level, in synchronization with the rise of the position signal (c), the level is more stable with respect to the slight fluctuation of the rise position of the signal for detecting the reference position (f) as compared with the synchronization with the fall. By the similar discussion, when the level of the position signal (d) at the time of the detection of the rise of the signal for detecting the reference position (f) is the low level, in synchronization with the fall of the position signal (c), the level is more stable with respect to the slight fluctuation of the rise position of the signal for detecting the reference position (f) as compared with the synchronization with the rise. Therefore, more stable synchronous position may be outputted as the judgment result.

For example, in FIG. 8, the level of the position signal (d) at the moment at which the signal for detecting the reference position (f) is detected (rise timing) is high level in the example of the signals for detecting the reference position (e) and (f) in the figure. Therefore, concerning the closest rise and fall of the position signal (c), it is seen that the phase difference is larger and more stable at the rise, and the rise is outputted as the judgment result.

[Effect]

According to the present embodiment, it is possible to select the synchronous position with the position signal in accordance with the way of output of the signal for detecting the reference position. Therefore, it is possible to select the synchronous position which reduces the deviation of the reference position possibly caused by the unstable factors such as the signal noise or wobble, and further the stability of the light source, temperature characteristics of the light emitting/receiving device and fluctuations, and deviations from designs of individual encoders in the optical encoder.

Furthermore, as the effect peculiar to the ninth embodiment, the signal for detecting the reference position (e) is held by the latch circuit 106, and it is therefore possible to establish the synchronization with the periodical signal, even when the detection width of the signal for detecting the reference position (f) is reduced, and even after the detection state is eliminated. Therefore, the tolerance is enhanced even against the change of the output level of the signal for detecting the reference position (e) of FIG. 8, shift in the left/right direction in the figure, or the change of the slice level by the above-described unstable factors. Moreover, when the rise position of the latch signal (i) can be designed/disposed in a position ahead of the synchronous position of the position signal (c) by the phase of about 180°, an allowance of ±180° is produced. That is, there is the position deviation tolerance of ±½ times the pitch of the position signal. Even when it is difficult to set the phase difference between the rise position of the latch signal (i) and the synchronous position of the phase A, the allowance of 90° or more is generated by selecting the synchronous position. Therefore, when the reference position signal (g) or (h) is selected, the deterioration of the reference position detection precision is inhibited, and the stable reference position detection is possible.

Moreover, in the present embodiment, in order to synchronize the reference position signal with the position signal, there is disposed the judgment circuit 107 for judging the best synchronous position among the synchronous positions. In the state in which the encoder is actually attached to the apparatus, the best synchronous position can be selected. In this case, in the present embodiment, when the synchronous position having a larger phase allowance is selected, it is possible to enhance the stability against the fluctuation. Therefore, the stability of the reference position detection synchronized with the position signal increases. Moreover, the influences of the fluctuation of the relative position and posture, such as an attachment angle or gap of the head and scale at the attachment time of the encoder, do not have to be considered in advance. That is, the phase difference between the position signal and reference position signal does not have to be strictly set or processed in the design and manufacturing. Therefore, the manufacturing cost or time for adjusting the assembly is reduced, and the restrictions in the design and manufacturing are reduced. This produces an advantage that the degree of freedom in the function can increase.

Moreover, in the present embodiment, as the judging means for selecting either the rise or the fall, the circuit for processing only two position signals in addition to the signal for detecting the reference position is used. At this time, the display 108 also includes about two LEDs. The burden by addition is light, but the stability of the reference position detection synchronized with the position signal can easily be realized.

Furthermore, in the present embodiment, except the signal processing circuit section 6, the member for generating the auxiliary signal is not disposed for the reference position detection. Therefore, the reference position can stably be detected in real time, and the small-sized and inexpensive encoder can be supplied.

Furthermore, with the synchronization method with the position signal of the detection direction, including a limiting function, as described in the eighth embodiment, the reference position detection is possible only when the displacement is caused in the given direction. This produces the advantages that the detection is not easily influenced by the backlashes of the movable part and the reference position does not have to be doubly detected at the reference position detection time. The reference position detection high in precision and convenient in use is possible.

Tenth Embodiment

[Constitution]

According to a tenth embodiment of the present invention, the judging means of the optimal synchronous position as in the seventh embodiment is added to the fourth embodiment. Since the major constitution of the encoder according to the present embodiment is similar to that of the fourth embodiment, the description is omitted.

Figure 23:
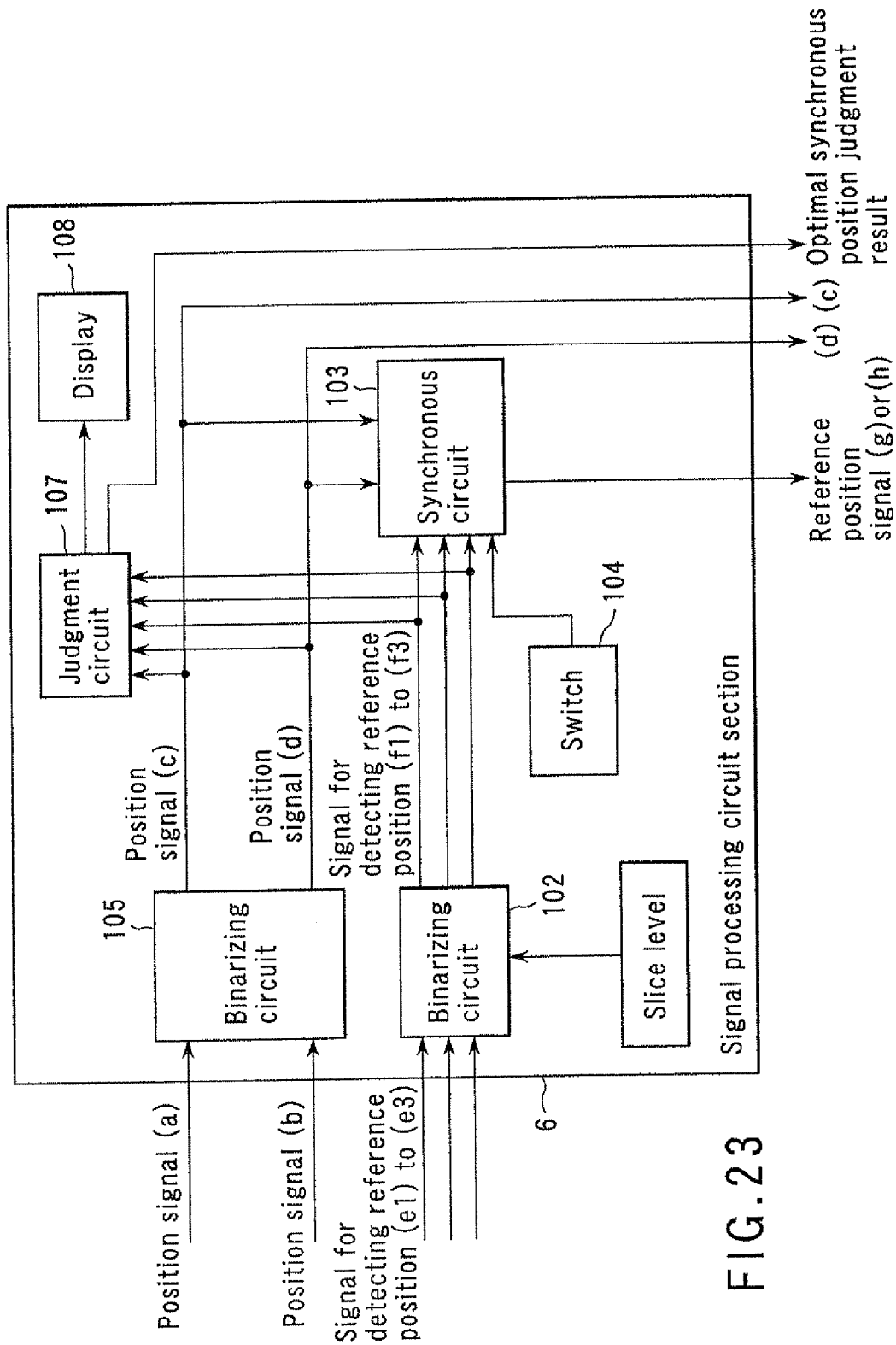
FIG. 23 is a block diagram showing the constitution of the signal processing circuit section of the encoder according to a tenth embodiment of the present invention.

FIG. 23 is a block diagram showing the constitution of the signal processing circuit section 6 of the encoder according to the tenth embodiment. That is, the signal processing circuit section 6 includes: the binarizing circuit 101 for converting the analog position signals (a) and (b) to the digital position signals (c) and (d); the binarizing circuit 102 for binarizing the signals for detecting the reference position (e1), (e2), and (e3) at the predetermined slice level to convert the signals to the digital signals for detecting the reference position (f1), (f2), and (f3); the synchronous circuit 103 for synchronizing one of the digital signals for detecting the reference position (f1), (f2), and (f3) from the binarizing circuit 102 with the digital position signals (c) and (d) from the binarizing circuit 101 to generate the reference position signal (g); the switch 104 for switching the timing of the synchronization in the synchronous circuit 103; the judgment circuit 107 for detecting the optimal synchronous position; and the display 108 for displaying the optimal synchronous position judgment result by the judgment circuit 107.

It is to be noted that in the state of FIG. 23, the reference position signal (g) is detected in synchronization with the position signal (a), but this can also be realized in synchronization with the position signal (b), (c), or (d) with the similar function.

[Operation]

Since a time chart showing that the input from the photodetector 5 shown in FIG. 9 is processed by the signal processing circuit section 6 of FIG. 23 is similar to that of FIG. 11 in the fourth embodiment, the following description will be made with reference to FIG. 11.

That is, in the binarizing circuit 101, the analog position signals (a) and (b) of the encoder which periodically change with the displacement are binarized to obtain the digital position signals (c) and (d). In the binarizing circuit 102, the signals for detecting the reference position (e1), (e2), and (e3) are binarized at the predetermined slice level to obtain the digital signals for detecting the reference position (f1), (f2), and (f3). Moreover, in the synchronous circuit 103, one of these digital signals for detecting the reference position (f1), (f2), and (f3) is selected in response to the switch 104. In this case, in the synchronous circuit 103, when the selected digital signal for detecting the reference position is brought in the detection state, the signal is synchronized with the rise of the position signal (a) or (c) to obtain the high level, and synchronized with the level change of the position signal (b) or (d) to obtain the low level, so that the reference position signal (g) is obtained. It is to be noted that in FIG. 11, the detection state parts of the reference position signal (g) corresponding to the digital signals for detecting the reference position (f1), (f2), and (f3) correspond to parts of the solid line, fine dotted line, and dotted line in the pulse-shaped parts.

Here, the position signals (a) and (c) have the phase difference of 90° from the position signals (b) and (d). The position signals (a) and (b) and the signals for detecting the reference position (e1), (e2), and (e3) which are analog signals may be signals of any type as long as the position signals (c) and (d) and the signals for detecting the reference position (f1), (f2), and (f3) which are digital signals can be created. Furthermore, the inputs from the detection system are only the digital signals, and may not include any analog signal. When the position signal is digitized, the resolution may be enhanced by the phase interpolation.

The position detection is carried out by inputting the digital position signals (c) and (d) into the counter (not shown). Moreover, when the reference position signal (g) is generated, the counter is reset, and it is accordingly possible to obtain the reference position of the position detection.

On the other hand, in the judgment circuit 107, the signal for detecting the reference position having the largest phase difference with respect to the closest rise of the position signal (c) at the time of the detection of the signal for detecting the reference position (f1), (f2), or (f3), that is, having a phase allowance is judged as stable and outputted. This optimal synchronous position judgment result is outputted to the display 108, or as the electric signal to the outside. It is to be noted that the display 108 may be of any type as long as the results are shown. For example, for three LEDs indicating the respective signals for detecting the reference position, the optimal LED may be lit at the time of the reference position detection. Alternatively, the display color of the LED which can be lit in three colors may be switched. It is to be noted that when it is judged that there are two stable alternatives, the alternatives are not necessarily limited to one, and two alternatives may simultaneously be displayed.

Here, the concrete judgment method will be described. In the position signals (a), (b), (c), and (d) of FIG. 11, the position signals (b) and (d) are ahead of the position signals (a) and (c) by the phase of 90°. These will be described with reference to FIGS. 24A and 24B. When a combination of the signal levels of the position signals (a) and (b) of FIG. 11 is represented in a two-dimensional graph, the signals move clockwise on circumferences of FIGS. 24A and 24B. Here, the level of the position signal (a) changes to be plus from minus. That is, the rise of the position signal (c) corresponds to an upper point, on the plus side of the position signal (b), among intersections of the vertical axis and the circle shown by arrows in FIGS. 24A and 24B. The position farthest from this point at the time of the detection of the signal for detecting the reference position can be said to be most stable even against the fluctuation of the system. The three points (f1), (f2), and (f3) in FIGS. 24A and 24B show the positions of the position signals (a) and (b) at the moment of the detection of the signals for detecting the reference position (f1), (f2), and (f3).

When the level of the position signal (d) at the time of the detection of the signal for detecting the reference position is the low level, that is, when the position signal at the detection time of the signal for detecting the reference position exists in a lower half on the circumference, there is a phase allowance of at least 90° or more, and the position is stable. The phase difference of the respective signals for detecting the reference position is known as about 120°. Therefore, the number of the signals for detecting the reference position at which the level of the position signal (d) at the time of the detection of the signal for detecting the reference position is the low level is one or two.

When the number of the signals for detecting the reference position, satisfying the conditions, is one as in the example of FIG. 24A, the signal may be judged as an optimal detection signal.

On the other hand, as in the example of FIG. 24B, when there are two signals for detecting the reference position, satisfying the conditions, both the signals may be regarded as stable. Here, two signals are further limited to one as follows. That is, in the example of FIG. 24B, there is only one signal for detecting the reference position (f2) at which the level of the position signal (d) is the high level. Since the phase difference of each signal for detecting the reference position is known and about 120°, the signal for detecting the reference position (f1) corresponding to a point (f1) having an opposite level (high level) with respect to the level (low level) of the position signal (a) (i.e., the position signal (c)) in a corresponding point (f2) can be judged as the most stable signal for detecting the reference position.

[Effect]

According to the present embodiment, when one is selected from a plurality of signals for detecting the reference position, it is possible to select the synchronous position with the position signal. Therefore, it is possible to select the synchronous position which reduces the deviation of the reference position possibly caused by the unstable factors such as the signal noise or wobble, and further the stability of the light source, temperature characteristics of the light emitting/receiving device and fluctuations, and the deviations from designs of individual encoders in the optical encoder. For example, it is supposed that by the above-described unstable factors, the output levels of the signals for detecting the reference position (e1), (e2), and (e3) shown in FIG. 11 change, or shift in the left/right direction in the figure, or the slice level slightly increases/decreases. At this time, the reference position signal (g) generated using the signals for detecting the reference position (e1) and (e3) is relatively stable. With the use of the signal for detecting the reference position (e2), since the signal is in the vicinity of the synchronous circuit with the position signal, the signal easily becomes unstable. In this case, the difference for one period is sometimes generated in the obtained reference position. However, when only one of the signals is constantly used, there is no practical problem. It is to be noted that as the way of synchronization, there is also a method for measuring the displacement in the vicinity of the reference position while synchronizing the signal for detecting the reference position with the position signal. In this case, the signal for detecting the reference position (e2) having a small difference is preferably used. In this case, there is a tolerance of detection position deviation for ±1 period at maximum. Therefore, when the reference position signal (g) is selected by the above-described method, the deterioration of the reference position detection precision is inhibited, and the stable reference position detection is possible.

Moreover, in the present embodiment, in order to synchronize the reference position signal with the position signal, there is disposed the judgment circuit 107 for judging the best signal for detecting the reference position among the signals for detecting the reference position. In the state in which the encoder is actually attached to the apparatus, the best synchronous position can be selected. In this case, in the present embodiment, when the synchronous position having a larger phase allowance is selected, it is possible to enhance the stability against the fluctuation. Therefore, the stability of the reference position detection synchronized with the position signal increases. Moreover, the influences of the fluctuation of the relative position and posture, such as the attachment angle or gap of the head and scale at the attachment time of the encoder, do not have to be considered in advance. That is, the phase difference between the position signal and reference position signal does not have to be strictly set or processed in the design and manufacturing. Therefore, the manufacturing cost or time for adjusting the assembly is reduced, and the restrictions in the design and manufacturing are reduced. This produces an advantage that the degree of freedom in the function can increase.

Moreover, in the present embodiment, as the judging means for selecting any of three signals for detecting the reference position, the circuit for processing only two position signals in addition to the signal for detecting the reference position is used. At this time, the display 108 also includes about three LEDs. The burden by addition is light, but the stability of the reference position detection synchronized with the position signal can easily be realized.

Eleventh Embodiment

[Constitution]

An eleventh embodiment of the present invention will next be described. In the same manner as in the eighth embodiment, the major constitution of the encoder according to the present embodiment except the signal processing circuit section 6 is not especially limited as long as the position signal and the signal for detecting the reference position are obtained. For example, the general constitution may be used such as the optical encoder constitution shown as the constitution of the major part of the above-described first embodiment in FIG. 1. In the example of FIG. 1, the optical encoder has been described, but the other types such as the magnetic type may also be used.

Figure 25:
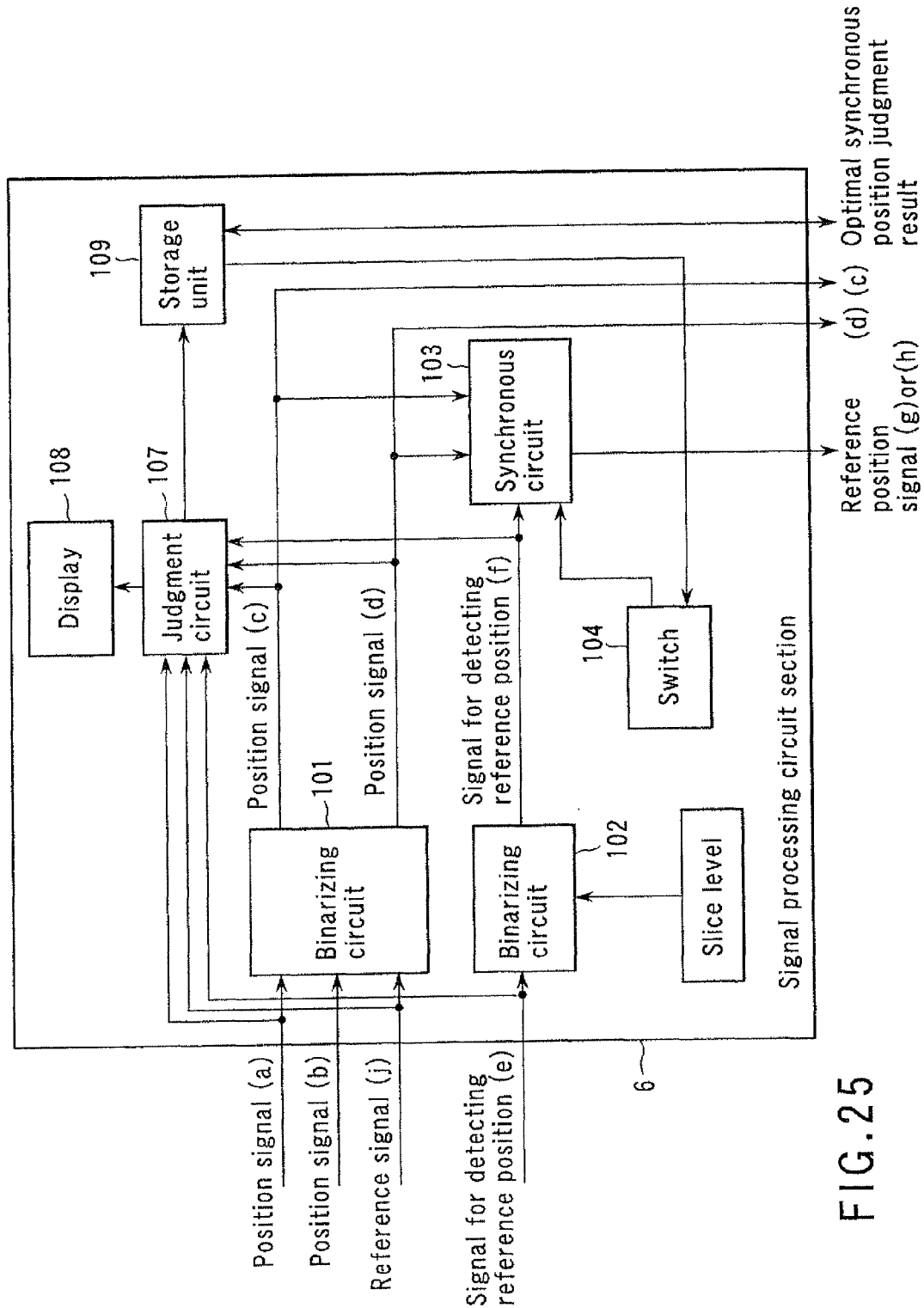
FIG. 25 is a block diagram showing the constitution of the signal processing circuit section of the encoder according to an eleventh embodiment of the present invention.

Moreover, the signal processing circuit section 6 in the eleventh embodiment is constituted as shown in FIG. 25. That is, the signal processing circuit section 6 according to the eleventh embodiment includes: the binarizing circuit 101 for converting the analog position signals (a) and (b) to the digital position signals (c) and (d); the binarizing circuit 102 for binarizing the signal for detecting the reference position (e) at the predetermined slice level to convert the signal to the digital signal for detecting the reference position (f); the synchronous circuit 103 for synchronizing the digital signal for detecting the reference position (f) from the binarizing circuit 102 with the digital position signals (c) and (d) from the binarizing circuit 101 to generate the reference position signal (g) or (h); the switch 104 for switching the timing of the synchronization in the synchronous circuit 103; the judgment circuit 107 for detecting the optimal synchronous position; the display 108 for displaying the optimal synchronous position judgment result by this judgment circuit 107; and a storage unit 109 in which the optimal synchronous position judgment result by the judgment circuit 107 is stored and the switch 104 can be switched by a command.

Furthermore, in the present embodiment, a reference signal (j) is further given. The reference signal (j) is a reference signal which indicates an amplitude center level of the position signals (a) and (b), and is used in the binarizing circuit 101 and judgment circuit 107. For example, when the position signals (a) and (b) are designed so as to change in a range of –5 V to 5 V, the reference signal (j) indicates 0 V. When the position signals (a) and (b) are designed so as to change in a range of 0 V to 5 V, the reference signal indicates 2.5 V.

It is to be noted that the binarizing circuit 101 does not have to necessarily obtain a binarized signal, and may also obtain a digitized signal of a plurality of bits. With the signal of the bits, only an uppermost code bit is extracted in order to extract binarized data, and then the equal processing is subsequently possible.

Moreover, the constitution of the synchronous circuit 103 in the signal processing circuit section 6 may be similar to that of FIGS. 19A to 20. On the other hand, the judgment circuit 107 includes a constitution shown in FIG. 26 or 27.

Figure 26:
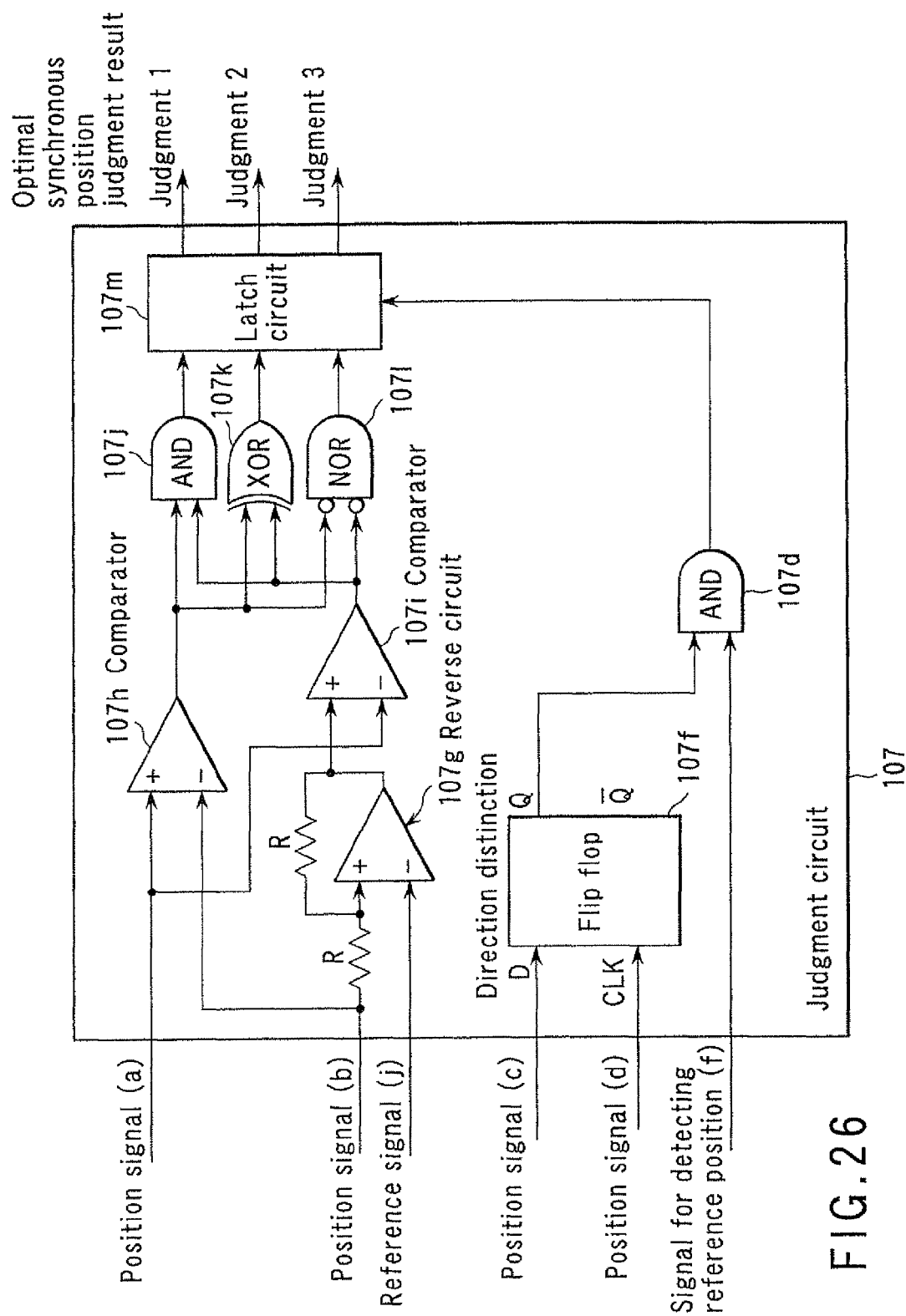
FIG. 26 is a diagram showing the constitution of the judgment circuit in the signal processing circuit section of the encoder according to the eleventh embodiment.

That is, in the constitution shown in FIG. 26, the position signal (b) is inputted into a reverse circuit 107g which is constituted using an OP amplifier and two resistances having an equal resistance value and in which the reference signal (j) is a reference. The position signals (a) and (b) are inputted into a first comparator 107h, and the position signal (a) and the reversed signal of the position signal (b), prepared in the reverse circuit 107g, are inputted into a second comparator 107i. Moreover, the outputs from these two comparators 107h, 107i are inputted into an AND circuit 107j, XOR circuit 107k, and NOR circuit 107l, and the outputs of these three logic circuits 107j, 107k, 107l are inputted into a latch circuit 107m. On the other hand, the position signal (c) which is the data D, and the position signal (d) which is the clock CLK are inputted into the flip flop 107f such as LS423 of a D-C trigger type. Moreover, the output Q of the flip flop 107f and the signal for detecting the reference position (f) are inputted into the AND circuit 107d, and the result is inputted into the trigger of the latch circuit 107m. Therefore, three signals latched at the rise of this trigger signal are obtained as the optimal synchronous position judgment results (judgments 1 to 3).

Figure 27:
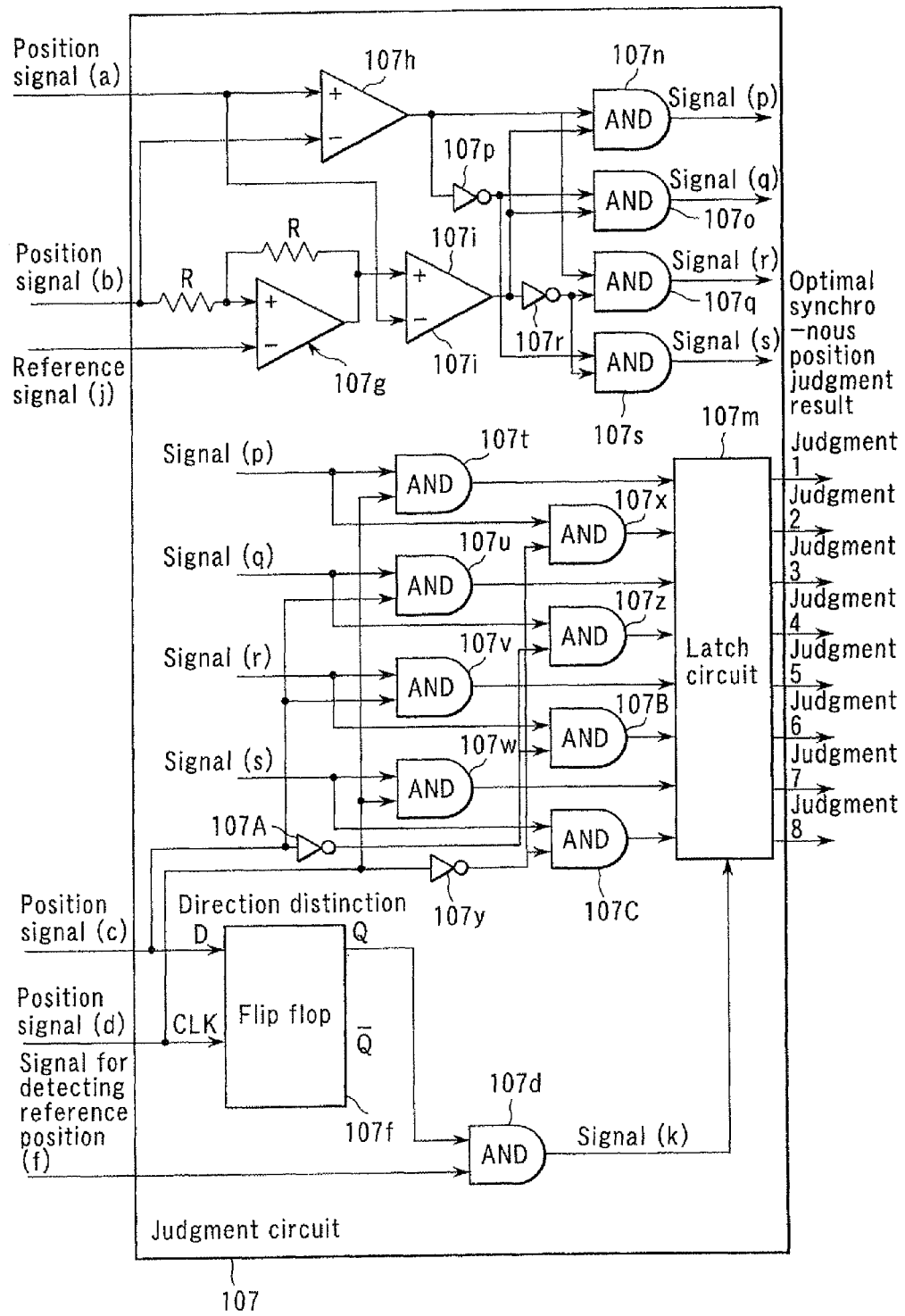
FIG. 27 is a diagram showing another constitution of the judgment circuit in the signal processing circuit section of the encoder according to the eleventh embodiment.

Moreover, in the constitution shown in FIG. 27, the position signal (b) is inputted into the reverse circuit 107g which is constituted using the OP amplifier and two resistances having the equal resistance value and in which the reference signal (j) is the reference. The position signals (a) and (b) are inputted into the first comparator 107h, and the position signal (a) and the reversed signal of the position signal (b), prepared in the reverse circuit 107g, are inputted into the second comparator 107i. Moreover, the outputs from these two comparators 107h, 107i and reversed signals of the outputs are inputted into four AND circuits as follows. That is, the outputs of the comparators 107h and 107i are inputted into an AND circuit 107n. The reversed signal obtained by reversing the output of the comparator 107h in an NOT circuit 107p, and the output of the comparator 107i are inputted into an AND circuit 107o. The output of the comparator 107h, and the reversed signal obtained by reversing the output of the comparator 107i in a NOT circuit 107r are inputted into an AND circuit 107q. Moreover, the reversed signal obtained by reversing the output of the comparator 107h in a NOT circuit 107o, and the reversed signal obtained by reversing the output of the comparator 107i in the NOT circuit 107r are inputted into an AND circuit 107s. Here, the outputs of these AND circuits 107n, 107o, 107q, 107s are obtained as signals (p), (q), (r), (s).

Furthermore, these signals (p) to (s), the position signals (c) and (d), and the reversed signals of these position signals (c) and (d) are inputted into eight AND circuits as follows. That is, the signal (p) and position signal (d) are inputted into an AND circuit 107t, the signal (q) and position signal (c) are inputted into an AND circuit 107u, the signal (r) and position signal (c) are inputted into an AND circuit 107v, and the signal (s) and position signal (d) are inputted into an AND circuit 107w. The signal (p) and the reversed signal obtained by reversing the position signal (d) in a NOT circuit 107y are inputted into an AND circuit 107x, the signal (q) and the reversed signal obtained by reversing the position signal (c) in a NOT circuit 107A are inputted into an AND circuit 107z, the signal (r) and the reversed signal of the position signal (c) are inputted into an AND circuit 107B, and the signal (s) and the reversed signal of the position signal (d) are inputted into the AND circuit 107C. Moreover, the outputs of these eight AND circuits 107t to 107x, 107z, 107B, 107C are inputted into the latch circuit 107m.

On the other hand, the position signal (c) which is the data D, and the position signal (d) which is the clock CLK are inputted into the flip flop 107f such as LS423 of the D-C trigger type. Moreover, the output Q of the flip flop 107f and the signal for detecting the reference position (f) are inputted into the AND circuit 107d, and a signal (k) which is the result is inputted into the trigger of the latch circuit 107m. Therefore, eight signals latched at the rise of this trigger signal are obtained as the optimal synchronous position judgment results (judgments 1 to 8).

Moreover, the storage unit 109 is mainly constituted of nonvolatile storage mediums such as SRAM and flash ROM, and also constituted of a logic array or CPU for processing the judgment result or for the input/output if necessary. In the storage unit 109, the judgment result from the judgment circuit 107 is stored, and the stored judgment result is outputted to the outside in response to the command from the outside. When the judgment result is sent to the switch 104, the position is switched to the synchronous position where the synchronous circuit 103 is judged as optimal.

[Operation]

A time chart when the input from the photodetector 5 shown in FIG. 1 is processed by the signal processing circuit section 6 in the present embodiment is similar to that of FIG.

3 in the above-described first embodiment, and therefore the following description will be made with reference to FIG. 3.

That is, in the binarizing circuit 101, the analog position signals (a) and (b) of the encoder which periodically change with the displacement (relative movement of the scale 4) are binarized to obtain the digital position signals (c) and (d). In the binarizing circuit 102, the signal for detecting the reference position (e) is binarized at the predetermined slice level to obtain the digital signal for detecting the reference position (f).

Moreover, one is selected from the following two methods to obtain the reference position signal. In the first method, in the detection circuit 103k of the synchronous circuit 103, the digital signal for detecting the reference position (f) is synchronized with the rise of the position signal (a) or (c) to obtain the high level, and synchronized with the level change of the position signal (b) or (d) to obtain the low level, so that the reference position signal (g) is obtained. Here, the level changes of the position signals (a) and (b) which are the analog signals indicate a level change of the reference signal (j) upwards from the lower level or downwards from the upper level. In the second method, in the detection circuit 103l of the synchronous circuit 103, the digital signal for detecting the reference position (f) is synchronized with the fall of the position signal (a) or (c) to obtain the high level, and synchronized with the level change of the position signal (b) or (d) to obtain the low level, so that the reference position signal (h) is obtained. One is selected from these two to output the reference position signal (g) or (h), and the selection is carried out by the switch 104.

Here, the reference position signal (g) will be described in more detail with reference to FIG. 19B.

First, the direction distinction will be described. The position signal (d) is inputted into the data D of the flip flop 103k1, and the position signal (c) is inputted into the clock CLK. As a result, the signal outputted from the output $\overline{Q}$ of the flip flop 103k1 is updated as the reversed signal of the position signal (d) at every rise of the position signal (c). Therefore, only when the position signal (d) indicates the low level at the time of the rise of the position signal (c), the output $\overline{Q}$ of the flip flop 103k1 indicates the high level, and the direction distinction is therefore possible. Moreover, when the AND circuit 103k2 obtains the logical product of the detection direction distinction signal and the signal for detecting the reference position (f), the detection direction is correct and the signal for detecting the reference position (f) is in the detection state in the limited case.

Moreover, the conditions for generating the reference position signal are further added. That is, in the present embodiment, the reference position signal is detected between the rise of the position signal (c) and the rise of the position signal (d). The rise edge of the position signal (c) is an important timing, the detection width may be designated by the time or by the displacement amount of the measurement object, and the width itself may arbitrarily be designated. When the direction is designated, the case including the rise of the position signal (c) till the rise of the position signal (d) is equivalent to the case where the position signal (c) has the high level and the position signal (d) has the low level. Therefore, the conditions are added.

That is, from the above, the reference position signal (g) is obtained by obtaining the logical product of four cases where the position signal (c) indicates the high level, the position signal (d) indicates the low level, the position signal (d) indicates the low level at the rise of the position signal (c) in the direction distinction, and the signal for detecting the reference position (f) indicates the high level (detecting state).

It is to be noted that the position signals (a) and (c) have a phase difference of 90° from the position signals (b) and (d). The position signals (a) and (b) and the signal for detecting the reference position (e) which are analog signals may be signals of any type as long as the position signals (c) and (d) and the signal for detecting the reference position (f) which are digital signals can be created. The inputs from the photodetector 5 shown in FIG. 1 may be only the digital signals, and may not include any analog signal. When the inputted analog position signal is digitized, the resolution may be enhanced by the phase interpolation.

Moreover, the position detection is carried out by inputting the digital position signals (c) and (d) into the counter (not shown). In this case, when the reference position signal (g) or (h) is generated, the counter is reset, and it is accordingly possible to obtain the reference position of the position detection.

It is to be noted that FIG. 6 shows the change of each signal when the displacement occurs in the direction opposite to that of FIG. 3. At this time, the progresses of the analog position signals (a) and (b) and the digital position signals (c) and (d) are reversed. When the displacement occurs in the opposite direction in this manner, the synchronous circuit 103 does not bring the reference position signals (g) and (h) into the detection state by the constitution and function shown in FIG. 19A (and FIG. 20). Therefore, the reference position is not detected in the displacement of the opposite direction. It is to be noted that when the synchronous circuit 103 shown in FIGS. 19A to 20 is appropriately designed, the reference position detection may also be possible only in the displacement of the opposite direction.

On the other hand, it is judged in the judgment circuit 107 that the phase of the position signal (c) at the time of the detection of the signal for detecting the reference position (f) is in the vicinity of the closest rise (assumed to be the phase of 0°) or fall (assumed to be the phase of 180°) in a stepwise manner, and the signal having a larger phase difference is regarded as stable and outputted. This optimal synchronous position judgment result is outputted to the display 108, and stored in the storage unit 109.

Figure 28A:
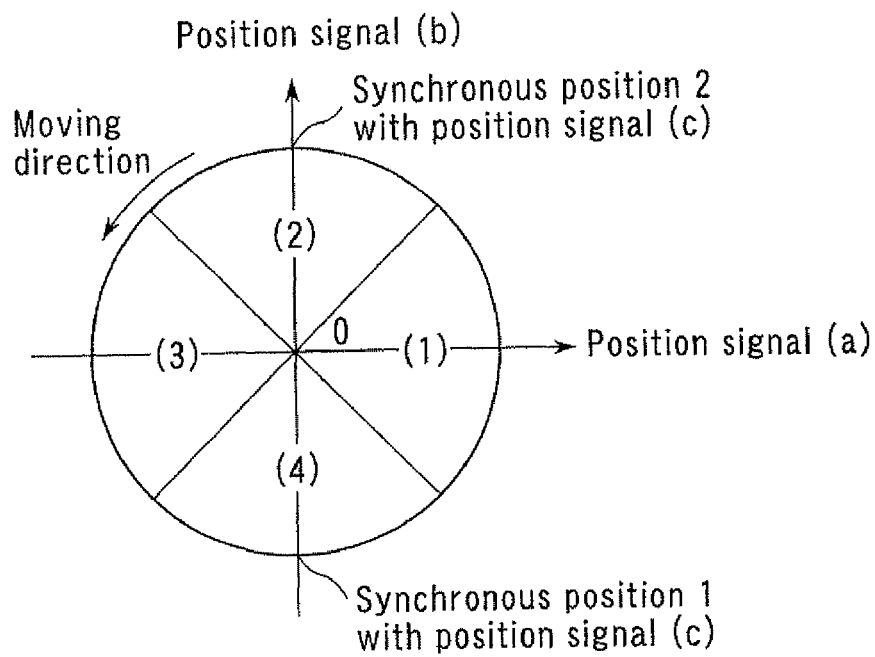
FIGS. 28A and 28B are explanatory views of area dividing for judging the optimal synchronous position.
Figure 28B:
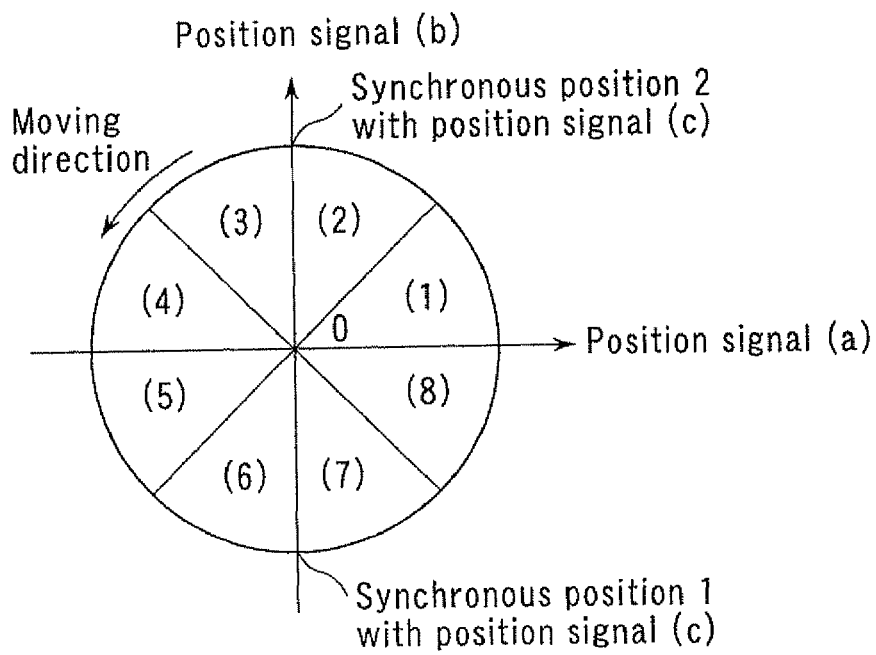

Here, with reference to FIGS. 28A and 28B, area dividing for the judgment will be described. It is to be noted that in these figures, the horizontal axis shows the level of the position signal (a), and the vertical axis shows the level of the position signal (b). Since two position signals (a) and (b) have a phase difference of 90° and equal amplitude, a point determined by two position signals at a certain time is on The circumference of the Lissajous circle having a radius of ½ of the amplitude. This point moves clockwise or counterclockwise on the Circumference of the Lissajous circle with time by an amount corresponding to the displacement. A synchronous position 1 in FIGS. 28A and 28B corresponds to the rises of the position signals (a) and (c), and a synchronous position 2 corresponds to the falls of the position signals (a) and (c).

In FIG. 28A, an area is divided into areas (1) to (4) counterclockwise from a positive side of the position signal (a) of a first quadrant. When it is judged that the point determined by the position signals (a) and (b) in the rise of the signal for detecting the reference position (f) exists in any of the areas (1) to (4), the synchronous position is determined. That is, when the point is in the area (2), the phase difference with respect to the synchronous position 1 is large, and the synchronous position 1 is therefore obtained as the judgment result. When the point is in the area (1) or (3), there is an allowance of 45° or more with respect to either of the synchronous positions 1, 2, and therefore the judgment result indicates that either position may be determined. Moreover, when the point is in the area (4), the phase difference with respect to the synchronous position 2 is large, and the synchronous position 2 is therefore obtained as the judgment result.

For this area dividing, when the judgment circuit 107 including the constitution of FIG. 26 is used, the following two judgments are performed.

Position signal (a)>position signal (b)  (Logical Formula 1)

Position signal (a)<reversed signal of the position signal (b)  (Logical Formula 2)

With respect to Logical Formulas 1 and 2, the judgment is performed in three cases where both the formulas are true, only one is true, and both are false. In a predetermined moving direction, and at the rise of the signal for detecting the reference position (f), the judgment result is latched and outputted.

Moreover, in FIG. 28B, the area is divided into areas (1) to (8) counterclockwise from the positive side of the position signal (a) of the first quadrant. When it is judged that the point determined by the position signals (a) and (b) in the rise of the signal for detecting the reference position (f) exists in any of the areas (1) to (8), the synchronous position is determined. That is, when the point is in the area (2) or (3), the phase difference with respect to the synchronous position 1 is large, and the synchronous position 1 is therefore obtained as the judgment result. When the point is in the area (1) or (4), there is an allowance of 90° or more rather with respect to the synchronous position 1, and therefore the judgment result rather with the synchronous position 1 is obtained. When the point is in the area (5) or (8), there is an allowance of 90° or more rather with respect to the synchronous position 2, and therefore the judgment result rather with the synchronous position 2 is obtained. Moreover, when the point is in the area (6) or (7), the phase difference with respect to the synchronous position 2 is large, and the synchronous position 2 is therefore obtained as the judgment result.

As described above, eight areas may be reduced to four and used in the judgment. In this case, the respective judgment results of FIG. 27 may be arranged using the AND circuit with respect to segments described above.

For this area dividing, when the judgment circuit 107 including the constitution of FIG. 26 is used, the following four judgments are performed.

Position signal (a)>position signal (b)  (Logical Formula 3)

Position signal (a)<reversed signal of the position signal (b)  (Logical Formula 4)

Level (true/false) of the position signal (c)  (Logical Formula 5)

Level (true/false) of the position signal (d)  (Logical Formula 6)

There are eight true/false combinations possibly taken by these Logical Formulas 3, 4, 5, and 6.

The judgment is performed in the cases where both are true, only one is true, and both are false. In the predetermined moving direction, and at the rise of the signal for detecting the reference position (f), the judgment result is latched and outputted.

It is to be noted that the display 108 may be of any type as long as the results are shown. For example, the display includes a plurality of LEDs, and the LED corresponding to the optimal rise or fall, and the LED showing the stability may be lit at the time of the reference position detection. The LED corresponding to not only the stability but also a phase relation can be lit.

[Effect]

It is possible to select the synchronous position with the position signal in accordance with the way of the output of the signal for detecting the reference position. Therefore, it is possible to select the synchronous position which reduces the deviation of the reference position possibly caused by the unstable factors such as the signal noise or wobble, and further the stability of the light source, temperature characteristics of the light emitting/receiving device and fluctuations, and deviations from designs of individual encoders in the optical encoder. For example, it is considered that by the above-described unstable factors, the output level of the signal for detecting the reference position (e) of FIG. 3 rises, or shifts in the left direction in the figure, or the slice level slightly drops. At this time, assuming that the signal for detecting the reference position (e) changes to the fine line from the bold line, the digital signal for detecting the reference position (f) changes as shown by the broken line. Accordingly, the position deviating by one period as shown by the broken line in the reference position signal (h) is detected as the reference position signal. On the other hand, this change does not easily occur in the reference position signal (g). Therefore, when the reference position signal (g) is selected, the deterioration of the reference position detection precision is inhibited, and it is possible to stably detect the reference position.

Moreover, in order to synchronize the reference position signal with the position signal, there is disposed the judgment circuit 107 for judging the best synchronous position among the synchronous positions. In the state in which the encoder is actually attached to the apparatus, the best synchronous position can be selected. In the present embodiment, when the synchronous position having a larger phase allowance is selected, it is possible to enhance the stability against the fluctuation. Therefore, the stability of the reference position detection synchronized with the position signal increases. Moreover, the influences of the fluctuation of the relative position and posture, such as the attachment angle or gap of the head and scale at the attachment time of the encoder, do not have to be considered in advance. That is, the phase difference between the position signal and reference position signal does not have to be strictly set or processed in the design and manufacturing. Therefore, the manufacturing cost or time for adjusting the assembly is reduced, and the restrictions in the design and manufacturing are reduced. This produces the advantage that the degree of freedom in the function can increase.

Moreover, in the present embodiment, as the judging means for selecting either the rise or the fall, the circuit for processing only two position signals in addition to the signal for detecting the reference position is used. At this time, the display 108 also includes about two LEDs. The burden by addition is light, but the stability of the reference position detection synchronized with the position signal can easily be realized.

Furthermore, in the present embodiment, except the signal processing circuit section 6, the member for generating the auxiliary signal is not disposed for the reference position detection. Therefore, the reference position can stably be detected, and the small-sized and inexpensive encoder can be supplied.

Furthermore, the reference position detection is possible only when the displacement is caused in the given direction. This produces the advantages that the detection is not easily influenced by the backlashes of the movable part and the reference position does not have to be doubly detected at the reference position detection time. The reference position detection high in precision and convenient in use is possible.

Additionally, in the present embodiment, a behavior of the system can be confirmed from the judgment result successively stored in the storage unit 109 with an elapse of time. For example, in the segments of FIG. 28B, shift to an adjacent segment result from a certain segment result is possibly caused by the slight fluctuation of the constitution of the movable member or the detection system. Even when the result can be tolerated, but when there is a given or more fluctuation, or different results are obtained every measurement, it can be judged that there is a problem. Also in the reference position, only when there is not any fluctuation after obtaining the reference position, the position is satisfactory. In this case, for example, it is possible to obtain the reference position at the rise of the system and to reselect the optimal synchronous position every time, and self adjustment is possible with respect to a moderate fluctuation with the elapse of time.

Twelfth Embodiment

[Constitution]

Next, a twelfth embodiment of the present invention will be described. In the same manner as in the eighth embodiment, the major constitution of the encoder according to the present embodiment except the signal processing circuit section 6 is not especially limited as long as the position signal and the signal for detecting the reference position are obtained. For example, the general constitution may be used such as the optical encoder constitution shown as the constitution of the major part of the above-described first embodiment in FIG. 1. In the example of FIG. 1, the optical encoder has been described, but another type of the encoder or the displacement sensor such as a magnetic/electrostatic type may also be used as long as the position signal and reference position signal are obtained in accordance with the displacement amount.

Figure 29:
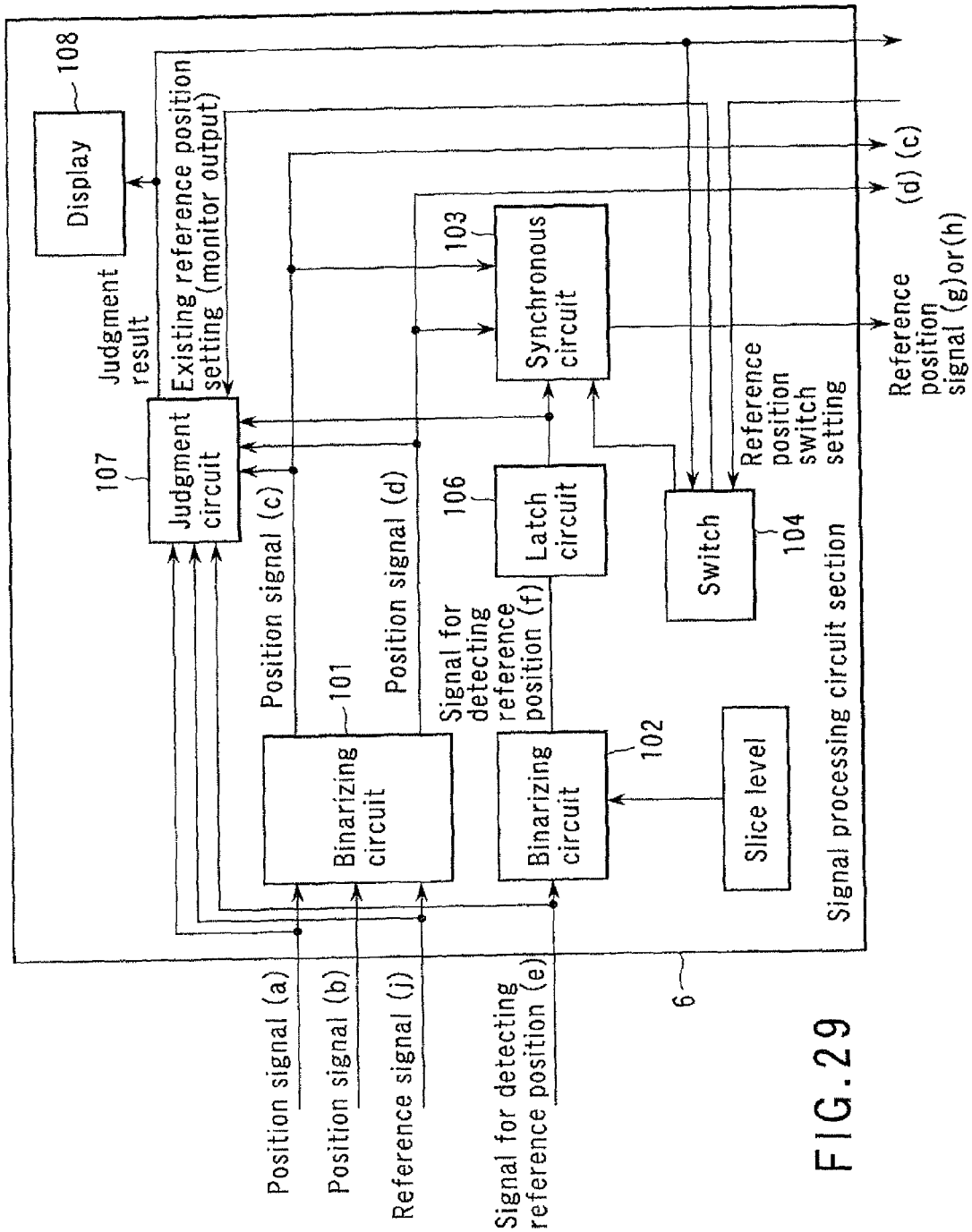
FIG. 29 is a block diagram showing the constitution of the signal processing circuit section of the encoder according to a twelfth embodiment of the present invention.

Moreover, the signal processing circuit section 6 in the twelfth embodiment is constituted as shown in FIG. 29. That is, the signal processing circuit section 6 according to the twelfth embodiment includes: the binarizing circuit 101 for converting the analog position signals (a) and (b) to the digital position signals (c) and (d); the binarizing circuit 102 for binarizing the signal for detecting the reference position (e) at the predetermined slice level to convert the signal to the digital signal for detecting the reference position (f); the latch circuit 106 for latching the digital signal for detecting the reference position (f) from the binarizing circuit 102; the synchronous circuit 103 for synchronizing the digital signal for detecting the reference position (f) from the latch circuit 106 with the digital position signals (c) and (d) from the binarizing circuit 101 to generate the reference position signal (g) or (h); the switch 104 for switching the timing of the synchronization in the synchronous circuit 103; the judgment circuit 107 for detecting the optimal synchronous position and judging the stability of the existing synchronous position; and the display 108 for displaying the optimal synchronous position judgment result by this judgment circuit 107.

Furthermore, in the present embodiment, the reference signal (j) is further given. The reference signal (j) is a reference signal which indicates the amplitude center level of the position signals (a) and (b), and is used in the binarizing circuit 101 and judgment circuit 107. For example, when the position signals (a) and (b) are designed so as to change in a range of −5 V to 5 V, the reference signal (j) indicates 0 V.

When the position signals (a) and (b) are designed so as to change in a range of 0 V to 5 V, the reference signal indicates 2.5 V.

It is to be noted that in the judgment circuit 107, the reference signal (j) is not necessarily required depending on a processing content. The binarizing circuit 101 does not have to necessarily obtain the binarized signal, and may also obtain a digitized signal of a plurality of bits. With the signal of the bits, only the uppermost code bit is extracted in order to extract the binarized data, and then the equal processing is subsequently possible.

Here, reference position generating position candidates and the division of Lissajous figure of the analog position signals (a) and (b) will be described with reference to FIGS. 30 to 32. It is to be noted that FIGS. 30 to 32 show separate constitutions, and can both correspond to the circuit constitution shown in FIG. 29, and both are shown side by side.

Figures 30, 31:
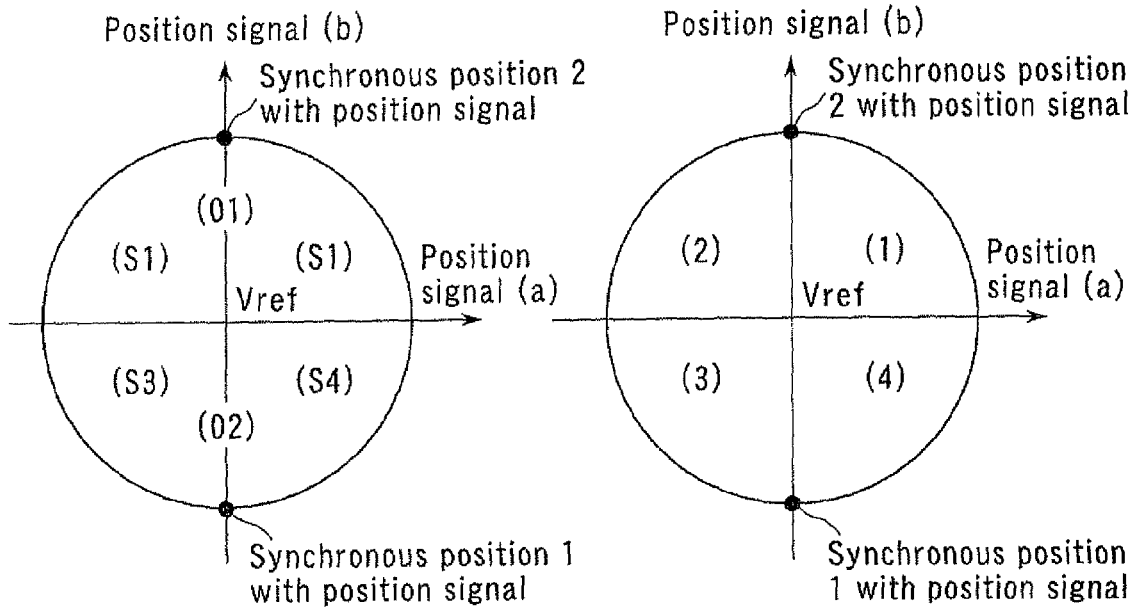
FIG. 30 is a diagram showing reference position signal generating position candidates and division of Lissajous figure of the analog position signals (a) and (b)
FIG. 31 is a diagram showing the reference position signal generating position candidates and another division of Lissajous figure of the analog position signals (a) and (b)

In FIG. 30, the phases of the reference position signal generating position candidates can be the two intersections of the vertical axis and Lissajous circle, and there is a phase difference of 180° with respect to the period of the position signals (a) and (b). Here, one on the minus side of the vertical axis is assumed to be the synchronous position 1, and the other on the plus side of the vertical axis is the synchronous position 2. Two segments are obtained by dividing the Lissajous circle by the horizontal axis for judging the optimal synchronous position: the one on the plus side of the vertical axis is a segment (O1), and the other on the minus side of the vertical axis is a segment (O2). Furthermore, there are four segments divided by the vertical and horizontal axes for the phase stability judgment of the presently designated reference position candidate, and numbers (S1) to (S4) are attached counterclockwise from the first quadrant.

Moreover, in FIG. 31, the phases of the reference position signal generating position candidates can be the two intersections of the vertical axis and Lissajous circle, and there is a phase difference of 180° as seen from the position signals (a) and (b) which are references. Here, one on the minus side of the vertical axis is assumed to be the synchronous position 1, and the other on the plus side of the vertical axis is the synchronous position 2. There are four segments divided by the vertical and horizontal axes, and numbers (1) to (4) are attached counterclockwise from the first quadrant as shown in FIG. 31.

Figure 32:
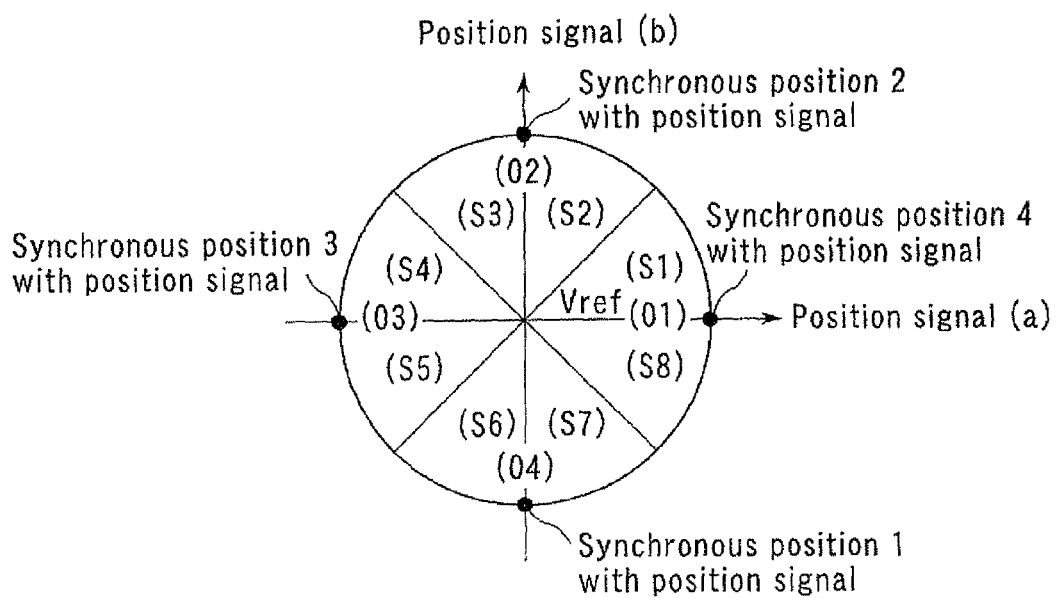
FIG. 32 is a diagram showing the reference position signal generating position candidates and still another division of Lissajous figure of the analog position signals (a) and (b)

Furthermore, in FIG. 32, the phases of the reference position signal generating position candidates can be the four intersections of two axes including the vertical and horizontal axes with the Lissajous circle, and the phases are arranged at an interval of the phase difference of 90° as seen from the position signals (a) and (b) which are references. Here, one on the minus side of the vertical axis is assumed to be the synchronous position 1, one on the plus side of the vertical axis is the synchronous position 2, one on the minus side of the horizontal axis is the synchronous position 3, and one on the plus side of the horizontal axis is the synchronous position 4. There are four segments obtained by dividing the Lissajous circle by two straight lines represented in the following two equations, and numbers (O1) to (O4) are attached counterclockwise starting from the plus side of horizontal axis as shown in FIG. 32. Additionally, in the following two equations, Va denotes the output of the position signal (a), Vb denotes the output of the position signal (b), and Vref denotes the value of the reference signal (j).

$$Va = Vb \quad \text{(Equation 3)}$$

$$Va + Vb = 2Vref \quad \text{(Equation 4)}$$

Moreover, there are eight segments obtained by dividing the Lissajous circle by four straight lines in total including two straight lines represented in Equations 3 and 4, the vertical axis, and the horizontal axis for the phase stability judgment of the presently designated reference position candidate, and numbers (S1) to (S8) are attached starting from the segment in the first quadrant and in the vicinity of plus side of the horizontal axis as shown in FIG. 32.

A plurality of synchronous position candidates in the above-described example of FIGS. 30 to 32 are set so that one or more phases of the reference position signal generating position candidates are included in any segment, when Lissajous waveform of two periodical signals with a phase difference of 90° is divided into two segments by any straight line passing through the amplitude center. In a setting as the one described here, for any position where the signal for detecting the reference position is generated, there will be necessarily a synchronous position candidate having a phase allowance of ±90° or more from the position.

Figure 33:
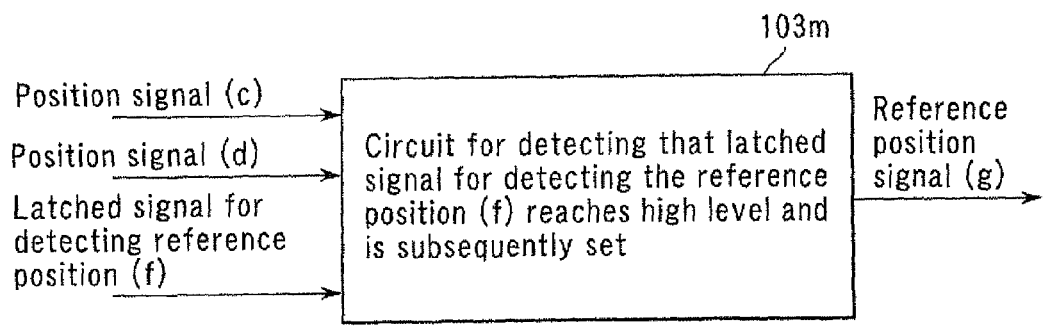
FIG. 33 is a diagram showing the constitution of the synchronous circuit in the signal processing circuit section of the encoder according to the twelfth embodiment.

Moreover, it is assumed that the synchronous circuit 103 in the signal processing circuit section 6 includes the constitution shown in FIGS. 33 to 38. It is to be noted that here FIGS. 34 to 38 show five concrete examples of a detection circuit 103m for generating the reference position signal synchronized with the position signal as shown in FIG. 33. For two circuits including the detection circuit of the signal for detecting the reference position and a direction distinction circuit in these concrete examples, the flip flop such as LS423 of the D-C trigger type is used.

Figure 34:
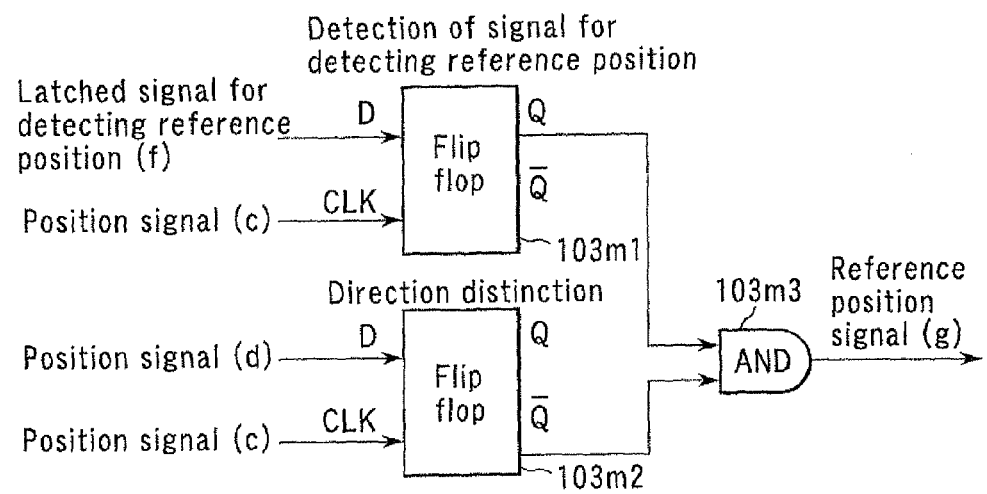
FIG. 34 is a diagram showing a concrete constitution of the circuit of FIG. 33.

In the concrete example shown in FIG. 34, a flip flop 103m1 constituting a circuit for detecting the signal for detecting the reference position which outputs the value of the latched signal for detecting the reference position (f); a flip flop 103m2 constituting a direction distinction circuit for detecting displacement counterclockwise on the Lissajous circle; and an AND circuit 103m3 for obtaining the logical product of the outputs constitute the detection circuit 103m for detecting that the latched signal for detecting the reference position (f) reaches the high level and is in the set synchronous position. That is, the signal for detecting the reference position (f) latched by the latch circuit 106 is inputted into the data D of the flip flop 103m1, the position signal (c) is inputted into the clock CLK, and the output Q is inputted into the AND circuit 103m3. The position signal (d) is inputted into the data D of the flip flop 103m2, the position signal (c) is inputted into the clock CLK, and the output $\overline{Q}$ is inputted into the AND circuit 103m3.

Figure 35:
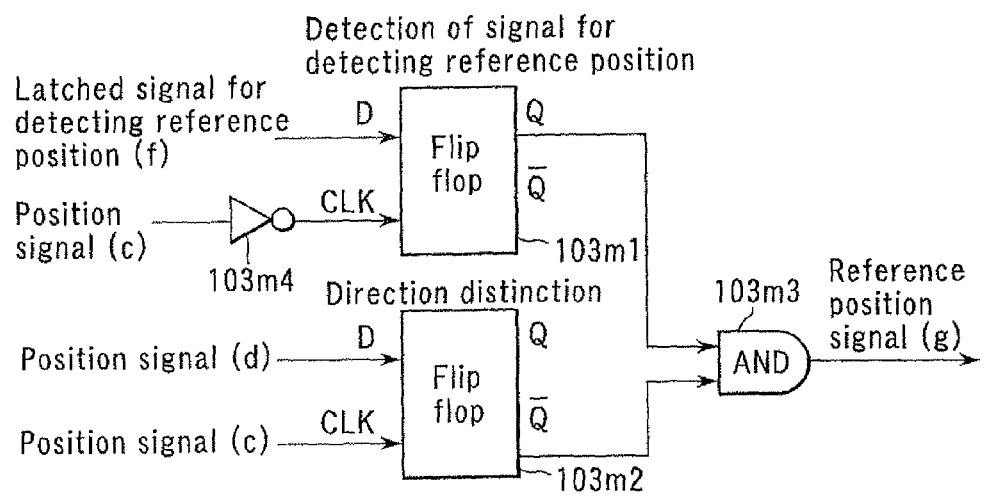
FIG. 35 is a diagram showing another concrete constitution of the circuit of FIG. 33.

Moreover, in the concrete example shown in FIG. 35, the flip flop 103m1 and NOT circuit 103m4 constituting the circuit for detecting the signal for detecting the reference position, which outputs the value of the latched signal for detecting the reference position (f) at the fall of the position signal (c); the flip flop 103m2 constituting the direction distinction circuit for detecting the displacement clockwise on the Lissajous circle; and the AND circuit 103m3 for obtaining the logical product of the outputs constitute the detection circuit 103m for detecting that the latched signal for detecting the reference position (f) reaches the high level and is in the set synchronous position. That is, the signal for detecting the reference position (f) latched by the latch circuit 106 is inputted into the data D of the flip flop 103m1, the position signal (c) reversed by the NOT circuit 103m4 is inputted into the clock CLK, and the output Q is inputted into the AND circuit 103m3. The position signal (d) is inputted into the data D of the flip flop 103m2, the position signal (c) is inputted into the clock CLK, and the output Q is inputted into the AND circuit 103m3.

Figure 36:
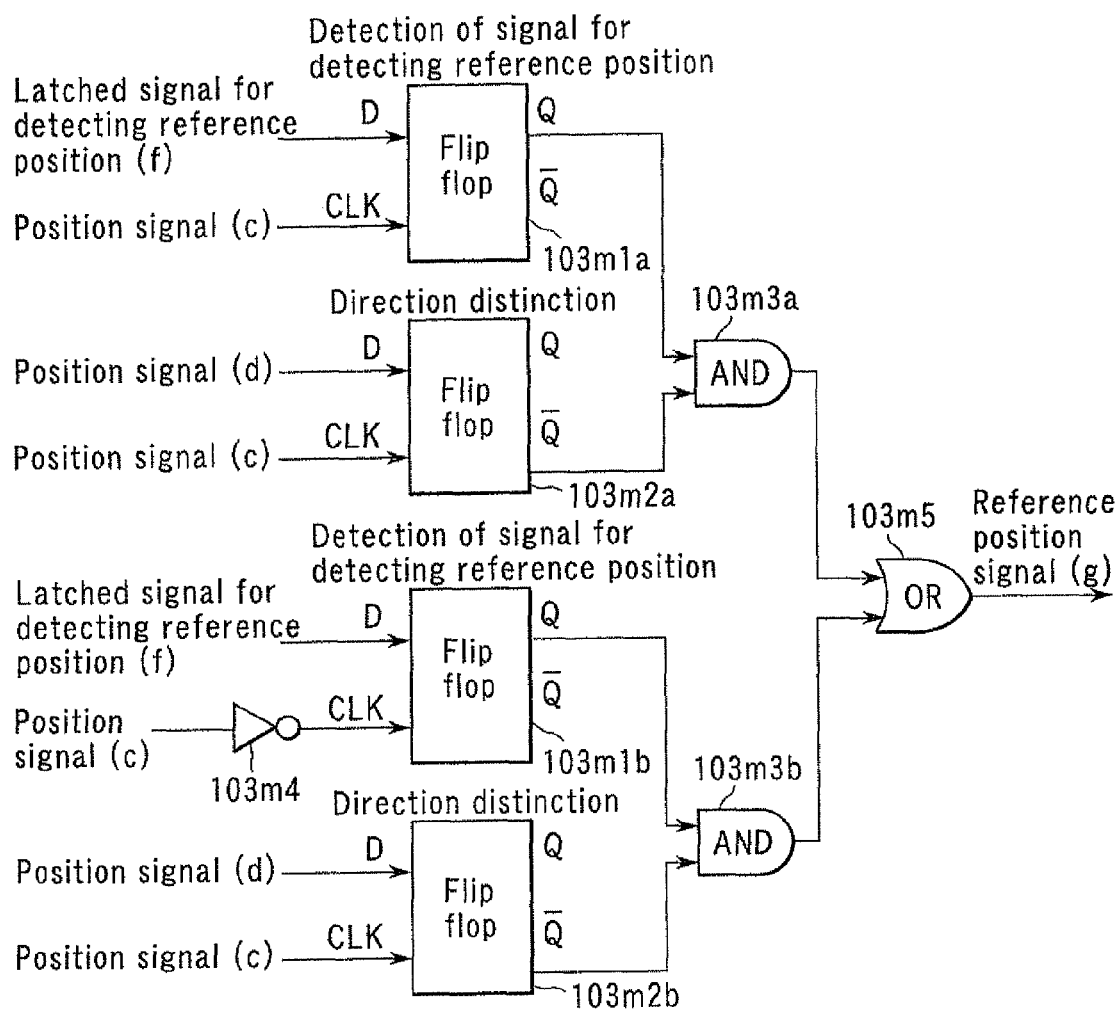
FIG. 36 is a diagram showing still another concrete constitution of the circuit of FIG. 33.

In the concrete example shown in FIG. 36, the logical sum of the outputs of FIGS. 34 and 35 is obtained by an OR circuit. That is, the signal for detecting the reference position (f) latched by the latch circuit 106 is inputted into the data D of a flip flop 103m1a, the position signal (c) is inputted into the clock CLK, and the output Q is inputted into an AND circuit 103m3a. The position signal (d) is inputted into the data D of a flip flop 103m2a, and the output $\overline{Q}$ is inputted into the AND circuit 103m3a. Furthermore, the signal for detecting the reference position (f) latched by the latch circuit 106 is inputted into the data D of a flip flop 103m1b, the position signal (c) reversed by a NOT circuit 103m4b is inputted into the clock CLK, and the output Q is inputted into an AND circuit 103m3b. The position signal (d) is inputted into the data D of a flip flop 103m2b, the position signal (c) is inputted into the clock CLK, and the output Q is inputted into an AND circuit 103m3b. Subsequently, the outputs of the AND circuits 103m3a and 103m3b are inputted into an OR circuit 103m5. It is to be noted that two flip flops for the direction distinction (103m2a, 103m2b) are used, but are the same except the way for taking the output, and it is therefore possible to dispose on flip flop and divide the output.

Figure 37:
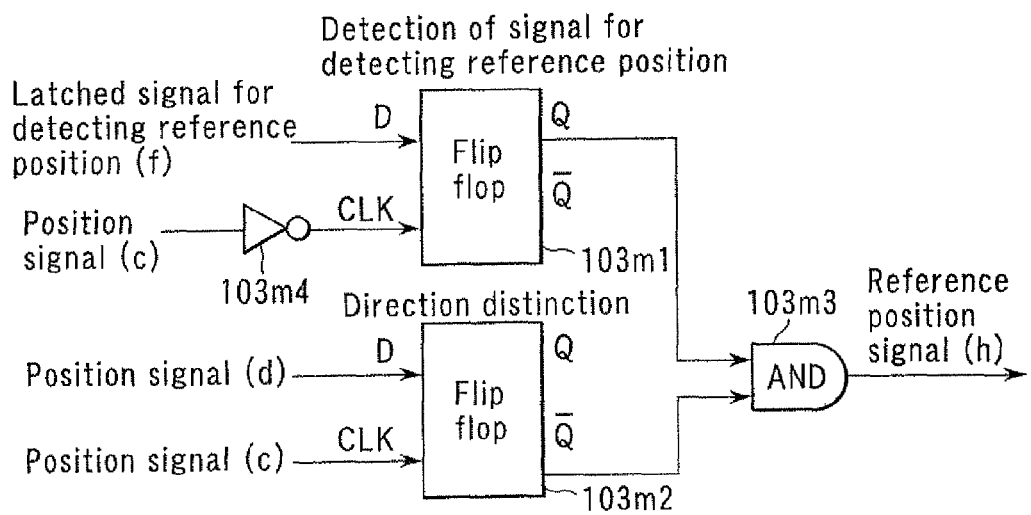
FIG. 37 is a diagram showing another concrete constitution of the circuit of FIG. 33.

In the concrete example shown in FIG. 37, the flip flop 103m1 and NOT circuit 103m4 constituting the circuit for detecting the signal for detecting the reference position, which outputs the value of the latched signal for detecting the reference position (f) at the fall of the position signal (c); the flip flop 103m2 constituting the direction distinction circuit for detecting the displacement counterclockwise on the Lissajous circle; and the AND circuit 103m3 for obtaining the logical product of the outputs constitute the detection circuit 103m for detecting that the latched signal for detecting the reference position (f) reaches the high level and is in the set synchronous position. That is, the signal for detecting the reference position (f) latched by the latch circuit 106 is inputted into the data D of the flip flop 103m1, the position signal (c) reversed by the NOT circuit 103m4 is inputted into the clock CLK, and the output Q is inputted into the AND circuit 103m3. The position signal (d) is inputted into the data D of the flip flop 103m2, the position signal (c) is inputted into the clock CLK, and the output $\overline{Q}$ is inputted into the AND circuit 103m3.

Figure 38:
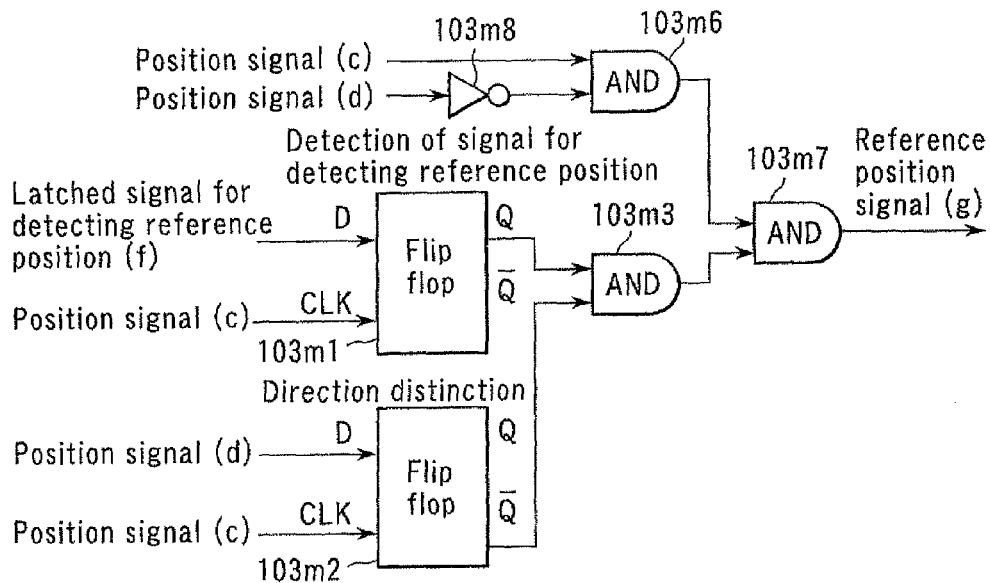
FIG. 38 is a diagram showing still another concrete constitution of the circuit of FIG. 33.

Moreover, in the concrete example shown in FIG. 38, the constitution of FIG. 34, an AND circuit 103m6 for setting an output for defining the width of the reference position signal of FIG. 34 to the high level when the position signal (c) indicates the high level and the position signal (d) indicates the low level, and an AND circuit 103m7 for obtaining the logical sum of the outputs of the AND circuit 103m6 and FIG. 34 constitute the detection circuit 103m for detecting that the latched signal for detecting the reference position (f) reaches the high level and is subsequently in the set synchronous position. That is, the position signal (c) and the position signal (d) reversed by a NOT circuit 103m8 are inputted into the AND circuit 103m6, and the outputs of the AND circuit 103m6 and AND circuit 103m3 in the constitution of FIG. 34 are inputted into an AND circuit 103m7.

Figure 39:
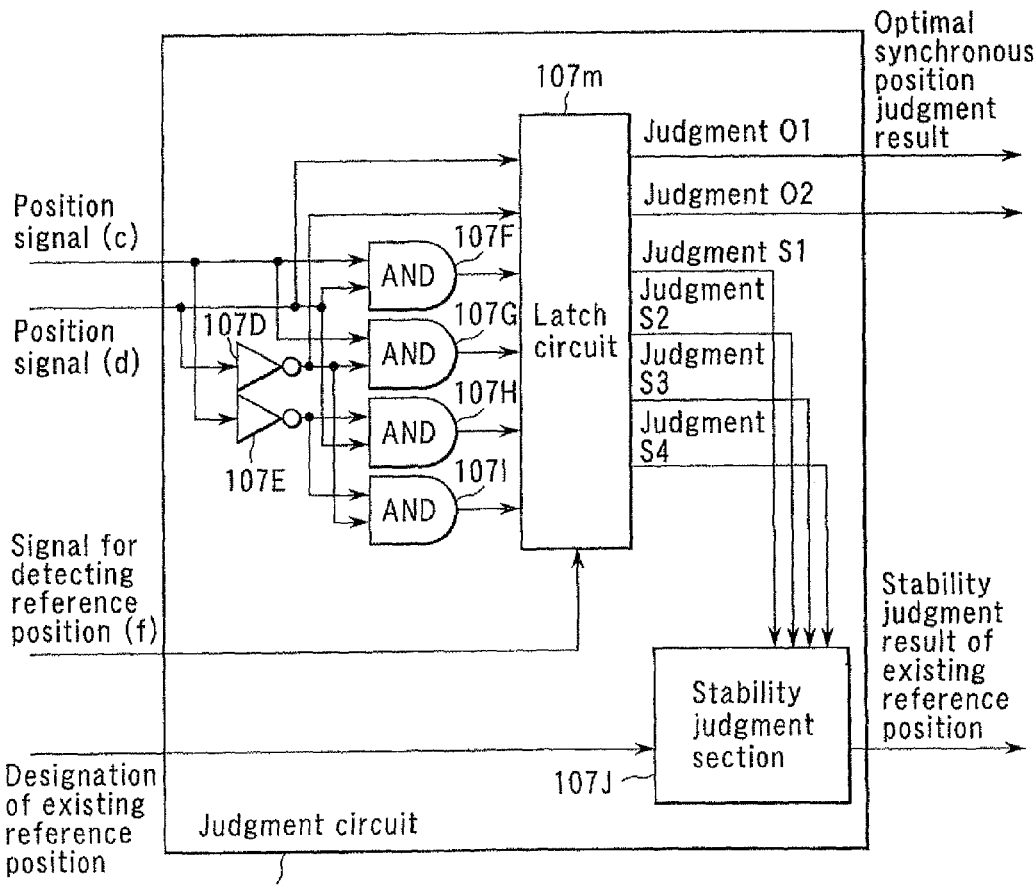
FIG. 39 is a diagram showing the concrete constitution of the judgment circuit in the signal processing circuit section of the encoder according to the twelfth embodiment.
Figure 40:
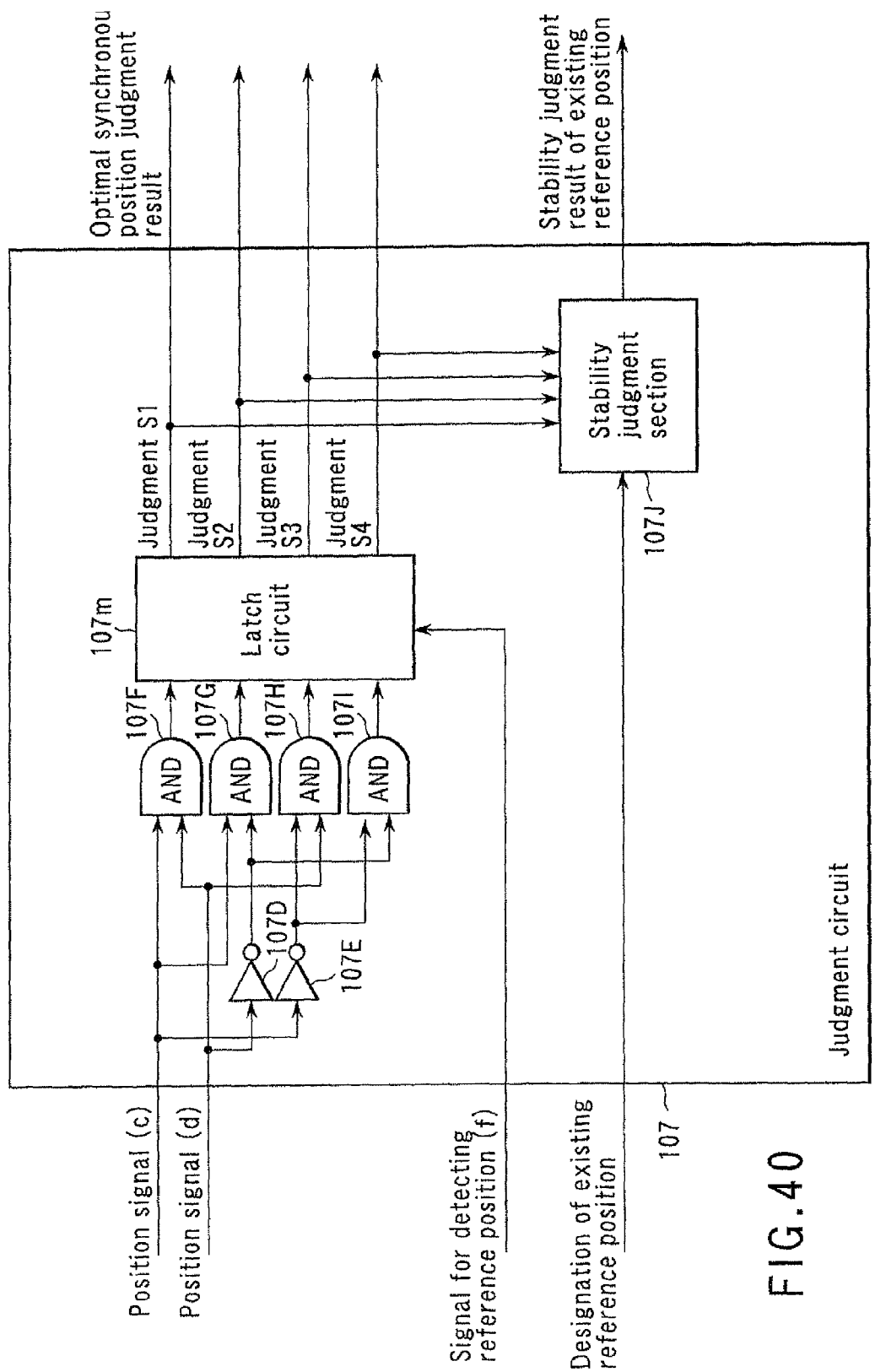
FIG. 40 is a diagram showing another concrete constitution of the judgment circuit in the signal processing circuit section of the encoder according to the twelfth embodiment.
Figure 41:
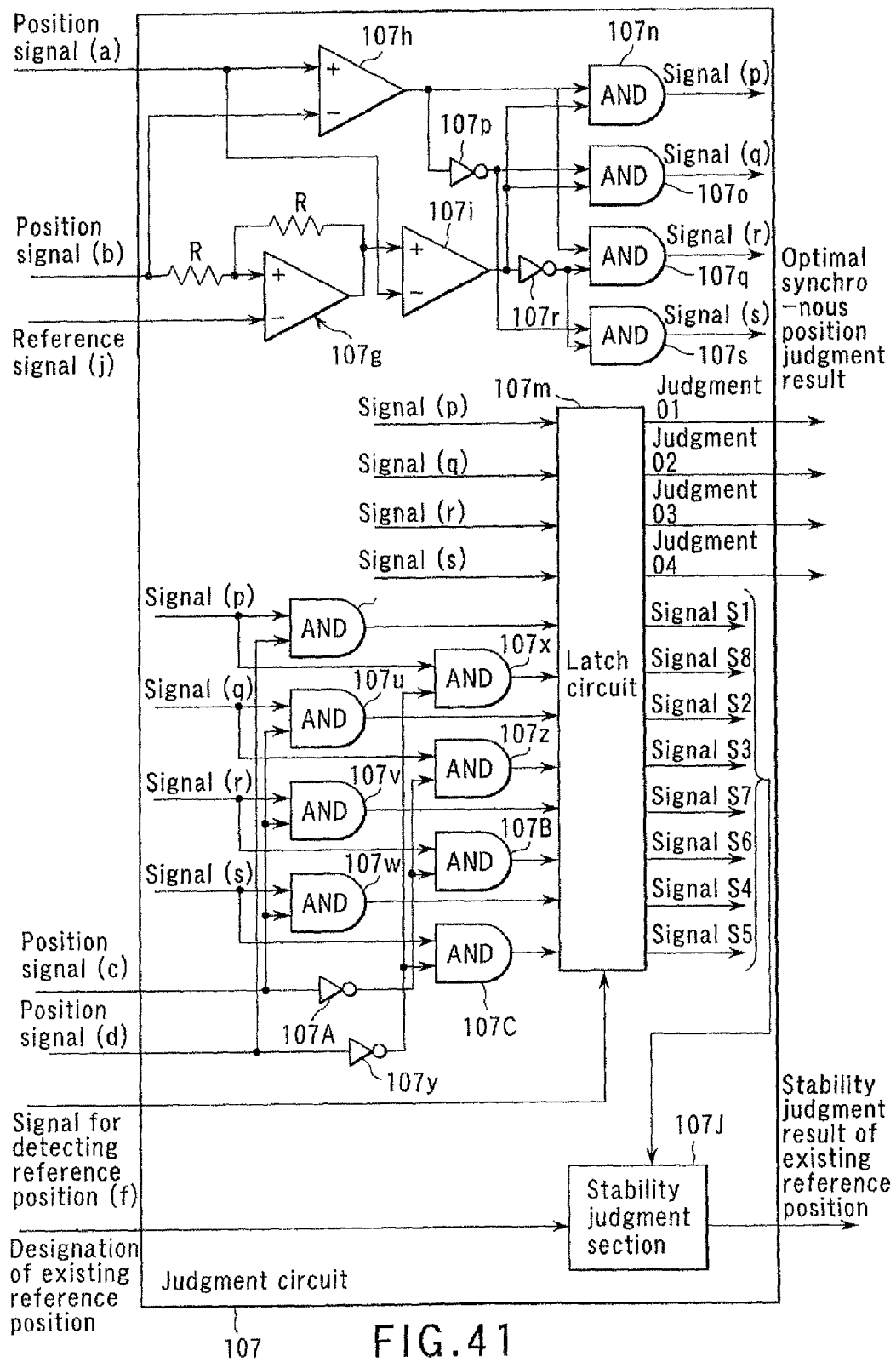
FIG. 41 is a diagram showing still another concrete constitution of the judgment circuit in the signal processing circuit section of the encoder according to the twelfth embodiment.

Furthermore, it is assumed that the judgment circuit 107 includes three examples shown in FIGS. 39 to 41. Here, FIGS. 39 to 41 correspond to FIGS. 30 to 32.

In a concrete example shown in FIG. 39, the judgment circuit 107 includes the latch circuit 107m for latching the position signal (d) and a signal obtained by reversing the position signal (d) in a NOT circuit 107D at the rise of the signal for detecting the reference position (f). The signal of judgment O1 outputted from this latch circuit 107m indicates the high level, when the position signal (d) indicates the high level. The signal of judgment O2 indicates the high level, when the position signal (d) indicates the low level. Furthermore, the judgment circuit 107 includes: four AND circuits 107F, 107G, 107H, 107I in which the position signal (c), the signal obtained by reversing the signal in a NOT circuit 107E, the position signal (d), and a signal obtained by reversing the signal in the NOT circuit 107D are inputted as shown; and a stability judging section 107J in which the output from the latch circuit 107m for latching four outputs from the AND circuits 107F to 107I at the rise of the signal for detecting the reference position (f) and designation situation of the existing reference position are inputted. That is, a signal of judgment S1 outputted from the latch circuit 107m reaches the high level, when both the position signals (c) and (d) indicate the high level. The signal of judgment S2 indicates the high level, when the position signal (c) indicates the high level and the position signal (d) indicates the low level. The signal of judgment S3 indicates the high level, when the position signal (c) indicates the low level and the position signal (d) indicates the high level. The signal of judgment S4 indicates the high level, when both the position signals (c) and (d) indicate the low level.

Moreover, in a concrete example shown in FIG. 40, the judgment circuit 107 includes: four AND circuits 107F, 107G, 107H, 107I in which the position signal (c), the signal obtained by reversing the position signal in the NOT circuit 107E, the position signal (d), and the signal obtained by reversing the position signal in the NOT circuit 107D are inputted as shown; the latch circuit 107m for latching four outputs from these AND circuits 107F to 107I at the rise of the signal for detecting the reference position (f); and the stability judging section 107J in which the output of the latch circuit 107m and the designation situation of the existing reference position are inputted. The signal of judgment 1 outputted from the latch circuit 107m indicates the high level, when both the position signals (c) and (d) indicate the high level. The signal of judgment 2 indicates the high level, when the position signal (c) indicates the high level and the position signal (d) indicates the low level. The signal of judgment 3 indicates the high level, when the position signal (c) indicates the low level and the position signal (d) indicates the high level. The signal of judgment 4 indicates the high level, when both the position signals (c) and (d) indicate the low level.

Moreover, a concrete example shown in FIG. 41 is constituted of: the comparator 107h for comparing the value of the position signal (a) with that of the position signal (b); the reverse circuit 107g constituted of two resistances having the equal resistance value for generating a signal ($\bar{b}$) linearly symmetric with respect to the reference signal (j) which is the reference from the position signal (b) and the operating amplifier; the comparator 107i for comparing the value of the signal ($\bar{b}$) with that of the position signal (a); four AND circuits 107n, 107o, 107q, 107s in which the outputs of the comparators 107h and 107i, and the signals obtained by reversing the outputs by NOT circuits 107p, 107r are inputted as shown: eight AND circuits 107t, 107u, 107v, 107w, 107x, 107z, 107B, 107C in which output signals (p) to (s) of these four AND circuits, the position signal (c), the signal obtained by reversing the position signal by a NOT circuit 107A, the position signal (d), and a signal obtained by reversing the position signal in a NOT circuit 107y are inputted as shown; the latch circuit 107m for latching the signals (p) to (s) and eight outputs from the eight AND circuits at the rise of the signal for detecting the reference position (f); and the stability judging section 107J in which the signals (S1) to (S8) and the designation situation of the existing reference position are inputted among the outputs from the latch circuit 107m including judgments (O1) to (O4) corresponding to the signals (p) to (s) and signals (S1) to (S8) corresponding to eight outputs from eight AND circuits and which outputs the stability judgment result of the existing reference position.

The designation situation or judgment result of the existing reference position is stored in a storage unit (not shown) in the signal processing circuit section 6, a storage unit (not shown) disposed in the switch 104 or the judgment circuit 107, any of external storage units connected to the outside of the signal processing circuit section 6, or a plurality of storage units among these. This storage unit is mainly constituted of the storage mediums, and also constituted of the logic array or CPU for processing the judgment result or for the input/output if necessary. In the storage unit, the judgment result from the judgment circuit 107 is stored, and the judgment result is outputted to the outside. Moreover, the storage unit is constituted so as to send the judgment result to the switch 104 for switching the synchronous timing and to switch the position to the synchronous position judged as optimal. For the storage unit, the nonvolatile storage mediums are desirable such as SRAM and flash ROM in which the information is maintained even when power is turned off.

[Operation]

Figure 42:
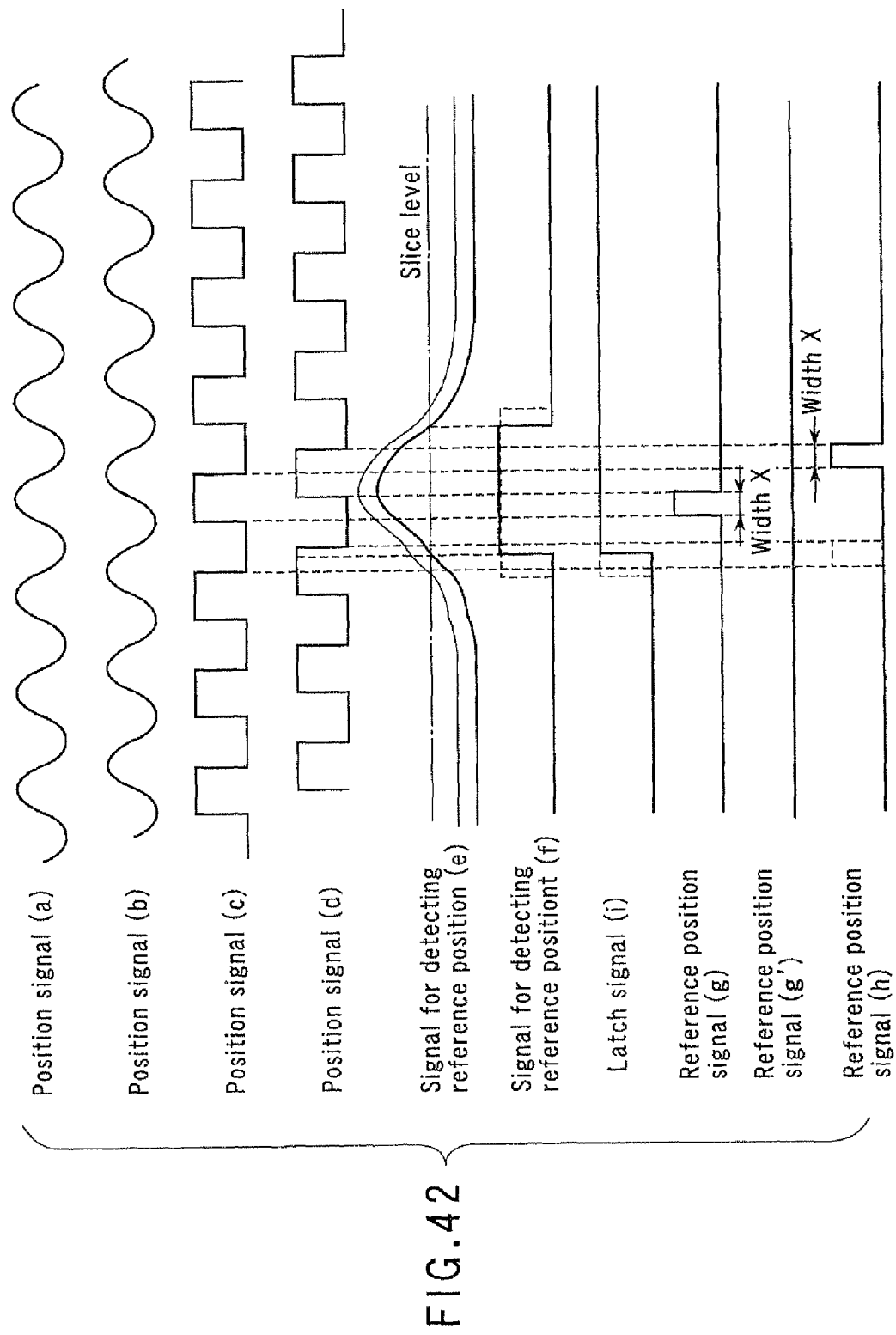
FIG. 42 is a time chart showing that the input from the photodetector at a time of displacement in a counterclockwise direction on Lissajous circle is processed by the signal processing circuit of FIG. 29.
Figure 43:
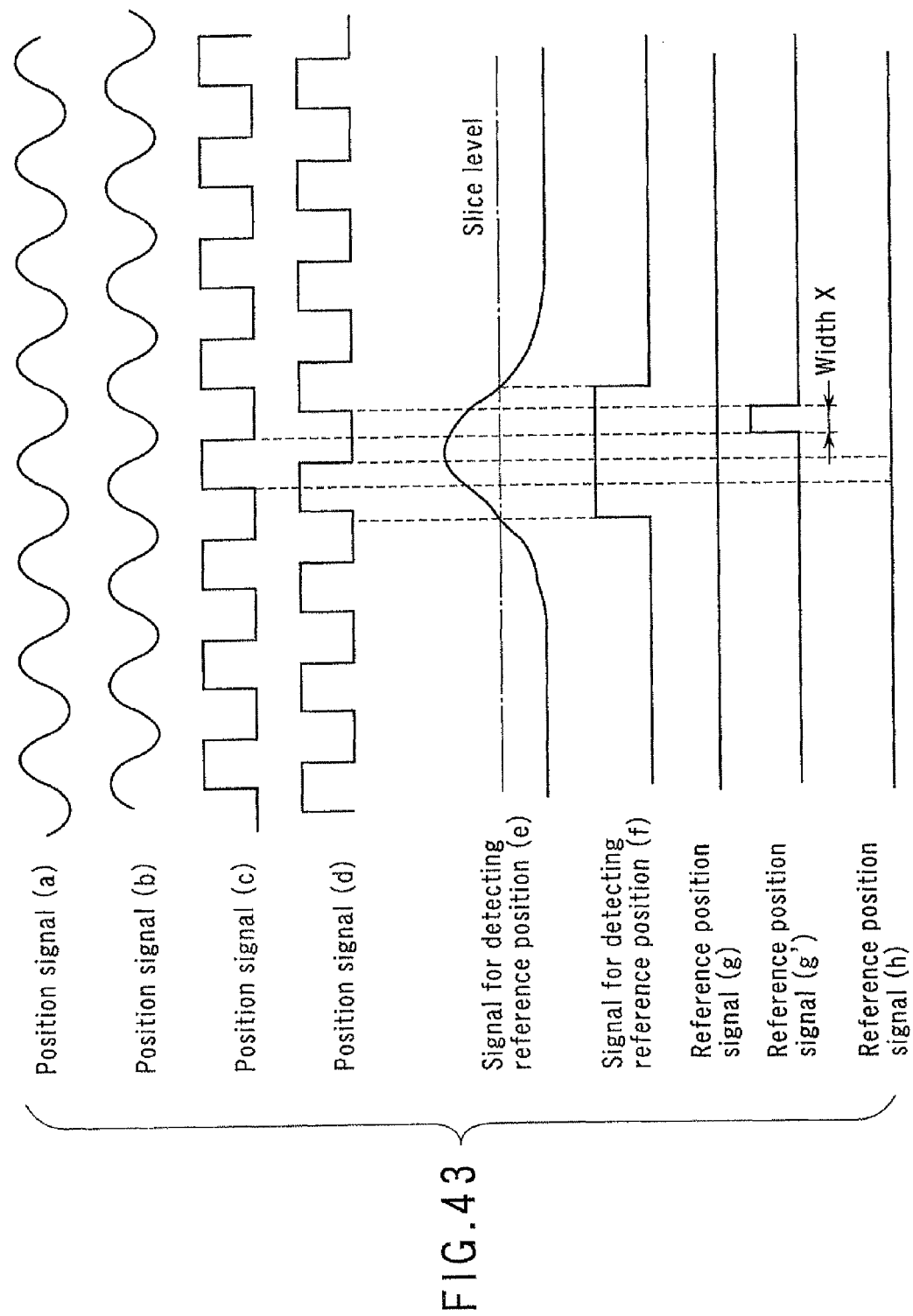
FIG. 43 is a time chart showing that the input from the photodetector is processed by the signal processing circuit of FIG. 29 when displacement occurs in a clockwise direction on Lissajous circle.

The processing of the input from the photodetector 5 shown in FIG. 1 by the signal processing circuit section 6 in the present embodiment will be described with reference to the time charts in FIGS. 42 and 43. It is to be noted that FIG. 42 shows the displacement in the counterclockwise direction on the Lissajous circle, and FIG. 43 shows the displacement in the clockwise direction on the Lissajous circle.

The analog position signals (a) and (b) of the encoder which periodically change with the displacement (relative movement of the scale 4) are digitized in the binarizing circuit 101 to obtain the digital position signals (c) and (d). In the binarizing circuit 102, the signal for detecting the reference position (e) is binarized at the predetermined slice level to obtain the digital signal for detecting the reference position (f). In the latch circuit 106, the rise of the digital signal for detecting the reference position (f) is detected to set the latch signal (i) to the high level.

Moreover, in a region where the latch signal (i) indicates the latch signal (i), one is selected from the following two detection methods to obtain the reference position signal. It is to be noted that the direction of the reference position detection is detected only when the point determined by (Va, Vb) on the Circumference of the Lissajous circle of FIGS. 30 to 32 is counterclockwise, that is, when the point moves in the reference position detection direction and the direction shown by the arrow.

In the first method, after the generation of the latch signal (i), the signal is synchronized with the first rise of the position signal (a) or (c) to obtain the high level, and synchronized with the level change of the position signal (b) or (d) to obtain the low level, so that the reference position signal (g) is obtained. Here, the level changes of the position signals (a) and (b) which are the analog signals indicate the level change of the reference signal (j) upwards from the lower level or downwards from the upper level. In the second method, after the generation of the latch signal (i), the signal is synchronized with the first fall of the position signal (a) or (c) to obtain the high level, and synchronized with the level change of the position signal (b) or (d) to obtain the low level, so that the reference position signal (h) is obtained. One is selected from these two to output the reference position signal (g) or (h), and the selection is carried out by the switch 104.

Here, the generation of a rise part of the first reference position signal (g) will be described in detail with reference to FIGS. 33 and 34.

In the detection circuit 103m shown in FIG. 33, the position signals (c) and (d) and the latch signal (i) are inputted. After the latched signal for detecting the reference position (f) reaches the high level, the reference position signal is generated in the set synchronous position from the circuit. It is to be noted that the present embodiment is not necessarily limited to this. For example, the function of the direction distinction can be realized based on the input signal, but the direction distinction function is not necessarily included.

FIG. 34 shows the reference position detection at the time of the displacement in the counterclockwise direction on the Lissajous circle. The direction distinction will first be described. The position signal (d) is inputted into the data D of the flip flop 103m2, and the position signal (c) is inputted into the clock CLK. As a result, the signal outputted from the output $\overline{Q}$ of the flip flop 103m2 is updated as the reversed signal of the position signal (d) at every rise of the position signal (c). Therefore, only when the position signal (d) indicates the low level at the time of the rise of the position signal (c), the output $\overline{Q}$ of the flip flop 103m2 indicates the high level, and the direction distinction is therefore possible. Moreover, for the detection of the signal for detecting the reference position, the latch signal (i) is inputted into the data D of the flip flop 103m1, and the position signal (c) is inputted into the clock CLK. As a result, the signal outputted from the output Q of the flip flop 103m1 is updated as the latch signal (i) at every rise of the position signal (c). As a result, it is possible to output the signal for detecting the reference position synchronized at the timing of the rise of the position signal (c) after the signal for detecting the reference position is detected. Moreover, when the AND circuit 103m3 obtains the logical product of the direction distinction signal and the synchronized signal for detecting the reference position, it is possible to generate the reference position signal (g) shown in FIG. 42 in the predetermined detection direction and timing.

On the other hand, with the displacement in the opposite direction, as shown by the signal (g) of FIG. 43, the reference position signal (g) is not detected.

The generation of the rise part of the second reference position signal (h) will be described with reference to FIG. 37. With respect to FIG. 34, for the detection of the signal for detecting the reference position, the flip flop 103m1 detects the rise of the signal obtained by reversing the position signal (c) in the NOT circuit 103m4. Since the detection is performed in the same moving direction, it is possible to generate the reference position detection signal (h) shown in FIG. 42 in the synchronous position 2 in FIGS. 31 and 32.

On the other hand, with the displacement in the opposite direction, as shown in FIG. 43, the reference position signal (h) is not detected.

It is to be noted that the change of the moving direction at the reference position detection time, or the detection in the opposite directions will be described with reference to FIGS. 35 and 36.

FIG. 35 shows the reference position detection at the time of the displacement in the clockwise direction on the Lissajous circle in reverse to FIG. 34. For the direction distinction, the same flip flop 103m2 as that of the concrete example of FIG. 34 is used. However, when the output Q is taken as the output, the detection of the opposite direction is possible. For the detection of the signal for detecting the reference position, the position signal (c) in the synchronous position 1 in FIGS. 31 and 32 falls with the displacement of the opposite direction. Therefore, the rise of the signal obtained by reversing the position signal (c) in the NOT circuit 103m4 is detected. When these are combined, it is possible to detect the reference position of the opposite direction in the same synchronous position 1 as that of FIG. 34 as shown by a reference position signal (g') of FIG. 43. It is to be noted that with the displacement in the counterclockwise direction on the Lissajous circle, the reference position is not detected from the result of the direction detection as shown by the reference position signal (g') of FIG. 42.

In the concrete example of FIG. 36, the logical sum of the outputs of the concrete examples of FIGS. 34 and 35 is taken in the OR circuit 103m5, and this is effective when the reference position is detected in both the forward and backward directions. As a result, it is possible to detect the reference position signals shown in (g) of FIG. 42 and (g') of FIG. 43.

Furthermore, the conditions for emitting the reference position signal which has a predetermined signal width are added. In the present embodiment, the rise of the position signal (c) to the rise of the position signal (d) are detected. The rise edge of the position signal (c) is the important point. On the other hand, the detection width may be designated by a predetermined time or by the displacement amount of the measurement object, and the width itself may also arbitrarily be designated. For example, a minimum detection width of the encoder may be set. In the present concrete example, when the direction is designated, the condition including the rise of the position signal (c) till the rise of the position signal (d) in accordance with the displacement amount is disposed. This is equivalent to the case where the position signal (c) has the high level and the position signal (d) has the low level. This condition is added.

In the concrete example of FIG. 38, in order to obtain the reference position signal which has the predetermined width, the logical product of the signal reaching the high level when the position signal (c) indicates the high level and the position signal (d) indicates the low level, and the reference position signal of FIG. 34 is taken by the AND circuit 103m7. Accordingly, it is possible to generate the reference position signal (g) only for a ¼ period. Furthermore, in the circuit constitution of FIG. 38, there is a possibility that a plurality of reference position signals are generated. After detecting the reference position signal, by the reset signal (not shown) in the circuit, the flip flop 103m1 which functions as the latch circuit of the rise edge of the reference position detection signal (f) and a synchronous detection circuit with the position signal (c) is reset, and the output Q thus needs to be returned to the low level.

It is to be noted that in FIGS. 34 to 38, when the movable member moving in a predetermined reference position detection direction is reversed, this is detected by the direction distinction circuit, and the reference position signal is not outputted. Additionally, in the example of FIG. 36, since the detection in the opposite directions is possible, the reference position detection in the opposite direction is possible.

After the signal for detecting the reference position is generated and latched, the direction is reversed. In this case, there is possibility that wrong detection is performed in the reference position detection. When the movable member does not move in the predetermined direction, the latched signal for detecting the reference position is reset, and this wrong detection can be prevented.

The concrete example will be described with reference to FIG. 34. When the movable member moves in a direction different from the direction of the reference position detection, a signal $\overline{Q}$ of the flip flop 103m2 for distinguishing the direction indicates the low level and the signal Q reaches the high level. The signal Q or $\overline{Q}$ of the flip flop 103m2 for distinguishing the direction is reversed if necessary, and accordingly the signal is connected to a reset terminal (not shown) of the flip flop 103*m*1 for detecting the signal for detecting the reference position. Accordingly, when the movable member moves in the direction different from the direction of the reference position detection, the signal Q of the flip flop 103*m*1 for detecting the signal for detecting the reference position is reset to temporarily stop a sequence of reference position detection. Similar handling is possible also in another example.

When the synchronous circuit 103 shown in FIGS. 33 to 38 described above is appropriately designed, the reference position can be detected with a predetermined detection width in a desires synchronous position in the displacement of both the forward and backward directions.

It is to be noted that the position signals (a) and (c) have the phase difference of 90° from the position signals (b) and (d). The position detection signals (a) and (b) and the signal for detecting the reference position (e) which are the analog signals may be signals of any type as long as the position detection signals (c) and (d) and the signal for detecting the reference position (f) which are the digital signals can be created. Furthermore, the inputs from the detection system may be only the digital signals, and may not include any analog signal. When the position detection signal is digitized, the resolution may be enhanced by the phase interpolation.

Moreover, the position detection is carried out by inputting the digital position detection signals (c) and (d) into the counter. In this case, when the reference position signal (g) or (h) is generated, the counter is reset, or an appropriate preset value is set, and it is possible to obtain the reference position of the position detection.

As described above, in the present embodiment, after detecting the signal for detecting the reference position, the reference position signal is outputted in accordance with the first synchronous position. Therefore, all the synchronous positions are disposed within one period of the periodical signal.

Moreover, depending on the method for detecting the reference position, it is possible to store the periodical signal for detecting the position in the vicinity of the reference position and the signal for detecting the reference position and to distinguish the synchronous position closest to the generating position of the signal for detecting the reference position as the reference position. In this case, when the displacement amount using the distinguished position as the reference is sent as the preset value to the controller or counter, the reference position can exactly be obtained. In this example, when a plurality of reference position candidates are disposed, all the detection position candidates are arranged for one period before/after the generation time of the signal for detecting the reference position.

Next, outlines of the candidates of the synchronous position and the detection of the optimal synchronous position will be described with reference to FIGS. 30 to 32. Depending on the segment where the point determined by the position signals (a) and (b) exists at the rise, indicating the detection, of the signal for detecting the reference position (f), the optimal synchronous position candidate is determined. Basically, for a plurality of segments and a plurality of synchronous position candidates, phase allowances with all the synchronous position candidates are determined in the stepwise manner for each segment, and the synchronous position candidate having the largest phase allowance is regarded as optimal and outputted. In the present embodiment, assuming that the number of segments is two, the number of synchronous position candidates is two, and the phase difference is 0° to 180°, the phase allowance is optimal when the phase difference is largest. With respect to the phase allowance, as seen in a case where the processing is not performed in real time, when the phase difference is represented from 0° to 180°, conversely the candidate in the vicinity of 0° may be regarded as optimal.

The case of FIG. 30 will be described. The synchronous position candidates include the synchronous positions 1 and 2 apart from each other by a phase of 180°. A segment where the point determined by the position signals (a) and (b) is included at the rise of the signal for detecting the reference position (f) is (O1). In this case, there is a phase difference of 90° or more with respect to the synchronous position 1, but there is only a phase difference within 90° with respect to the synchronous position 2. Therefore, since the phase difference is larger with respect to the synchronous position 1 rather than the synchronous position 2, the synchronous position 1 is detected as the optimal synchronous position, and obtained as the judgment result. Similarly, the segment where the point determined by the position signals (a) and (b) is included at the rise of the signal for detecting the reference position (f) is (O2). In this case, the phase difference is larger with respect to the synchronous position 2 rather than the synchronous position 1. Therefore, the synchronous position 1 is detected as the optimal synchronous position, and obtained as the judgment result.

Next, the case of FIG. 31 will be described. The synchronous position candidates include the synchronous positions 1 and 2 apart from each other by the phase of 180°. The segment where the point determined by the position signals (a) and (b) is included at the rise of the signal for detecting the reference position (f) is (1) or (2). In this case, there is a phase difference of 90° or more with respect to the synchronous position 1, but there is only a phase difference within 90° with respect to the synchronous position 2. Therefore, since the phase difference is larger with respect to the synchronous position 1 rather than the synchronous position 2, the synchronous position 1 is detected as the optimal synchronous position, and obtained as the judgment result. Similarly, the segment where the point determined by the position signals (a) and (b) is included at the rise of the signal for detecting the reference position (f) is (3) or (4). In this case, the phase difference is larger with respect to the synchronous position 2 rather than the synchronous position 1. Therefore, the synchronous position 1 is detected as the optimal synchronous position, and obtained as the judgment result.

Furthermore, the case of FIG. 32 will be described. The synchronous position candidates include four synchronous positions 1 to 4 disposed every phase of 90°. The synchronous positions 1 and 2 are disposed apart from each other by the phase of 180° on the vertical axis, and the synchronous positions 3 and 4 are disposed apart from each other by the phase of 180° on the horizontal axis. The segment where the point determined by the position signals (a) and (b) is included at the rise of the signal for detecting the reference position (f) is (O1). In this case, there is a phase difference of 135° or more and 180° or less with respect to the synchronous position 3, but there is only a phase difference of 45° or more and 135° or less with respect to the synchronous positions 1 and 2, and there is only a phase difference of 0° or more and 45° or less with respect to the synchronous position 4. Therefore, since the phase difference is largest with respect to the synchronous position 3 rather than the synchronous positions 1, 2, and 4, the synchronous position 3 is detected as the optimal synchronous position, and obtained as the judgment result. Similarly, the segment where the point determined by the position signals (a) and (b) is included at the rise of the signal for detecting the reference position (f) is (O2). In this case, the synchronous position 1 is detected as the optimal synchronous position and obtained as the judgment result. The synchronous position 4 with (O3), and the synchronous position 2 with (O4) are detected as the optimal synchronous positions, and obtained as the judgment results, respectively.

Next, concerning the segment for use in judging the optimal synchronous position candidate, the detection of the segment where the point determined by the position signals (a) and (b) is included at the detection time of the signal for detecting the reference position (f) will be described with reference to FIGS. 39 to 41.

In the concrete example shown in FIG. 40, the segment is divided by the following two judgments.

$$Va > Vref \qquad \text{(Equation 5)}$$

$$Vb > Vref \qquad \text{(Equation 6)}$$

Here, there are four ways of dividing the segment: segment (1) is obtained when Equations 5 and 6 are both true; segment (2) is obtained when Equation 5 is false and Equation 6 is true; segment (3) is obtained when both the equations are false; and segment (4) is obtained when Equation 5 is true and Equation 6 is false. In the actual circuit example shown in FIG. 40, four segment judgment signals generated using the binarized position signals (c) and (d), two NOT circuits 107D, 107E, and four AND circuits 107F to 107I are latched by the latch circuit 107m at the timing of the detection of the signal for detecting the reference position. The segment where the position signals (a) and (b) exist is judged by the signal reaching the high level among the four signals. Therefore, the judgment 1 corresponds to the segment (1), the judgment 2 corresponds to the segment (4), the judgment 3 corresponds to the segment (2), and the judgment 4 corresponds to the segment (3).

Moreover, in the concrete example shown in FIG. 39, the segmenting is performed by the judgment of (Equation 6). There are two ways of choosing the segment: the segment (O1) is obtained when Equation 6 is true; and the segment (O2) is obtained when Equation 6 is false. In the actual circuit example shown in FIG. 39, two segment judgment signals generated using the binarized position signal (d) and the NOT circuit 107D are latched by the latch circuit 107m at the timing of the detection of the signal for detecting the reference position. The segment where the position signals (a) and (b) exist is judged by the signal reaching the high level among the two signals. Therefore, the judgment O1 corresponds to the segment (O1), and the judgment O2 corresponds to the segment (O2).

In the concrete example shown in FIG. 41, the segmenting is performed by the following two judgments.

$$Va > Vb \qquad \text{(Equation 7)}$$

$$Va + Vb > 2Vref \qquad \text{(Equation 8)}$$

Here, there are four ways of dividing the segment: segment (O1) is obtained when Equations 7 and 8 are both true; segment (O2) is obtained when Equation 7 is false and Equation 8 is true; segment (O3) is obtained when both are false; and segment (O4) is obtained when Equation 7 is true and Equation 8 is false. In the actual circuit shown in FIG. 41, four segment judgment signals (p) to (q) generated using the analog position signals (a) and (b), one operating amplifier, two comparators 107h, 107i, two resistances, two NOT circuits 107p, 107r, and four AND circuits 107n, 107o, 107q, 107s are latched by the latch circuit 107m at the timing of the detection of the signal for detecting the reference position. The segment where the position signals (a) and (b) exist is judged by the signal reaching the high level among the four signals (p) to (s). Therefore, the judgment O1 corresponds to the segment (O1), the judgment O2 corresponds to the segment (O2), the judgment O3 corresponds to the segment (O3), and the judgment O4 corresponds to the segment (O4).

It is to be noted that in the present embodiment, Va and Vb denote the signals which has the common amplitude center and amplitude. However, when there is a difference in the actual signal, the signal is normalized and applied so that the signal has the common amplitude center and amplitude. When Va is different from Vb only in an amplitude center value, instead of using the same reference signal Vref, the center values are individually set with respect to Va and Vb, and the values are applied to Equations 5, 6, 7, and 8 so as to apply to the segmenting of FIG. 31 or 32.

Next, judgment logic and details of the concrete circuit in the detection of the optimal synchronous position candidate will be described with reference to FIGS. 39 to 41.

In the concrete example of FIGS. 39 and 40, the synchronous position 1 is set to a center phase of a region where the position signal (d) as the binarized signal of Vb indicates the low level, and the synchronous position 2 is set to the center phase of the region where the position signal (d) indicates the high level. The synchronous position where the phase difference from the point in which the position signals (a) and (b) exist is largest at the detection time of the signal for detecting the reference position (f) is judged as optimal. The synchronous position included in a region having a level different from that of the position signal (d) at the detection time of the signal for detecting the reference position (f) is optimal.

In the concrete example of FIG. 39, the segment (O2) is included in the region where the position signal (d) indicates the low level, and the segment (O1) is included in the region where the position signal (d) indicates the high level. Therefore, when the result of the judgment O1 is obtained, the synchronous position 1 is the optimal synchronous position. Furthermore, in the judgment O1, it is seen that there is a phase allowance of 90° or more both in the clockwise and counterclockwise directions from the position at the reference position signal detection time to the synchronous position 1. Similarly, when the result of the judgment O2 is obtained, the synchronous position 2 is the optimal synchronous position. In the judgment O2, it is seen that there is a phase allowance of 90° or more both in the clockwise and counterclockwise directions from the position at the reference position signal detection time to the synchronous position 2. The above-described processing is realized in the circuit of FIG. 39.

In the concrete example of FIG. 40, the synchronous position 1 is set to the center phase of the region where the position signal (d) as the binarized signal of Vb indicates the low level, and the synchronous position 2 is set to the center phase of the region where the position signal (d) indicates the high level. The synchronous position where the phase difference from the point in which the position signals (a) and (b) exist is largest at the detection time of the signal for detecting the reference position (f) is judged as optimal. Therefore, the synchronous position included in the region having the level different from that of the position signal (d) at the detection time of the signal for detecting the reference position (f) is optimal.

The segments (3) and (4) are included in the region where the position signal (d) indicates the low level, and the segments (1) and (2) are included in the region where the position signal (d) indicates the high level. Therefore, two segments made by putting together the segments (1) and (2) of the actual four segments into one and the segments (3) and (4)

into one at the same time, are efficient for the judgment of the optimal synchronous position. By finer segmenting, the phase allowance can be confirmed for each moving direction.

Therefore, when the result of the judgment 1 or 3 is obtained, the synchronous position 1 is the optimal synchronous position. Furthermore, in the judgment 1, it is seen that there is a phase allowance of 90° or more in the clockwise direction from the position at the reference position signal detection time to the synchronous position 1, and there is a phase allowance of 180° or more in the counterclockwise direction. It is seen in the judgment 3 that there is a phase allowance of 180° or more in the clockwise direction and there is a phase allowance of 90° or more in the counterclockwise direction. Similarly, when the result of the judgment 2 or 4 is obtained, the synchronous position 2 is the optimal synchronous position. Furthermore, in the judgment 2, it is seen that there is a phase allowance of 180° or more in the clockwise direction from the position at the reference position signal detection time to the synchronous position 2, and a phase allowance of 90° or more in the counterclockwise direction. It is seen in the judgment 4 that there is a phase allowance of 90° or more in the clockwise direction and there is a phase allowance of 180° or more in the counterclockwise direction.

The above-described processing is realized in the circuit of FIG. 40.

In the concrete example of FIG. 41, the synchronous position 1 is set to the center phase of the segment O4 as a region where Equation 7 is true and Equation 8 is false, and the synchronous position 2 is set to the center phase of the segment O2 as a region where Equation 7 is false and Equation 8 is true. The synchronous position 3 is set to the center phase of the segment O3 as a region where Equations 7 and 8 are both false, and the synchronous position 4 is set to the center phase of the segment O1 as a region where Equations 7 and 8 are both true. The synchronous position having the largest phase difference from the point where the position signals (a) and (b) exist at the detection time of the signal for detecting the reference position (f) is judged as optimal. Therefore, the synchronous position whose phase is most distant from the segment at the detection time of the signal for detecting the reference position (f), that is, which is included in the segment on the opposite side is optimal.

Therefore, when the result of the judgment O1 is obtained, the synchronous position 3 is the optimal synchronous position, and there is a phase allowance of 90° or more both in the clockwise and counterclockwise directions from the position at the reference position signal detection time to the synchronous position 3. When the result of the judgment O2 is obtained, the synchronous position 1 is the optimal synchronous position, and there is a phase allowance of 90° or more both in the clockwise and counterclockwise directions from the position at the reference position signal detection time to the synchronous position 1. When the result of the judgment O3 is obtained, the synchronous position 4 is the optimal synchronous position, and there is a phase allowance of 90° or more both in the clockwise and counterclockwise directions from the position at the reference position signal detection time to the synchronous position 4. When the result of the judgment O4 is obtained, the synchronous position 2 is the optimal synchronous position, and there is a phase allowance of 90° or more both in the clockwise and counterclockwise directions from the position at the reference position signal detection time to the synchronous position 2.

The above-described processing is realized in the circuit of FIG. 41.

It is to be noted that concerning the judgment result of the optimal synchronous position candidate, the signals with the outputs of judgments 1 to 4 and the judgments O1 to O4 are outputted in parallel in the present embodiment, but an encoded judgment result may also be outputted.

Next, the outlines of the method for judging the stability of the presently set synchronous position will be described with reference to FIGS. 30 to 32.

That is, in the present embodiment, at the rise, indicating the detection, of the signal for detecting the reference position (f), the synchronous position stability is judged by judging the segment where the point determined by the position signals (a) and (b) exists. For the way of judgment, in the same manner as in the detection of the optimal synchronous position, the larger the phase difference between the segment included at the rise of the signal for detecting the reference position (f) and the synchronous position is, the higher the stability is. The smaller the phase difference is, the lower the stability is.

First, the case of FIG. 30 will be described. The case where the synchronous position is set to the synchronous position 1 will be described. The segment where the point determined by the position signals (a) and (b) is included at the rise of the signal for detecting the reference position (f) is (S1). In this case, there is a phase allowance of 90° clockwise and 180° counterclockwise. When the segment is (S2), there is a phase allowance of 180° clockwise and 90° counterclockwise. When the segment is (S3), there is a phase allowance of 270° clockwise, and there is not any phase allowance counterclockwise. When the segment is (S4), there is not any phase allowance clockwise, and there is a phase allowance of 270° counterclockwise. From the above, there are two levels in the stability, with respect to the synchronous position 1, the segments (S1) and (S2) have high stability, and the segments (S3) and (S4) have low stability. Similarly, with respect to the synchronous position 2, the segments (S3) and (S4) have the high stability, and the segments (S1) and (S2) have the low stability.

Additionally, a judgment standard that a large absolute value of the phase difference is consistently stable is used. When there is a peculiar condition, for example, when the change of the phase difference occurs in one direction, the judgment standard of the phase allowance stability needs to be used in accordance with the conditions.

Moreover, in the case of FIG. 31, for the description of FIG. 30, the segments (S1) to (S4) may be replaced with the segments (1) to (4).

Next, the case of FIG. 32 will be described. The case where the synchronous position is set to the synchronous position 1 will be described. The segment where the point determined by the position signals (a) and (b) is included at the rise of the signal for detecting the reference position (f) is (S1). In this case, there is a phase allowance of 90° clockwise and 225° counterclockwise. When the segment is (S2), there is a phase allowance of 180° clockwise and 135° counterclockwise. When the segment is (S3), there is a phase allowance of 180° clockwise, and 135° counterclockwise. When the segment is (S4), there is a phase allowance of 225° clockwise, and 90° counterclockwise. When the segment is (S5), there is a phase allowance of 270° clockwise and 45° counterclockwise. When the segment is (S6), there is a phase allowance of 315° clockwise and there is not any phase allowance counterclockwise. When the segment is (S7), there is not any phase allowance clockwise, and there is a phase allowance of 315° counterclockwise. When the segment is (S8), there is a phase allowance of 450 clockwise and 270° counterclockwise. From the above, there are four levels in the stability, with respect to the synchronous position 1, the segments (S2) and (S3) have highest stability, the segments (S1) and (S4) have secondly high stability, the segments (S5) and (S8) have thirdly high stability, and the segments (S6) and (S6) have a lowest stability.

Similarly, with respect to the synchronous position 2, the segments (S6) and (S7) are highest in the stability, the segments (S5) and (S8) are secondly high in the stability, the segments (S1) and (S4) are thirdly high in the stability, and the segments (S2) and (S3) are lowest in the stability. With respect to the synchronous position 3, the segments (S1) and (S8) are highest in the stability, the segments (S2) and (S7) are secondly high in the stability, the segments (S3) and (S6) are thirdly high in the stability, and the segments (S4) and (S5) are lowest in the stability. Moreover, with respect to the synchronous position 4, the segments (S4) and (S5) are highest in the stability, the segments (S3) and (S6) are secondly high in the stability, the segments (S2) and (S7) are thirdly high in the stability, and the segments (S1) and (S8) are lowest in the stability.

It is to be noted that depending on the purpose, it is possible to dispose three levels of the stability as a whole by combining the first and the second stability levels or the second and the third stability levels as one group of stability.

Next, concerning the segment for use in judging the stability, the detection of the segment where the point determined by the position signals (a) and (b) is included at the detection time of the signal for detecting the reference position (f) will be described. This is basically the same procedure as that in detecting the optimal synchronous position. In the present embodiment the detection will be described with reference to FIGS. 39 to 41.

In the concrete example of FIGS. 39 and 40, the segmenting is performed by the same method as that in detecting the optimal synchronous position in the constitution shown in FIG. 31. That is, a segment (S1) or (1) is obtained when Equations 5 and 6 are both true. A segment (S2) or (2) is obtained when Equation 5 is false and Equation 6 is true. A segment (S3) or (3) is obtained when both the equations are false. A segment (S4) or (4) is obtained when Equation 5 is true and Equation 6 is false. There are four ways of segmenting. In the actual circuit example, as shown in FIGS. 39 and 40, segment judgment signals are generated using the binarized position signals (c) and (d), two NOT circuits 107D, 107E, and four AND circuits 107F to 107I. The segment where the position signals (a) and (b) exist is judged by the signal reaching the high level at the timing of the detection of the signal for detecting the reference position among four signals to be inputted into the latch circuit 107*m*.

Moreover, in the example of FIG. 41, the segmenting is performed by four judgments of Equations 5, 6, 7, and 8. That is, when Equations 5, 6, 7, and 8 are all true, the segment (S1) is obtained. When Equations 5 and 6 are true, Equation 7 is false, and Equation 8 is true, the segment (S2) is obtained. When Equation 5 is false, Equation 6 is true, Equation 7 is false, and Equation 8 is true, the segment (S3) is obtained. When Equations 5, 6, 7, and 8 are all false, a segment (S5) is obtained. When Equations 5 and 6 are false, Equation 7 is true, and Equation 8 is false, a segment (S6) is obtained. When Equation 5 is true, Equation 6 is false, Equation 7 is true, and Equation 8 is false, a segment (S7) is obtained. When Equation 5 is true, Equation 6 is false, and Equations 7 and 8 are true, a segment (S8) is obtained. There are eight ways of segmenting. In the actual circuit, as shown in FIG. 41, four signals (p) to (q) generated in segmenting the optimal synchronous position, further the binarized position signals (c) and (d), two NOT circuits 10*y*, 107A, and eight AND circuits 107*t* to 107*x*, 107*z*, 107B, 107C are used to generate eight segment detecting signals. The signals are latched by the latch circuit 107*m* at the timing of the detection of the signal for detecting the reference position, and the segment where the position signals (a) and (b) exist is detected by the signal reaching the high level among the eight signals.

Next, the judgment logic and the details of the concrete circuit with respect to the stability judgment of the existing synchronous phase will be described with reference to FIGS. 39 to 41.

In the concrete example of FIGS. 39 and 40, the synchronous position 1 is set to the center phase of the region where the position signal (d) as the binarized signal of Vb indicates the low level, and the synchronous position 2 is set to the center phase of the region where the position signal (d) indicates the high level. When the phase difference between the point in which the position signals (a) and (b) exist and the existing synchronous position at the detection time of the signal for detecting the reference position (f) is large, the system is judged as stable. Therefore, when the synchronous position is included in the region having the level different from that of the position signal (d) at the detection time of the signal for detecting the reference position (f), the system is stable. When the position is included in a region having the same level, the system is unstable. The segment (S3) or (3) and the segment (S4) or (4) are included in a region where the position signal (d) indicates the low level, and the segment (S1) or (1) and the segment (S2) or (2) are included in a region where the position signal (d) indicates the high level. Therefore, the segment is actually divided into four segments, but in the judgment of the stability, the segments (S1) and (S2) or (1) and (2) are united, the segments (S3) and (S4) or (3) and (4) are united, and accordingly the judgment with two segments is efficient. By finer segmenting, the phase allowance can be confirmed for each moving direction.

First, a case where the synchronous position 1 is the existing synchronous position will be described. When the result of judgment S1 or S3 is obtained, or when the result of the judgment 1 or 3 is obtained, the phase is stable. In the judgment S1 or 1, it is seen that there is a phase allowance of 90° or more in the clockwise direction from the position at the reference position signal detection time to the synchronous position 1, and there is a phase allowance of 180° or more counterclockwise. It is seen in the judgment S3 or 3 that there is a phase allowance of 180° or more in the clockwise direction and there is a phase allowance of 90° or more counterclockwise. When the result of the judgment S2 or S4 is obtained, or when the result of judgment 2 or 4 is obtained, the phase is unstable. In the judgment S2 or 2, it is seen that there is a phase allowance of 90° or less in the clockwise direction from the position at the reference position signal detection time to the synchronous position 1, and a phase allowance of 270° or more counterclockwise. It is seen in the judgment S4 or 4 that there is a phase allowance of 270° or more in the clockwise direction and there is a phase allowance of 90° or less counterclockwise.

Next, a case where the synchronous position 2 is the existing synchronous position will be described. When the result of the judgment S1 or S3 is obtained, or when the result of judgment 1 or 3 is obtained, the phase is unstable. In the judgment S1 or 1, it is seen that there is a phase allowance of 270° or more in the clockwise direction from the position at the reference position signal detection time to the synchronous position 1, and there is a phase allowance of 90° or less counterclockwise. It is seen in the judgment S3 or 3 that there is a phase allowance of 90° or less in the clockwise direction and there is a phase allowance of 270° or more counterclockwise. When the result of the judgment S2 or S4 is obtained, or when the result of the judgment 2 or 4 is obtained, the phase is stable. In the judgment S2 or 2, it is seen that there is a phase allowance of 180° or more in the clockwise direction from the position at the reference position signal detection time to the synchronous position 1, and a phase allowance of 90° or more counterclockwise. It is seen in the judgment S4 or 4 that there is a phase allowance of 90° or more in the clockwise direction and there is a phase allowance of 180° or more counterclockwise.

The above-described processing is performed and outputted by the judgment circuit 107 constituted as shown in FIGS. 39 and 40.

In the concrete example of FIG. 41, the synchronous position 1 is set to the center phase of the segment O4 as a region where Equation 7 is true and Equation 8 is false, and the synchronous position 2 is set to the center phase of the segment O2 as a region where Equation 7 is false and Equation 8 is true. The synchronous position 3 is set to the center phase of the segment O3 as a region where Equations 7 and 8 are both false, and the synchronous position 4 is set to the center phase of the segment O1 as a region where Equations 7 and 8 are both false. The synchronous position having the largest phase difference from the point where the position signals (a) and (b) exist at the detection time of the signal for detecting the reference position (f) is judged as optimal. Therefore, the synchronous position whose phase is most distant from the segment at the detection time of the signal for detecting the reference position (f), that is, which is included in the segment on the opposite side is optimal. As seen from FIG. 41, the segment O1 includes segments S1 and S8, segment O2 includes segments S2 and S3, the segment O3 includes segments S4 and S5, and the segment O4 includes segments S6 and S7.

For the level segment of the stability of the present concrete example, the level can be divided into four levels at maximum with respect to a specific synchronous position. This is because the number of segments is eight, there are symmetrically four segments each clockwise and counterclockwise as seen from the specific synchronous position, the segments in the symmetric positions are united into one, and the level is divided into four groups. Therefore, the level is divided into four: level 1) the phase allowance from the synchronous position is 135° to 180°; level 2) 90° to 135°; level 3) 45° to 90°; and level 4) 0° to 45°. Furthermore, for these levels, when the adjacent levels are united, two levels or three levels can be obtained. In the following description, the case where the level is divided into four will be described, but in the actual application, the level may also be divided into two or three.

First, the case where the synchronous position 1 is the existing synchronous position will be described. When the result of the judgment S2 or S3 is obtained, the level 1 is obtained. When the result of the judgment S1 or S4 is obtained, the level 2 is obtained. When the result of the judgment S5 or S8 is obtained, the level 3 is obtained. When the result of the judgment S6 or S7 is obtained, the level 4 is obtained. Moreover, when the synchronous position 2 is the existing synchronous position, and when the result of the judgment S6 or S7 is obtained, the level 1 is obtained. When the result of the judgment S5 or S8 is obtained, the level 2 is obtained. When the result of the judgment S1 or S4 is obtained, the level 3 is obtained. When the result of the judgment S2 or S3 is obtained, the level 4 is obtained. When the synchronous position 3 is the existing synchronous position, and when the result of the judgment S1 or S8 is obtained, the level 1 is obtained. When the result of the judgment S2 or S7 is obtained, the level 2 is obtained. When the result of the judgment S3 or S6 is obtained, the level 3 is obtained. When the result of the judgment S4 or S5 is obtained, the level 4 is obtained. Furthermore, when the synchronous position 4 is the existing synchronous position, and when the result of the judgment S4 or S5 is obtained, the level 1 is obtained. When the result of the judgment S3 or S6 is obtained, the level 2 is obtained. When the result of the judgment S2 or S7 is obtained, the level 3 is obtained. When the result of the judgment S1 or S8 is obtained, the level 4 is obtained.

Additionally, by the judgment in each synchronous phase, it is also possible to obtain information of the phase allowances clockwise and counterclockwise.

The above-described processing is performed by the judgment circuit 107 constituted as shown in FIG. 41, and the judgment result of the stability is outputted. Concerning the output of the judgment of the stability, only the level judgment results such as the levels 1 to 4 may be outputted. Moreover, the signals of the judgments 1 to 4, judgments S1 to S8 may also be outputted together with the information indicating the existing synchronous position. In this case, the information of the existing synchronous position may not necessarily be outputted from the judgment circuit 107, and may also be outputted via the switch 104. When the outside holds set information, the information does not have to be outputted.

It is to be noted that the detection position of the signal obtained by binarizing the signal for detecting the reference position basically differs with each detection direction. Therefore, when the moving direction of the movable member does not agree with the reference position detection direction, a possibility that the judgment result on the stabilities of the optimal synchronous position and the existing reference position is meaningless is high. As the case may be, the information constitutes wrong information and possibly causes confusion. Therefore, it is sometimes desirable not to output the judgment result of the case where the moving direction of the movable member does not agree with the reference position detection direction.

Moreover, when the movable member moving in a predetermined reference position detection direction is reversed, there is a possibility that the judgment result becomes wrong.

In order to solve the above-described two problems, a method in which the judgment result is not outputted will be described in the case where the moving direction of the movable member does not agree with the reference position detection direction or is reversed midway using the example of FIGS. 39 to 41.

In the constitution of the present embodiment, the circuits shown in FIGS. 34 to 38 are used in detecting the reference position. In these circuits, it can be confirmed that the direction is not the predetermined reference position detection direction or is reversed midway by the output level of the flip flop 103$m2$ constituting a direction distinction circuit or the level change. When the direction is not the predetermined reference position detection direction or is reversed midway, the signal for detecting the reference position (f) inputted into the judgment circuit 107 is masked by the output signal of the flip flop 103$m2$ for distinguishing the direction, or the output signal of the flip flop 103$m2$ for distinguishing the direction is inputted into the judgment circuit 107. Accordingly, the output of the judgment result is masked and inhibited.

By this method, the detecting of the optimal synchronous position, and the stability judgment sequence of the existing reference position are once stopped, or the output is stopped. It is to be noted that methods other than the method described herein may also be used as long as the object can be achieved.

Next, the use of the judgment result concerning the stability of the optimal synchronous position or the existing reference position will be described.

The judgment result is stored in a storage device (not shown) in the judgment circuit 107, or outputted to the outside. Examples of an outside output destination include the display 108, the switch 104, and the outside via an interface. In the present embodiment, the judgment circuit for detecting the optimal synchronous position and for judging the stability of the existing reference position is used in common, but the judgment circuit may separately be disposed. When the setting is switched, the set information may also be exchanged between the judgment circuits.

The display 108 which is the output destination of the judgment result may be of any type as long as the result is shown. For example, there are a plurality of LEDs, the LED corresponding to the optimal synchronous position and the LED indicating the stability of the existing synchronous position are lit, blink, and are turned off at the reference position detection time. The LED indicating not only the stability but also the phase relation can be lit, flickered, and be lit. The timing of the display output of the display 108 may be set in a range in which the reference position detection processing or the judgment processing is not influenced even at the judgment time, when there is a request from the outside, or immediately before making the judgment on receiving the detection of the signal for detecting the reference position.

Furthermore, the timing of the switching of the synchronous position candidates by the switch 104 may also be set in a range in which the reference position detection processing or the judgment processing is not influenced immediately after receiving the reference position switch setting, at the judgment time, when there is the request from the outside, or immediately before making the judgment on receiving the detection of the signal for detecting the reference position.

The synchronous timing is switched by the switch 104, and the switch 104 may manually be switched, or may be switched in response to a setting command from the outside or by the switch 104 which has collected the information. When the switch 104 collects the information, a request signal for the set information may also be sent to the judgment circuit 107, storage unit, or outside if necessary. For the switching, the timing does not have to be necessarily switched, when the existing synchronous position setting is different from the optimal synchronous position, or when the stability of the existing synchronous position is low. Since the switching of the synchronous position results in the fluctuation of the reference position, it is also possible to set whether the switch is effective if necessary. For the switched setting, in the case of the switching during the reference position signal detection it is necessary to set whether the switching is applied to this detection or the next detection. It is also possible to dispose switching means if necessary.

In the output of the judgment result, it is also possible to generate an abnormal signal or a warning signal in accordance with the result. For example, when the optimal synchronous position judgment result is different from the existing synchronous position, the stability of the existing synchronous position is not more than a given level, or the change of the recorded stability satisfies a specific condition, necessity of maintenance can be transmitted by the abnormal signal or warning signal.

Next, a detection flow of the optimal synchronous position will be described with reference to FIGS. 44 and 45.

Figures 44, 45:
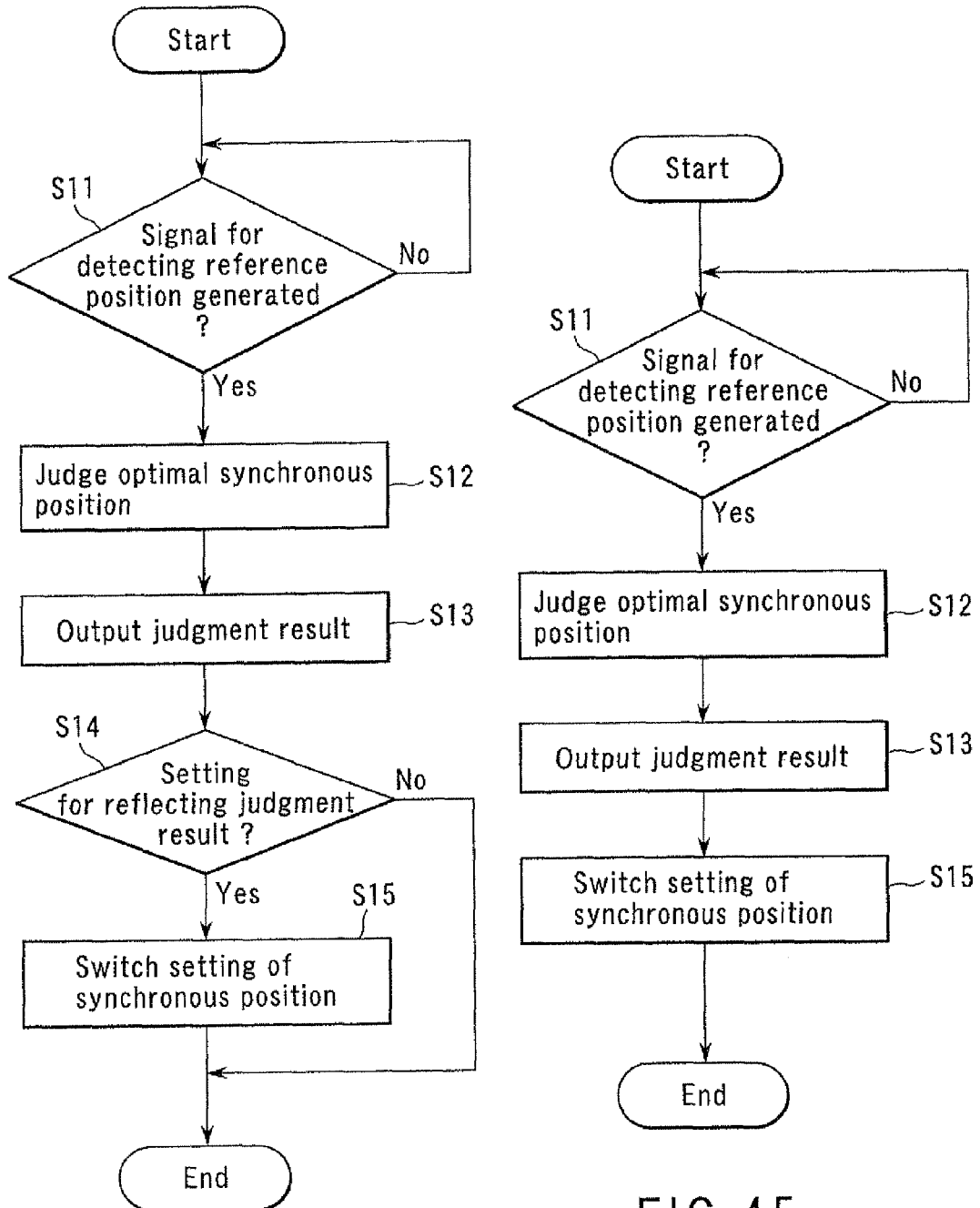
FIG. 44 is a diagram showing a detection flow of the optimal synchronous position.
FIG. 45 is a diagram showing another example of the detection flow of the optimal synchronous position.

In the example of FIG. 44, it is first detected whether or not the signal for detecting the reference position is generated (step S11). Subsequently, when the generation of the signal for detecting the reference position is detected, the judgment circuit 107 detects the optimal synchronous position candidate (step S12), and outputs the judgment result (step S13). Thereafter, it is judged whether or not the setting reflects the judgment result (step S14). When the result is not reflected, the detecting flow of the optimal synchronous position ends. On the other hand, when the judgment result is reflected, the setting of the synchronous position is switched (step S15), and the detecting flow of the optimal synchronous position is ended.

Moreover, in the example of FIG. 45, it is first detected whether or not the signal for detecting the reference position is generated (step S11). Subsequently, when the generation of the signal for detecting the reference position is detected, the judgment circuit 107 detects the optimal synchronous position candidate (step S12), and outputs the judgment result (step S13). Thereafter, to reflect this judgment result, the setting of the synchronous position is switched (step S15), and the detecting flow of the optimal synchronous position is ended. Needless to say, for the reflection of the judgment result, it is possible not to set the position again, when the reflected content is the same as the existing setting.

It is to be noted that the flows shown in FIGS. 44 and 45 are the flows of the optimal synchronous position detecting. The synchronous position may be replaced with the reference position, and a flow of the optimal reference position detecting may also be constituted.

A stability judgment flow of the existing synchronous position will be described with reference to FIGS. 46 and 47.

In the example of FIG. 46, it is first detected whether or not the signal for detecting the reference position is generated (step S21). Subsequently, when the generation of the signal for detecting the reference position is detected, the judgment circuit 107 judges the stability of the existing synchronous position (step S22), and outputs the judgment result (step S23). Thereafter, it is judged whether or not the setting reflects the judgment result (step S24). When the result is not reflected, the stability judgment flow of the existing synchronous position is ended. On the other hand, when the judgment result is reflected, the setting of the synchronous position is switched (step S25), and the stability judgment flow of the existing synchronous position is ended. It is to be noted that for the reflection of the judgment result, it is possible not to set the position again, when the reflected content is the same as the existing setting.

Moreover, in the example of FIG. 47, it is first detected whether or not the signal for detecting the reference position is generated (step S21). Subsequently, when the generation of the signal for detecting the reference position is detected, the judgment circuit 107 judges the stability of the existing synchronous position (step S22), and outputs the judgment result (step S23), and the stability judgment flow of the existing synchronous position is ended.

In the example of FIG. 46, the setting of the synchronous position is switched in step S24. In the example of FIG. 47, the process ends in the step S23. However, a case where the present invention is applied to a constitution not including selecting means is also included. The timing or the step may also be replaced with the timing of the generation of the signal for detecting the reference position or the step of adjustment of the reference position, and the step may also be added.

It is to be noted that the flows shown in FIGS. 46 and 47 are the flows concerning the stability judgment of the existing synchronous phase. The synchronous position may be replaced with the reference position, and the flow of the stability judgment of the existing reference position may also be constituted.

[Effect]

According to the present embodiment, when the reference position signal is synchronized with the position detection signal, it is possible to select the synchronous position in accordance with the position (phase) of the position detection signal at the detection time of the signal for detecting the reference position. Therefore, it is possible to select the synchronous position which reduces the generation of the deviation of the reference position as much as possible, possibly caused by the unstable factors such as the signal noise or wobble, and further the stability of the light source, temperature characteristics of the light emitting/receiving device and fluctuations, and deviations from the designs of the individual encoders in the optical encoder.

In order to synchronize the reference position signal with the position detection signal, there is disposed the judgment circuit for judging the best synchronous position among the synchronous positions. In the state in which the encoder is actually attached to the apparatus, the best synchronous position can be selected. In the present embodiment, when the synchronous position having a larger phase allowance is selected, it is possible to enhance the stability against the fluctuation. Therefore, the stability of the reference position detection synchronized with the position signal increases. Moreover, the influences of the fluctuation of the relative position and posture, such as the attachment angle or gap of the head and scale at the attachment time of the encoder, do not have to be considered in advance, and an operation for performing the adjustment is omitted. That is, the phase difference between the position detection signal and reference position signal does not have to be strictly set or processed in the design and manufacturing. Therefore, the manufacturing cost or time for adjusting the assembly is reduced, and the restrictions in the design and manufacturing are reduced. This produces the advantage that the degree of freedom in the function can increase.

For the setting of a plurality of synchronous position candidates, when the Lissajous waveforms of two periodical signals having a phase difference of 90° are divided into two segments by an arbitrary straight line passing through the amplitude center, the candidates are set so as to include one or more phases of the reference position signal generating position candidates in either segment. In a setting as the one described here, for any position where the signal for detecting the reference position is generated, there will be necessarily a synchronous position candidate having a phase allowance of ±90° or more from the position. When a synchronous position candidate satisfying the condition is selected, a phase allowance of ±90° or more can be taken between the synchronous position and the phase when the signal for detecting the reference position is generated, and the stable reference position detection is possible.

When the reference position signal generating position candidates are arranged within one period of the periodical signal, the difference of the position between the reference position signal generating position candidates can be minimized. This is effective for minimizing the fluctuation of the reference position at the time of the switching of the reference position. Similarly, as described in the function of the example, in the method for storing the periodical signal for detecting the position and the signal for detecting the reference position in the vicinity of the reference position to distinguish the synchronous position closest to the generating position of the signal for detecting the reference position as the reference position, the detection position candidates are disposed within two periods in total including one period before/after the generation time of the signal for detecting the reference position. There is an effect that the fluctuation of the reference position is reduced at the time of the switching of the reference position in conformity with the present embodiment.

In the present embodiment, the optimal synchronous position is detected by selecting the synchronous position candidate having the largest phase difference from the segment on the Lissajous waveform where the two signals for detecting the position, having a phase difference of 90°, exist when the signal for detecting the reference position is detected. Similarly, the stability of the existing synchronous position is judged by dividing the level based on the size of the phase difference between the segment on the Lissajous waveform including two signals for detecting the position, having a phase difference of 90° when the signal for detecting the reference position is generated, and the existing synchronous position.

When the concept of the segments is introduced, it is not necessary to directly obtain the position of the point on the Lissajous waveform including the signal for detecting the position in obtaining the phase allowance, or to calculate the allowance using the position, and the processing is simplified. The number of segments which can be set is two or more, such as two, four, and eight. When the number of segments is increased, finer judgment is possible, but there can be a burden in aspects of a processing capability and circuit size/cost. By setting appropriate segments in accordance with the system, an encoder can be realized which has a high stability in a reference position detection function synchronized with the position detection signal and which is compact and inexpensive.

Furthermore, as in the example of four segments of FIG. 31, when the phase allowance of each segment differs with the moving direction, the fluctuation of the phase at the detection time of the signal for detecting the reference position drifts by the change with the elapse of time. Especially when the phase allowance of one direction is noted and judged, the embodiment is effective. As shown in FIG. 32, when the number of segments is increased in the judgment of the stability of the existing synchronous position rather than the judgment of the optimal synchronous position, the embodiment is suitable for confirming the details of the change of the phase allowance or for recording the changes with the elapse of time.

It has been described that the processing is simplified by the introduction of the segments, and this results in simplification of the judgment. Furthermore, the concrete circuit constitution or calculation process is simplified, and can easily be realized. For example, two synchronous positions apart from each other by the phase of 180° and two segments constituted of half circles of 180° are disposed. In this case, the respective segments are assumed to be disposed so that each segment has a phase difference of 90° or more with respect to any synchronous position candidate. At this time, even when the point determined by the position signals (a) and (b) at the detection time of the signal for detecting the reference position is included in any segment, an appropriate synchronous position candidate can be selected to obtain a phase difference of 90° or more. When two synchronous positions are disposed on the vertical axis or the horizontal axis in FIGS. 31 and 32, the synchronous position which differs in the level of the binarized position signal between the detection time of the signal for detecting the reference position (f) and the synchronous position is selected. Only with two segments, two synchronous positions, and simple judgment standard, the optimal synchronous position can easily be detected, and the reference position detection which has the high precision and which is stable is possible. Furthermore, this judgment standard can easily be applied to the circuit using the flip flop, or FPGA or CPU in which the equivalent processing is possible.

In the present embodiment, as shown in FIG. 31, even when two segments constituted of the half circles of 180° are further finely divided, it is assumed that there are only two segments, and the processing is carried out. Accordingly, the similar judgment processing is possible. By the fine division, the phase allowance can finely be confirmed for each moving direction. Even when the number of segments is four, the segment can easily be judged in the AND circuit and NOT circuit. Even when the number of segments is eight, about one or two units each of the comparator, operating amplifier, and resistance can be used to easily judge the segments. Therefore, the fine segments can be used for the simple circuit to obtain the detailed judgment result.

Furthermore, the display section of the judgment result can be realized by a plurality of LEDs or a number display unit whose number digits correspond to seven segments. The burden by the addition is light, but the securing of the stability of the reference position detection synchronized with the position signal and the judgment of the stability can easily be realized.

Moreover, in the present embodiment, except the signal processing circuit section, the member for generating the auxiliary signal is not disposed for the reference position detection. Therefore, the reference position can stably be detected, and the small-sized and inexpensive encoder can be supplied.

Furthermore, in the present embodiment, the reference position can be detected only with the displacement in the given direction. This produces the advantages that the detection is not easily influenced by the backlashes of the movable part and the reference position does not have to be doubly detected at the reference position detection time. The reference position detection high in precision and convenient in use is possible.

Additionally, the behavior of the system can be confirmed from the judgment result successively stored in the storage unit with the elapse of time. For example, in the segments of FIG. 30, the shift to the adjacent segment result from the certain segment result is possibly caused by the slight fluctuation of the constitution of the movable member or the detection system. Even when the result can be tolerated, but when there is a given or more fluctuation, or when the different result is obtained every measurement, it can be judged that there is a problem. Also in the reference position, only when there is not any fluctuation after obtaining the reference position, the position is satisfactory. In this case, for example, it is possible to obtain the reference position at the rise of the system and to reselect the optimal synchronous position every time, and self adjustment is possible with respect to the moderate fluctuation with the elapse of time.

Thirteenth Embodiment

Next, a thirteenth embodiment of the present invention will be described. In the same manner as in the eighth embodiment, the major constitution of the encoder according to the present embodiment except the signal processing circuit section 6 is not especially limited as long as the position detection signal and the signal for detecting the reference position are obtained. For example, the general constitution may be used such as the optical constitution shown as the constitution of the major part of the above-described first embodiment in FIG. 1. In the example of FIG. 1, the optical encoder has been described, but another type of the encoder or the displacement sensor such as the magnetic/electrostatic type may also be used as long as the position signal and reference position signal are obtained in accordance with the displacement amount.

Figure 48:
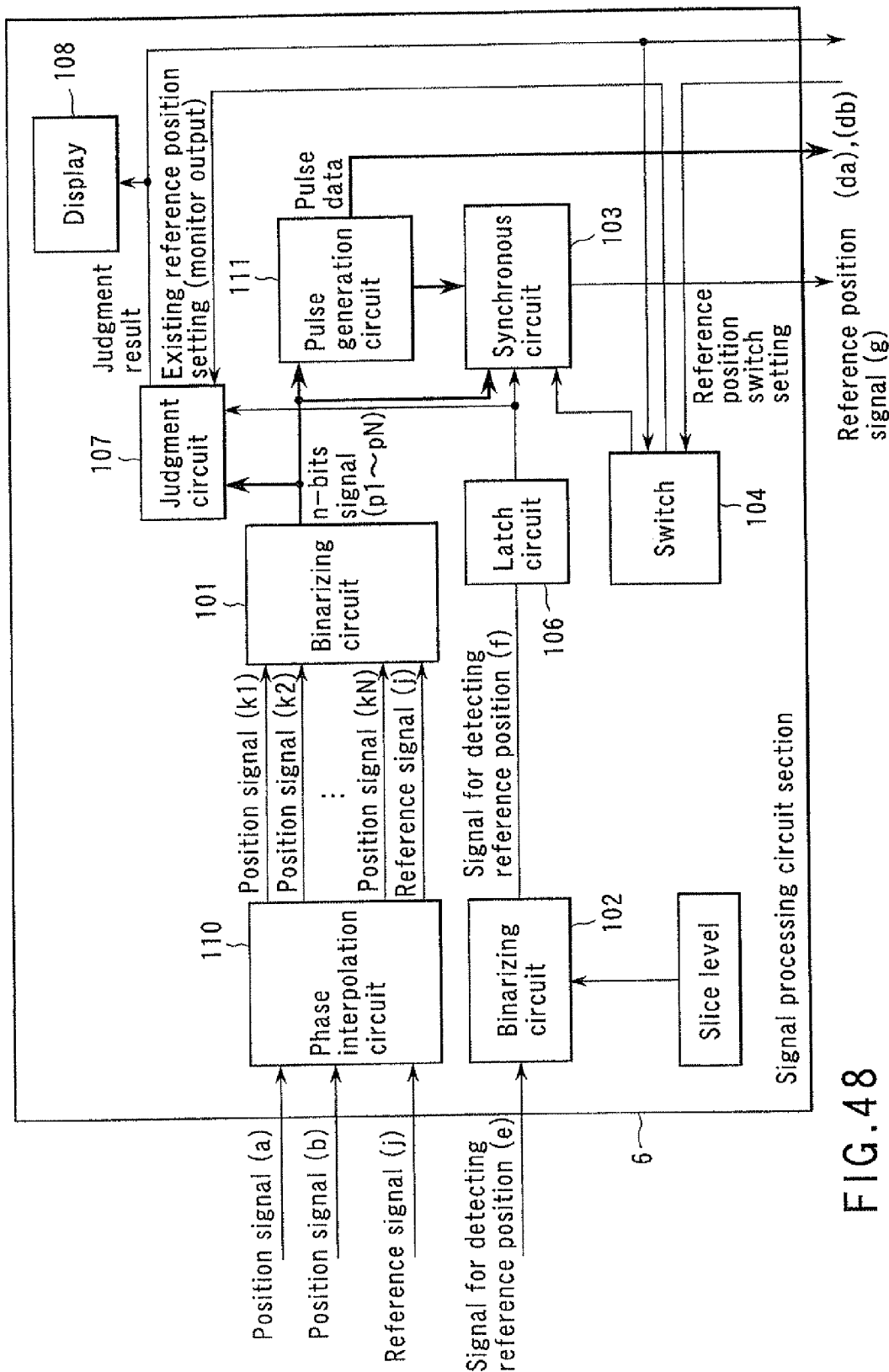
FIG. 48 is a block diagram showing the constitution of the signal processing circuit section of the encoder according to a thirteenth embodiment of the present invention.

Moreover, the signal processing circuit section 6 in the thirteenth embodiment is constituted as shown in FIG. 48. That is, the signal processing circuit section 6 according to the thirteenth embodiment includes: a phase interpolation circuit 110 for dividing the phase difference based on the analog position signals (a) and (b) having the phase difference of 90° to output N sinusoidal signals (k1) to (kN); the binarizing circuit 101 for generating N digital signals (p1) to (pN) from these N sinusoidal signals (k1) to (kN) and reference signal (j); a pulse generation circuit 111 for generating pulse signals (da) and (db) in accordance with the displacement amount of the movable member based on these N digital signals (p1) to (pN); the binarizing circuit 102 for binarizing the signal for detecting the reference position (e) at the predetermined slice level to convert the signal to the digital signal for detecting the reference position (f); the latch circuit 106 for latching the digital signal for detecting the reference position (f); the synchronous circuit 103 for synchronizing the latched digital signal for detecting the reference position (f) with one of N digital signals (p1) to (pN) which is the position signal to generate the reference position signal (g); the switch 104 for switching the timing of the synchronization; the judgment circuit 107 for detecting the optimal synchronous position and judging the stability of the existing synchronous position; and the display 108 for displaying the judgment result.

Here, when the sinusoidal signal (k1) is equal to the position signal (b) and the position signal (b), that is, the sinusoidal signal (k1) is sin θ, N sinusoidal signals (k1) to (kN) are represented by a sinusoidal signal (ki), where i=1 to N, as follows:

$$(ki)=\sin[θ-360°/N·(i-1)] \qquad \text{(Equation 9)}$$

The N sinusoidal signals (k1) to (kN) are generated by the phase interpolation circuit 110 in the present embodiment, but any constitution or method may also be used as long as the signal satisfying (Equation 9) is obtained. For example, the reversed signals are obtained from two signals having the phase difference of 90° by a reverse amplifier, and a multiphase signal including about three to eight phases may be generated by addition/subtraction of these signals. The signals such as three-phase signals originally having a phase difference of 120° may directly be inputted.

Moreover, the reference signal (j) is a reference signal indicating the amplitude center level of the position signals (a) and (b), and is used in the phase interpolation circuit 110 and binarizing circuit 101.

Figure 49:
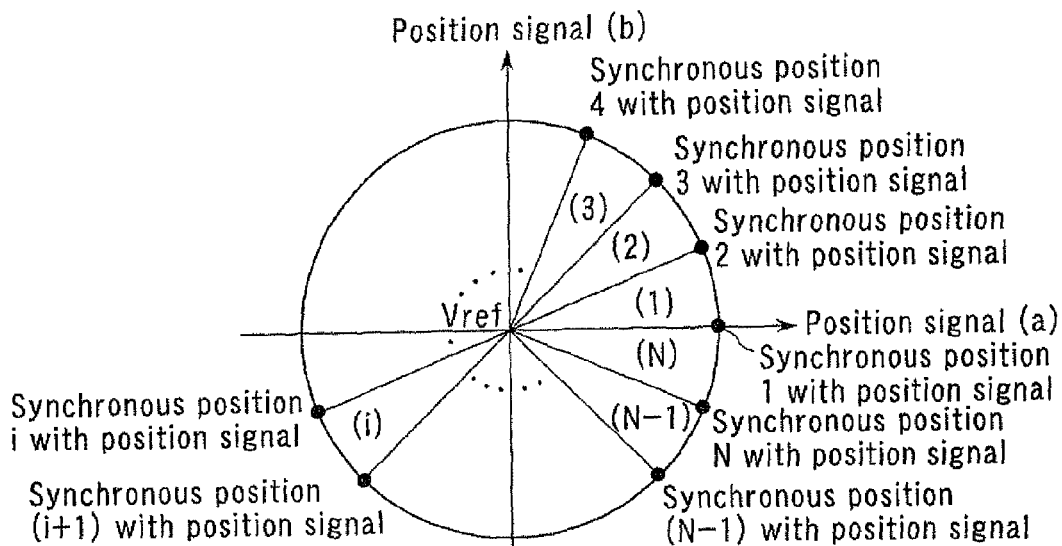
FIG. 49 is a diagram showing the reference position signal generating position candidates and the division of Lissajous figure of the analog position signals (a) and (b)

The reference position signal generating position candidates and the segments of the Lissajous figure of the analog position signals (a) and (b) will be described with FIG. 49. On the Lissajous circle, N positions (phases) which are the reference position signal generating position candidates are arranged every phase difference of (360°/N) with respect to the periods of the position signals (a) and (b), while the synchronous position 1 is on the plus side on the horizontal axis. For the detecting of the optimal synchronous position and the judgment of the stability of the existing synchronous position, N segments divided by the phases of N reference position signal generating position candidates are disposed, and as shown in FIG. 49, numbers (1) to (N) are attached to the segments counterclockwise starting from the plus side of the horizontal axis.

Figure 50:
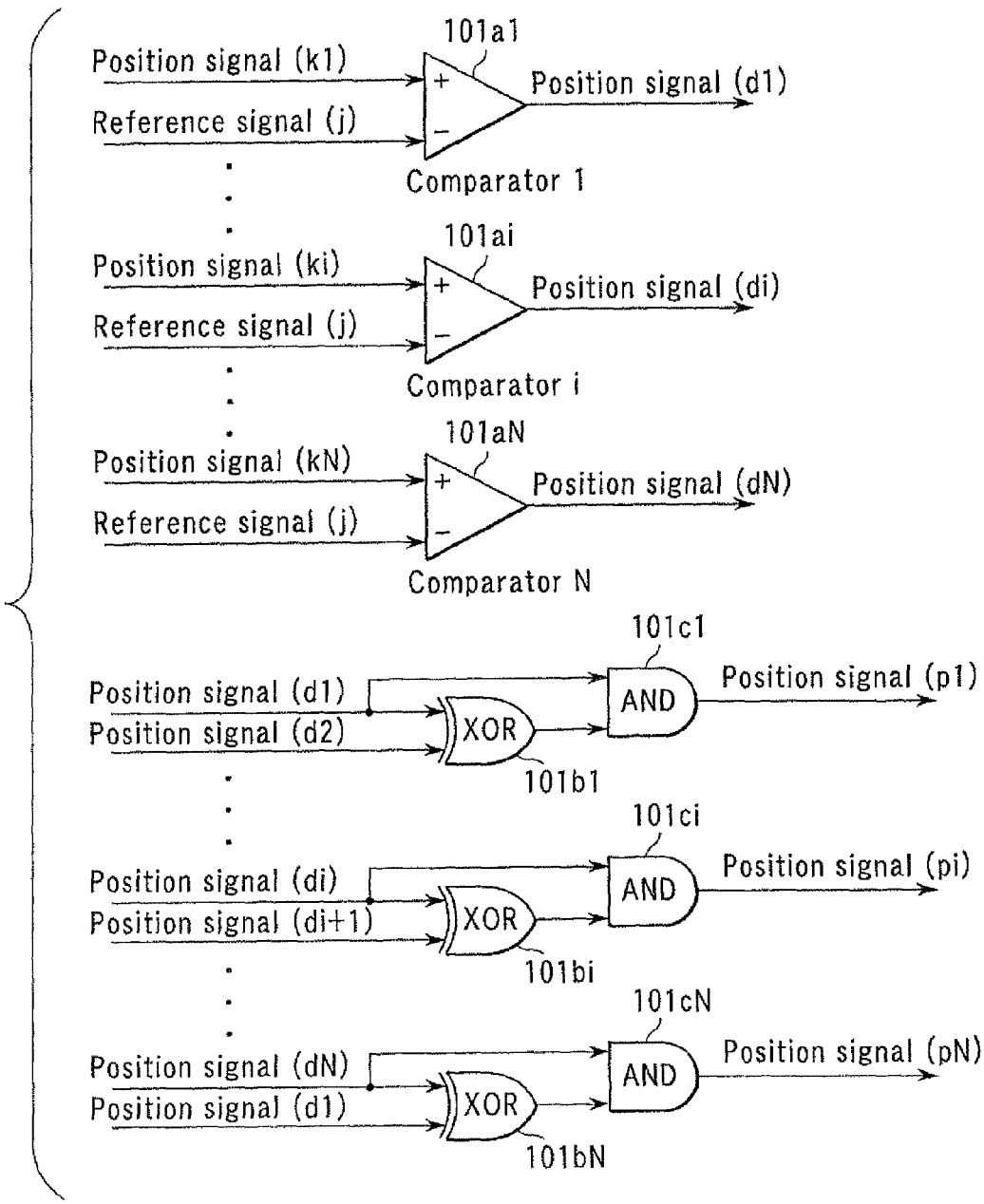
FIG. 50 is a diagram showing the constitution of a binarizing circuit of the position signal in the signal processing circuit section of the encoder according to the thirteenth embodiment.

The binarizing circuit 101 in the signal processing circuit section 6 is constituted as shown in FIG. 50. That is, the position signals (k1) to (kN) are compared with the reference signal (j) by comparators 101a1 to 101aN to generate binarized signals (d1) to (dN). Furthermore, XOR circuits 101b1 to 101bN take an exclusive logical sum (XOR) with binarized signals (di) and (di+1) disposed adjacent to each other (additionally, i=1 to N). Here, at i=N, the exclusive logical sum of the binarized signals (dN) and (d1) is assumed to be obtained. Moreover, AND circuits 101c1 to 101cN obtain a signal (pi) (additionally, i=1 to N) which indicates the result of the exclusive logical sum and the result of the logical product (AND) with the binarized signal (di).

Figure 51A:
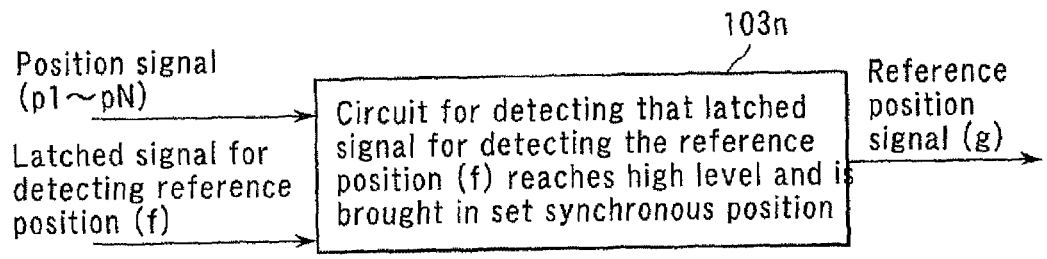
FIG. 51A is a diagram showing the constitution of the synchronous circuit in the signal processing circuit section of the encoder according to the thirteenth embodiment.
Figure 51B:
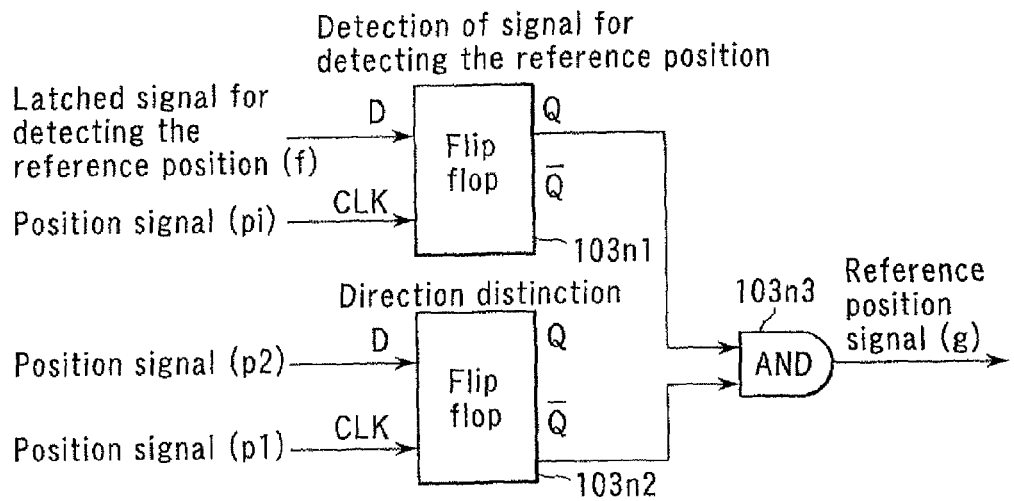
FIG. 51B is a diagram showing the concrete constitution of the circuit of FIG. 51A.

The synchronous circuit 103 in the signal processing circuit section 6 includes a constitution of FIGS. 51A and 51B. Here, FIG. 51B is a diagram showing the concrete example of a reference position detection circuit 103n for generating the reference position signal synchronized with the position signal as shown in FIG. 51A. For two circuits including the detection circuit of the signal for detecting the reference position and the direction distinction circuit in this concrete example, the flip flops such as LS423 of the D-C trigger type are used.

In the concrete example shown in FIG. 51B, a flip flop 103n1 constituting the detection circuit of the signal for detecting the reference position, which outputs the value of the latched signal for detecting the reference position (f) at the rise of the signal (pi) (additionally, i=1 to N); a flip flop 103n2 constituting the direction distinction circuit which detects the displacement counterclockwise on the Lissajous circle; and an AND circuit 103n3 for obtaining the logical product of these outputs constitute the detection circuit 103n which detects that the latched signal for detecting the reference position (f) reaches the high level and is in the set synchronous position. That is, the signal for detecting the reference position (f) latched by the latch circuit 106 is inputted into the data D of the flip flop 103n1, the signal (pi) is inputted into the clock CLK, and the output Q is inputted into the AND circuit 103n3. The position signal (p2) is inputted into the data D of the flip flop 103n2, the position signal (p1) is inputted into the clock CLK, and the output $\overline{Q}$ is inputted into the AND circuit 103n3.

Figure 52:
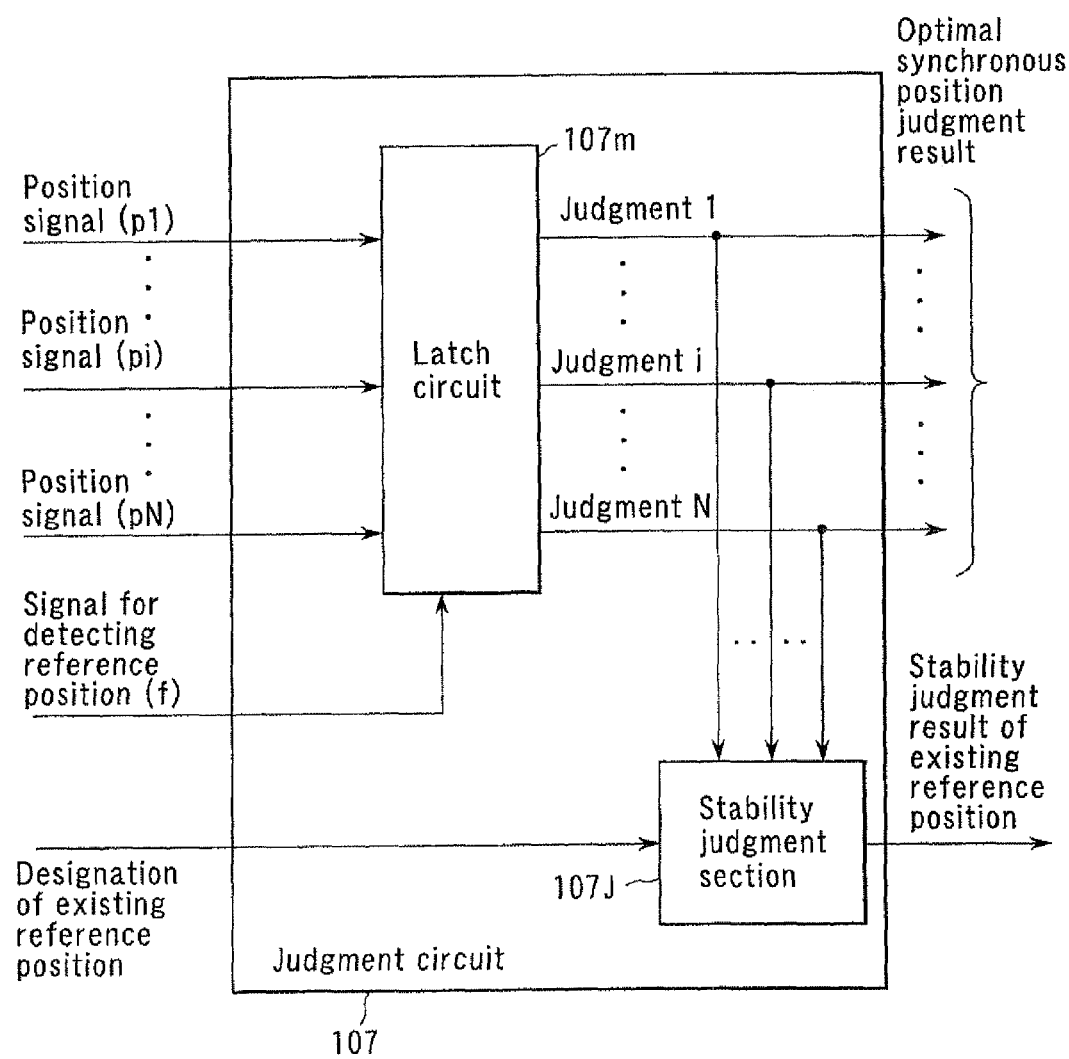
FIG. 52 is a diagram showing the constitution of the judgment circuit in the signal processing circuit section of the encoder according to the thirteenth embodiment.

Moreover, the judgment circuit 107 is assumed to include a constitution of FIG. 52. That is, in FIG. 52, the position signals (p1) to (pN), the latched signal for detecting the reference position (f), and existing reference position designation are assumed to be input signals. The circuit is constituted of the latch circuit 107m and stability judging section 107J. Here, the latch circuit 107m latches the position signals (p1) to (pN) at the rise of the latched signal for detecting the reference position (f). It is assumed that the outputs of the latch circuit 107m are detection results (1) to (N) of the optimal synchronous position. The stability judging section 107J receives these judgment results (1) to (N) and the information of the existing reference position designation which are inputs to output the stability judgment result of the existing synchronous position.

The designation situation and judgment result of the existing reference position are stored in the storage unit (not shown) in the signal processing circuit section 6, the storage unit (not shown) disposed in the switch 104 or the judgment circuit 107, any of external storage units connected to the outside of the signal processing circuit section 6, or a plurality of storage units among these. This storage unit is mainly constituted of the storage mediums, and also constituted of the logic array or CPU for processing the judgment result or for the input/output if necessary. In the storage unit, the judgment result from the judgment circuit 107 is stored, and the judgment result is outputted to the outside. Moreover, the storage unit is constituted so as to send the judgment result to the switch 104 to switch the position to the synchronous position judged as optimal. For the storage unit, the nonvolatile storage mediums are desirable such as SRAM and flash ROM in which the information is maintained even when power is turned off.

[Operation]

The processing of the input from the photodetector 5 shown in FIG. 1 by the signal processing circuit section 6 in the present embodiment will be described with reference to a part of the time chart in FIGS. 42 and 43. FIG. 42 shows the displacement in the counterclockwise direction on the Lissajous circle, and FIG. 43 shows the displacement in the clockwise direction on the Lissajous circle.

The two analog position signals (a) and (b) of the encoder which periodically change with the displacement (relative movement of the scale 4) and which have a phase difference of 90° are phase-divided in the phase interpolation circuit 110 to obtain N position signals (k1) to (kN). These position signals (k1) to (kN) are digitized in the binarizing circuit 101 to obtain the digital signals (p1) to (pN). In the binarizing circuit 102, the signal for detecting the reference position (e) is binarized at the predetermined slice level to obtain the digital signal for detecting the reference position (f). In the latch circuit 106, the rise of the digital signal for detecting the reference position (f) is detected to set the latch signal (i) to the high level.

In the region where the latch signal (i) indicates the high level, the synchronous circuit 103 generates the reference position signal as follows. That is, after the generation of the latch signal (i), the signal is synchronized with the first rise of the position signal (pi) (additionally, i=1 to N) to obtain the high level, and synchronized with the fall of the position signal (pi) to obtain the low level, so that the reference position signal (g) is obtained. The desired reference position signal (g) is obtained by switching the value of i from 1 to N and selecting one from N detection positions.

The example of FIG. 51A shows a circuit which receives the position signals (p1) to (pN), and the latched signal for detecting the reference position (f), that is, the latch signal (i) as the inputs to generate the reference position signal in the synchronous position set after the signal for detecting the reference position (f) reaches the high level. It is to be noted that the synchronous circuit 103 is not necessarily limited to the constitution of the present embodiment. For example, the function of distinguishing the direction can be realized based on the input signal, but the function of distinguishing the direction is not necessarily included.

FIG. 51B shows a circuit constitution for detecting the reference position at the time of the displacement in the counterclockwise direction on the Lissajous circle.

The direction distinction will first be described. The position signal (p2) is inputted into the data D of the flip flop 103n2, and the position signal (p1) is inputted into the clock CLK. As a result, the signal outputted from the output $\overline{Q}$ of the flip flop 103n2 is updated as the reversed signal of the position signal (p2) at every rise of the position signal (p1). Therefore, only when the position signal (p2) indicates the low level at the time of the rise of the position signal (p1), the output $\overline{Q}$ of the flip flop 103n2 indicates the high level, and the direction distinction is therefore possible.

For the circuit for detecting the signal for detecting the reference position, the latch signal (i) is inputted into the data D of the flip flop 103n1, and the position signal (pi) is inputted into the clock CLK. As a result, the signal outputted from the output Q of the flip flop $103n1$ is updated as the latch signal (i) every rise of the position signal (pi). As a result, it is possible to output the signal for detecting the reference position synchronized at the timing of the rise of the position signal (pi) after the signal for detecting the reference position is detected.

Moreover, when the AND circuit $103n3$ obtains the logical product of the direction distinction signal and the synchronized signal for detecting the reference position, it is possible to generate the reference position signal (g) shown in FIG. 42 in the predetermined detection direction and timing. On the other hand, with the displacement in the opposite direction, the reference position signal is not detected as shown by the signal (g) of FIG. 43.

Furthermore, the position is detected by inputting the pulse signals (da) and (db) generated by the pulse generation circuit 111 into the counter (not shown). The counter is reset when the reference position signal (g) is generated, or the appropriate preset value is set, and it is possible to obtain the reference position of the position detection.

Next, the candidates of the synchronous position and the detecting of the optimal synchronous position will be described with reference to FIG. 52. The optimal synchronous position is detected by judging the segment where the point determined by the position signals (a) and (b) exists at the rise, indicating the detection, of the signal for detecting the reference position (f).

Basically, for the segments and synchronous position candidates, the phase allowances with all the synchronous position candidates are determined in the stepwise manner for each segment, and the synchronous position candidate having the largest phase allowance is regarded as optimal and outputted. In the present embodiment, assuming that the number of segments is two, the number of synchronous position candidates is two, and the phase allowance is represented from 0° to 180°, the phase allowance is optimal when the phase difference is largest. With respect to the phase allowance, as seen in a case where the processing is not performed in real time, when the phase difference is represented from 0° to 180°, conversely the candidate in the vicinity of 0° may be regarded as optimal.

In FIG. 52, there are N synchronous position candidates including synchronous positions 1 to N every (360°/N) phase. For a case where the segment including the point determined by the position signals (a) and (b) at the rise of the signal for detecting the reference position (f) is (i), N which is an even or odd number will dividedly be described.

When N denotes an even number, for $j=[(i+N/2) \bmod N]$, the phase difference with respect to the synchronous positions j and (j+1) is largest as (180°−360°/N). Therefore, the synchronous position j or (j+1) is judged as the optimal synchronous position. Additionally, (M mod N) denotes a remainder obtained by dividing M by N, and includes numbers of 0 to (N−1).

When N denotes an odd number, for $j=[\{i+(N+1)/2\} \bmod N]$, the phase difference with respect to the synchronous position j is largest as (180°−180°/N). Therefore, the synchronous position j is judged as the optimal synchronous position.

Next, concerning the segment for use in detecting the optimal synchronous position candidate, the detection of the segment where the point determined by the position signals (a) and (b) is included at the detection time of the signal for detecting the reference position (f) will be described with reference to FIGS. 50 and 52.

In FIG. 50, each position signal (di) is obtained by binarizing the position signal (ki), and repeatedly indicates the high and low levels every semi-period. The position signals (d1) to (dN) are the signals for each (360°/N) phase difference. When the number of subscripts increases, the phase delays. Therefore, the XOR circuits $101b1$ to $101bN$ obtains the exclusive logical sum of the position signals (di) and (di+1), and the AND circuits $101c1$ to $101cN$ obtains the logical product of the results and the position signal (di). When the result is applied to (Equation 9), the position signal (pi) indicates the high level only with θ between 360°·(i−1)/N and 360°·i/N. Therefore, when the segment including the point determined by the position signals (a) and (b) is (i), from (Equation 9), only the signal (pi) indicates the high level.

From the above, as shown in FIG. 52, when the position signals (p1) to (pN) are latched at the detection time of the signal for detecting the reference position (f), and the high-level position signal is (pi), it can be seen that the segment including the point determined by the position signals (a) and (b) at the detection time of the signal for detecting the reference position (f) is the segment (i).

From the above, the position signals (p1) to (pN) are latched at the time of the detection of the signal for detecting the reference position (f), and the position signal indicating the high level is (pi), that is, in FIG. 52, the judgment i indicates the high level. The logic of the judgment of the optimal synchronous position at this time will be described dividedly for N which is the even or odd number. When N denotes the even number, for $j=[(i+N/2) \bmod N]$, the phase difference with respect to the synchronous positions j and (j+1) is largest as (180°−360°/N). Therefore, the synchronous position j or (j+1) is judged as the optimal synchronous position. When N denotes the odd number, for $j=[\{i+(N+1)/2\} \bmod N]$, the phase difference with respect to the synchronous position j is largest as (180°−180°/N). Therefore, the synchronous position j is judged as the optimal synchronous position.

Next, for a case where the synchronous position is set to (i), and the segment including the point determined by the position signals (a) and (b) at the detection time of the signal for detecting the reference position (f) is (j), the method for judging the stability of the synchronous position will be described. For the way of judgment, in the same manner as in the judgment of the optimal synchronous position, it is assumed that when the phase difference between the segment included at the rise of the signal for detecting the reference position (f) and the synchronous position is larger, the stability is high. When the phase difference is smaller, the stability is low.

From FIG. 49, minimum values of the phase difference between the synchronous position i and the segment (j) can be obtained in the counterclockwise and clockwise directions. Assuming that the value of the counterclockwise direction is θ+ and that of the clockwise direction is θ−, θ+ and θ− are:

$$\theta + = [(j-i) \bmod N] \cdot 360°/N \qquad \text{(Equation 10)}$$

$$\theta - = [(i-j-1) \bmod N] \cdot 360°/N \qquad \text{(Equation 11)}$$

In θ+ and θ−, θmin is assumed to be smaller, and θmin is then the phase allowance. The allowance can be judged by the value of θmin.

The phase difference θmin takes a stepwise value. When N denotes the even number, (N/2) steps result. Moreover, when N denotes the odd number, [(N+1)/2] steps result. For the number of steps, when the adjoining steps are put together into one based on the specifications of the judgment level dividing if necessary, the number of steps can be reduced.

It is to be noted that in the present embodiment, the segment for use in judging the stability is the same as that for use in detecting the optimal synchronous position. Therefore, the description is omitted.

From the above, the position signals (p1) to (pN) are latched at the time of the detection of the signal for detecting the reference position (f), and the position signal indicating the high level is (pj), that is, in FIG. 52, the judgment i indicates the high level. The logic of the judgment of the stability with respect to the existing synchronous position i at this time will be described hereinafter.

In θ+ and θ− represented in (Equation 10) and (Equation 11), θmin is assumed to be smaller, and the phase allowance is judged in accordance with the value of θmin in advance. At this time, the value of θmin takes a discrete value. When N denotes the even number, (N/2) steps result. When N denotes the odd number, [(N+1)/2] steps result. The level is judged based on the values of i and j by the stability judging section 107J, and outputted to the outside. It is to be noted that only the values of i and j may be outputted from the stability judging section 107J so that the stability can be judged outside.

The use of the judgment result concerning the optimal synchronous position or the stability of the reference position is similar to that of the twelfth embodiment, and details are therefore omitted.

[Effect]

In the present embodiment, substantially the same effect as that of the twelfth embodiment can be obtained.

As the effect peculiar to the present embodiment, in the circuit for generating the multiphase signal including about three to eight phases by the addition/subtraction of the 90° phase difference signal and the reversed signal or dividing the phases by resistance division in order to adjust gain offset or to correct the phase of the signal having the phase difference of 90°, a circuit for the judgment can be shared to some degree.

The former generation of the multiphase signal by the addition/subtraction can be regarded as a part of the phase interpolation in a broad detect, and can be applied to the present embodiment. Especially in the circuit for performing the phase interpolation by the resistance division, AB phase signals and reversed signals are weighted and added/subtracted to divide one period of 360° of the AB phase into N, so that N signals are generated at an interval of the phase difference (360°/N), or the function can easily be added. In most cases, a comparator circuit for detecting intersection between N analog phase difference signals and the reference signal is already disposed. Therefore, the phase synchronization function of the reference position signal or the phase position at the specific timing is relatively easily detected. Furthermore, to detect the phase synchronization function of the reference position signal or the phase position at the specific timing, the same detection method is applied to all the synchronous position candidates. Similarly, the same detection method is applied to the detection of all the segments. Therefore, although there are a large number of synchronous position candidates and segments, the circuit can be simplified.

Moreover, in the phase interpolation, usually the phase is divided into about several tens to thousands of phases. Therefore, since a large number of synchronous position candidates and segments are disposed, the detection of the optimal synchronous position and the judgment of the stability of the existing synchronous position can finely be performed.

As described above, the content of the present embodiment can easily be applied to the reference position detection of the displacement sensor which has a function of dividing the phase by the resistance division. Merits of miniaturization and cost reduction by IC can be provided which are merits of the phase interpolation by the resistance division.

The present invention has been described above based on the embodiments, but the present invention is not limited to the above-described embodiments, and can, needless to say, variously be modified and applied in the scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A displacement sensor which detects displacement amount based on a periodical signal generated in response to displacement of one of the position and angle of a movable member and which generates a reference position signal, when the movable member is in a predetermined range, the sensor comprising:
   a generating section of a signal for detecting a reference position configured to generate a signal for detecting the reference position, which is not necessarily synchronized with the periodical signal, when the movable member is in the predetermined range; and
   a stability judging section configured to judge stability of the existing reference position signal generating position based on phase margin between the phase of the periodical signal when the signal for detecting the reference position is generated and that in the reference position signal generating position.

2. The displacement sensor according to claim 1, wherein the stability judging section judges that the existing reference position signal generating position is most stable at a phase difference of 180° and is most unstable at a phase difference of 0°, when the difference between the phase of the periodical signal when the signal for detecting the reference position is generated and that in the reference position signal generating position is represented from 0° to 180°.

3. The displacement sensor according to claim 1, wherein there are a plurality of candidates for the reference position signal generating position, and one of the candidates is able to be selected as the reference position signal generating position.

4. The displacement sensor according to claim 3, wherein designation of the reference position signal generating position is able to be changed based on a result of the stability judgment.

5. The displacement sensor according to claim 3, wherein the stability judging section is able to automatically acquire the information on which candidate of the reference position signal generating position is the designated reference position signal generating position.

6. The displacement sensor according to claim 1, wherein the periodical signals are two periodical signals which substantially have a 90° phase difference,
   a coordinate system is disposed so that an output of one of the two periodical signals is taken in the horizontal axis direction of a two-dimensional orthogonal coordinate system, the output of the other is taken in the vertical axis direction, and values of coordinates in intersections of the vertical and horizontal axes agree with amplitude center values of the outputs of the two periodical signals, a waveform drawn by a point determined by the outputs of the two periodical signals with the displacement of the movable member on the coordinate system is a Lissajous waveform of the two periodical signals, and the stability judging section divides the Lissajous waveform of the two periodical signals into two or more segments, and judges the stability based on the segment on the Lissajous waveform in which a point determined by the two periodical signals exists when the signal for detecting the reference position is generated.

7. The displacement sensor according to claim 6, wherein the segments are obtained by dividing the Lissajous waveform of the two periodical signals so that corresponding displacement amount is substantially equal.

8. The displacement sensor according to claim 6, wherein assuming that the difference is represented from 0° to 180° between the phase of the periodical signal in the segment on the Lissajous waveform in which the point determined by the two periodical signals exists when the signal for detecting the reference position is generated and the phase of the periodical signal in the reference position signal generating position, the stability judging section regards a minimum value of the phase difference within a segment as the phase difference between the segment and the reference position signal generating position, and judges that the existing reference position signal generating position is most stable at a phase difference of 180° and is most unstable at a phase difference of 0°.

9. The displacement sensor according to claim 6, wherein the number of segments is four.

10. The displacement sensor according to claim 9, wherein the four segments are obtained by dividing the Lissajous waveform of the two periodical signals by the vertical and horizontal axes.

11. The displacement sensor according to claim 6, wherein the number of segments is eight.

12. The displacement sensor according to claim 11, wherein the eight segments are obtained by dividing the Lissajous waveform of the two periodical signals by four straight lines including the vertical and horizontal axes and two straight lines which pass through the intersections of the vertical and horizontal axes and which have an inclination of ±45° with respect to the horizontal axis.

13. The displacement sensor according to claim 1, wherein the stability judging section carries out both the judgment of the stability and the output of the stability, only when the movable member moves in a direction for detecting the reference position.

14. The displacement sensor according to claim 1, wherein the level of the stability is represented in a digital manner.

15. A method for judging stability of reference position detection of a displacement sensor which detects displacement amount based on periodical signals generated in response to displacement of one of the position and angle of a movable member and which generates a reference position signal, when the movable member is in a reference position signal generating position as one of the predetermined position and angle, the displacement sensor
generating a signal for detecting a reference position, when the movable member is in a predetermined range, and
comprising a stability judging section configured to judge stability of the existing reference position signal generating position based on phase margin between the phase of the periodical signal when the signal for detecting the reference position is generated and that in the reference position signal generating position, the method for judging the stability of the reference position detection of the displacement sensor, comprising:
detecting the generation of the signal for detecting the reference position;
judging the stability of the existing reference position by the stability judging section; and
outputting the judgment result.

16. The method for judging the stability of the reference position detection of the displacement sensor according to claim 15, wherein when there are a plurality of reference position signal generating position candidates in the reference position signal generating position for generating the reference position signal, and the displacement sensor further comprising: a selecting section configured to select one generating position candidate as the reference position signal generating position from the generating position candidates, the method further comprising:
judging whether or not to reflect a judgment result; and
switching the setting of the reference position, only when it is judged that the judgment result should be reflected.

17. The method for judging the stability of the reference position detection of the displacement sensor according to claim 16, wherein judging whether or not to reflect the judgment result and switching the setting of the reference position are automatically performed.

18. The method for judging the stability of the reference position detection of the displacement sensor according to claim 15, further comprising: ending a sequence of the stability judgment, when the moving direction of the movable member is reversed.

19. A displacement sensor which detects displacement amount based on a periodical signal generated in response to displacement of one of the position and angle of a movable member and which generates a reference position signal, when the movable member is in a predetermined range, the displacement sensor comprising:
generating means of a signal for detecting a reference position, for generating the signal for detecting the reference position, which is not necessarily synchronized with the periodical signal, when the movable member is in the predetermined range; and
stability judging means for judging stability of the existing reference position signal generating position based on phase margin between the phase of the periodical signal when the signal for detecting the reference position is generated and that in the reference position signal generating position.

* * * * *